United States Patent
Ando et al.

(10) Patent No.: US 6,603,923 B2
(45) Date of Patent: Aug. 5, 2003

(54) INFORMATION RECORDING MEDIUM, INFORMATION RECORDING METHOD AND APPARATUS, AND INFORMATION PLAYBACK METHOD AND APPARATUS

(75) Inventors: Hideo Ando, Hino (JP); Hideki Mimura, Yokohama (JP); Shinichi Kikuchi, Yokohama (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 10/173,156

(22) Filed: Jun. 18, 2002

(65) Prior Publication Data

US 2003/0016950 A1 Jan. 23, 2003

Related U.S. Application Data

(62) Division of application No. 09/817,113, filed on Mar. 27, 2001, which is a division of application No. 09/365,708, filed on Aug. 3, 1999, now Pat. No. 6,215,746.

(30) Foreign Application Priority Data

Aug. 5, 1998 (JP) ............................................. 10-221919

(51) Int. Cl.$^7$ ........................... H04N 5/781; H04N 5/85
(52) U.S. Cl. ....................................... 386/125; 386/126
(58) Field of Search .......................... 386/95, 96, 105, 386/106, 124, 125, 126, 46, 1, 45, 82; 369/47.1; 360/32; H04N 5/781, 5/85

(56) References Cited

U.S. PATENT DOCUMENTS

| | | | | |
|---|---|---|---|---|
| 4,862,295 A | * | 8/1989 | Tanaka et al. | |
| 5,440,631 A | * | 8/1995 | Akiyama et al. | 705/53 |
| 5,703,997 A | * | 12/1997 | Kitamura et al. | |
| 5,771,334 A | * | 6/1998 | Yamauchi et al. | 386/95 |
| 5,857,021 A | * | 1/1999 | Kataoka et al. | 705/54 |
| 6,047,103 A | * | 4/2000 | Yamauchi et al. | 386/94 |
| 6,088,312 A | * | 7/2000 | Utsumi et al. | 369/47 |
| 6,118,927 A | * | 9/2000 | Kikuchi et al. | |

FOREIGN PATENT DOCUMENTS

| | | |
|---|---|---|
| JP | 6-103317 | 4/1994 |
| JP | 8-221948 | 8/1996 |

OTHER PUBLICATIONS

Explanation of Circumstances Concering Accelerated Examination for Japanese Patent Application No. AD09805001, AD00103788, AD00103787 (English Translation).

* cited by examiner

Primary Examiner—Robert Chevalier
(74) Attorney, Agent, or Firm—Oblon, Spivak, McClelland, Maier & Neustadt, P.C.

(57) ABSTRACT

An information recording method for recording information on a recording medium, including providing a recording medium having first and second areas, the first area for recording and reproducing video information, the second area for recording manager information, the manager information referred to when the video information is reproduced, the video information including an object file for storing movie and/or still video objects, the manager information including video manager information related to the movie and/or still video objects, the object file including manufacturer's information which includes manufacturer ID and manufacturer's data, recording the movie and/or still video objects in the object file, recording the video manager information in a third area in the second area, recording the manufacturer ID in a fourth area in the object file, and recording manufacturer's data of a specific manufacture corresponding to the manufacturer ID in a fifth area adjacent to the fourth area.

4 Claims, 44 Drawing Sheets

| AV FILE 1401 | | | | | |
|---|---|---|---|---|---|
| VOB #3 (3) 1465 | EXTENT #ε 1475 | LSNg |
| | | ⋮ |
| | | LSNf+1 |
| UNRECORDED AREA 1460 | EXTENT #ζ 1470 | LSNf |
| | | ⋮ |
| | | LSNe+1 |
| VOB #2 1462 | EXTENT #β 1472 | LSNe |
| | | ⋮ |
| | | LSNd+1 |
| VOB #3 (2) 1464 | EXTENT #δ 1474 | LSNd |
| | | ⋮ |
| | | LSNc+1 |
| VOB #1 1461 | EXTENT #α 1471 | LSNc |
| | | ⋮ |
| | | LSNb+2 |
| | | LSNb+1 |
| VOB #3 (1) 1463 | EXTENT #γ 1473 | LSNb |
| | | ⋮ |
| | | LSNa+2 |
| | | LSNa+1 |

← SMALLER LOGICAL SECTOR NUMBER (LSN)
← INNER SIDE OF OPTICAL DISC 1001

LARGER LOGICAL SECTOR NUMBER (LSN) →
OUTER SIDE OF OPTICAL DISC 1001 →

| CONTENTS OF ALLOCATION MAP TABLE 1105 | | |
|---|---|---|
| DISTRIBUTION INFORMATION OF POSITIONS OF UNRECORDED AREA 1621 | NUMBER OF EXTENTS IN UNRECORDED AREA 1601 | 1 |
| | 1ST ADR. (LSN) OF 1ST EXTENT IN UNRECORDED AREA 1606 | e-a |
| | SIZE (SECTORS) OF 1ST EXTENT IN UNRECORDED AREA 1614 | f-e |
| DISTRIBUTION INFORMATION OF POSITIONS OF RECORDED DATA AS TO VOB #1 1622 | NUMBER OF EXTENTS IN VOB #1 1602 | 1 |
| | 1ST ADR. (LSN) OF 1ST EXTENT IN VOB #1 1607 | b-a |
| | SIZE (SECTORS) OF 1ST EXTENT IN VOB #1 1615 | c-b |
| DISTRIBUTION INFORMATION OF POSITIONS OF RECORDED DATA AS TO VOB #2 1623 | NUMBER OF EXTENTS IN VOB #2 1603 | 1 |
| | 1ST ADR. (LSN) OF 1ST EXTENT IN VOB #2 1608 | d-a |
| | SIZE (SECTORS) OF 1ST EXTENT IN VOB #2 1616 | e-d |
| DISTRIBUTION INFORMATION OF POSITIONS OF RECORDED DATA AS TO VOB #3 1624 | NUMBER OF EXTENTS IN VOB #3 1604 | 3 |
| | 1ST ADR. (LSN) OF 1ST EXTENT IN VOB #3 1609 | 1 |
| | SIZE (SECTORS) OF 1ST EXTENT IN VOB #3 1617 | b-a |
| | 1ST ADR. (LSN) OF 2ND EXTENT IN VOB #3 1610 | c-a |
| | SIZE (SECTORS) OF 2ND EXTENT IN VOB #3 1618 | d-c |
| | 1ST ADR. (LSN) OF 3RD EXTENT IN VOB #3 1611 | f-a |
| | SIZE (SECTORS) OF 3RD EXTENT IN VOB #3 1619 | g-f |

*1> PGC INFORMATION (OR UD_PGCI) CAN DEFINE A GROUP OF ONE OR MORE PROGRAMS;
*2> EACH PROGRAM CAN BE FORMED OF ONE OR MORE CELLS;
*3> EACH CELL CAN BE SPECIFIED BY CELL ID (OR CI_SRP);
*4> EACH CELL ID (OR CI_SRP) CAN INDICATE POSITION (OR START ADDRESS) OF CELL INFORMATION (OR CI);
*5> EACH CELL INFORMATION (OR CI) CAN DETERMINE START TIME AND END TIME OF PRESENTATION OF CELL

PGC INFORMATION (PGCI)

| PGC#1 1081 | | PGC#2 1082 | | PGC#3 1083 | |
|---|---|---|---|---|---|
| NUMBER OF CELLS=3 | | NUMBER OF CELLS=3 | | NUMBER OF CELLS=5 | |
| #1 | CELL A | #1 | CELL D | #1 | CELL E |
| #2 | CELL B | #2 | CELL E | #2 | CELL A |
| #3 | CELL C | #3 | CELL F | #3 | CELL D |
| — | — | — | — | #4 | CELL B |
| — | — | — | — | #5 | CELL E |
| CELL ID | CELL INFO. | CELL ID | CELL INFO. | CELL ID | CELL INFO. |
| CI_SRP #m=3 | CI #n=3 | CI_SRP #m=3 | CI #n=3 | CI_SRP #m=5 | CI #n=4 |

FIG. 9A  AV FILE 1401

FIG. 9B  VTS (OR RTR_MOV.VRO) 1402
| VOB#1 1461 | VOB#2 1462 | VOB#3 1763 | UNRECORDED AREA 1460 |
| EXTENT# α 1471 | EXTENT# β 1472 | EXTENT# γ 1473 | EXTENT# δ 1474 | EXTENT# ε 1475 | EXTENT# ζ 1470 |

FIG. 9C  AV FILE 1401

FIG. 9D, FIG. 9E  VTS (OR RTR_MOV.VRO/RTR_STO.VRO/RTR_STA.VRO) 1402

| VOB#A 1771 | VOB#B 1772 | VOB#C 1773 | VOB#D 1774 | VOB#E 1775 | VOB#F 1776 | VOB#G 1777 | VOB#H 1778 | VOB#I 1779 |
| VIDEO OBJECTS 1012 | | AUDIO OBJECTS 1014 | PICTURE OBJECTS 1013 | | AUDIO OBJECTS 1014 | | THUMBNAIL OBJECTS 1016 | |

M_VOBI# ── S_VOGI# ──
RTR_MOV.VRO ── RTR_STO.VRO ──

FIG. 9F

| CLASSIFICATION ITEM 2020 | DETAILED INFORMATION CONTENTS 2021 | |
|---|---|---|
| LINK INFORMATION SIZE 2022 | DATA SIZE OF ONE LINK INFORMATION (TOTAL OF ALL PIECES OF INFORMATION WHICH FOLLOW) (INDICATED BY NUMBER OF SECTORS USED (INTEGER MULTIPLE OF 2,048 BYTES)) | 2030 |
| IDENTIFICATION INFORMATION OF LINK INFORMATION 2023 | ID INFORMATION OR LINK INFORMATION NUMBER OF LINK INFORMATION | 2031 |
| INFORMATION PERTAINING TO DRIVE MANUFACTURER 2024 | ID INFORMATION OF CHARACTER CODE FOR DRIVE MANUFACTURER USE | 2033 |
| | DRIVE MANUFACTURER GROUP ID INFORMATION (ID OF GROUP FORMED BY A PLURALITY OF MANUFACTURERS) OF DRIVE MANUFACTURER GROUP THAT CAN USE SPECIFIC INFORMATION ASSOCIATED WITH THIS LINK INFORMATION | 2034 |
| | DRIVE MANUFACTURER ID INFORMATION (DRIVE MANUFACTURER NAME OR THE LIKE) OF DRIVE MANUFACTURER THAT CAN USE SPECIFIC INFORMATION ASSOCIATED WITH THIS LINK INFORMATION | 2035 |
| | TIME INFORMATION (SETTING DATE OF DRIVE MANUFACTURER ID OR THE LIKE) PERTAINING TO DRIVE MANUFACTURER THAT CAN USE SPECIFIC INFORMATION ASSOCIATED WITH THIS LINK INFORMATION | 2036 |
| | ADDITIONAL INFORMATION PERTAINING TO THIS LINK INFORMATION WHICH CAN BE SET BY DRIVE MANUFACTURER | 2037 |
| FUNCTION INFORMATION 2025 | FUNCTION INFORMATION (CATEGORY ID) WHICH PERTAINS TO SPECIFIC INFORMATION AND IS COMMON TO A PLURALITY OF COMPANIES | 2040 |
| | INFORMATION PERTAINING TO LINK PATTERN OF SPECIFIC INFORMATION ASSOCIATED WITH THIS LINK INFORMATION | 2041 |

FIG. 13A

| CLASSIFICATION ITEM 2020 | DETAILED INFORMATION CONTENTS 2021 | |
|---|---|---|
| FUNCTION INFORMATION 2025 | CORRECTION CONTENT AUTOMATIC INSPECTION INFORMATION FOR AUTOMATICALLY CHANGING/CORRECTING CONTENTS OF SPECIFIC INFORMATION THAT CAN BE USED BY ONLY SPECIFIC MANUFACTURER IN ACCORDANCE WITH CHANGE IN CONTENTS OF COMMON INFORMATION COMPLYING WITH STANDARDS | 2042 |
| LINK DESIGNATION LOCATIONS OF LINK SOURCE AND LINK DESTINATION, LINK DESIGNATION RANGE, AND PRIORITY ORDER INFORMATION 2026 | NUMBER OF LINK DESIGNATION LOCATIONS IN COMMON INFORMATION COMPLYING WITH STANDARDS | 2044 |
| | FIRST PRIORITY LINK DESIGNATION LOCATION INFORMATION IN COMMON INFORMATION COMPLYING WITH STANDARDS | 2045 |
| | FIRST PRIORITY LINK DESIGNATION LOCATION INFORMATION IN COMMON INFORMATION COMPLYING WITH STANDARDS | 2046 |
| | SECOND PRIORITY LINK DESIGNATION LOCATION INFORMATION IN COMMON INFORMATION COMPLYING WITH STANDARDS | 2047 |
| | SECOND PRIORITY LINK DESIGNATION LOCATION INFORMATION IN COMMON INFORMATION COMPLYING WITH STANDARDS | 2048 |
| | ⋮ | |
| | NUMBER OF LINK DESIGNATION LOCATIONS IN SPECIFIC INFORMATION THAT CAN BE USED BY ONLY SPECIFIC MANUFACTURER | 2054 |
| | FIRST PRIORITY LINK DESIGNATION LOCATION INFORMATION IN SPECIFIC INFORMATION | 2055 |
| | FIRST PRIORITY LINK DESIGNATION LOCATION INFORMATION IN SPECIFIC INFORMATION | 2056 |

FIG. 13B

| CLASSIFICATION ITEM 2020 | DETAILED INFORMATION CONTENTS 2021 | |
|---|---|---|
| LINK DESIGNATION LOCATIONS OF LINK SOURCE AND LINK DESTINATION, LINK DESIGNATION RANGE, AND PRIORITY ORDER INFORMATION 2026 | SECOND PRIORITY LINK DESIGNATION LOCATION INFORMATION IN SPECIFIC INFORMATION | 2057 |
| | SECOND PRIORITY LINK DESIGNATION LOCATION INFORMATION IN SPECIFIC INFORMATION | 2058 |
| | ⋮ | |
| TIME INFORMATION PERTAINING TO THIS LINK INFORMATION 2027 | LAST RECORDING/CHANGE TIME (DATE) INFORMATION OF THIS LINK INFORMATION | 2061 |
| | EFFECTIVE PERIOD INFORMATION OF THIS LINK INFORMATION (DUE DATE OF LINK INFORMATION) | 2062 |
| | TIME INFORMATION PERTAINING TO SPECIFIC INFORMATION (TIME BAND INFORMATION IN WHICH SPECIFIC INFORMATION CAN BE USED OR THE LIKE) | 2063 |
| SPECIFIC INFORMATION USABLE CONDITION INFORMATION 2028 | USABLE/UNUSABLE DETERMINATION FLAG FOR SPECIFIC INFORMATION | 2071 |
| | PASSWORD INFORMATION FOR SETTING SECURITY | 2072 |
| | MODEL INFORMATION THAT CAN USE SPECIFIC INFORMATION (OLDEST MODEL THAT CAN USE SPECIFIC INFORMATION) | 2073 |
| | INFORMATION PERTAINING TO USABLE CONDITION FOR SPECIFIC INFORMATION (USER RANGE DESIGNATION THAT ALLOWS USE OF SPECIFIC INFORMATION OR THE LIKE) | 2074 |
| | SPACE INFORMATION PERTAINING TO USE CONDITION OF SPECIFIC INFORMATION (USABLE REGION OR THE LIKE) | 2075 |

FIG. 13C

| NUMBER OF PIECES OF ID INFORMATION 2081 | ATTRIBUTE OF ID INFORMATION 2082 | VARIOUS EMBODIMENTS 2083 | DETAILED CONTENTS OF EMBODIMENTS 2084 | EFFECT OF EMBODIMENTS 2085 |
|---|---|---|---|---|
| INDEPENDENT INFORMATION 2091 | ORIGINAL ID INFORMATION (I/O INFORMATION) 2095 | SYSTEMATICALLY MANAGE ID INFORMATION IN UNITS OF DRIVE MANUFACTURERS BY SPECIFIC ORGANIZATION | (DVD FORUM OR THE LIKE) ASSIGN ID INFORMATION TO EACH DRIVE MANUFACTURER BY THIRD PARTY COMMON ORGANIZATION | • ID DUPLICATION AMONG DIFFERENT DRIVE MANUFACTURERS CAN BE AVOIDED<br>• THE NUMBER OF DIGITS REQUIRED FOR ID INFORMATION CAN BE MINIMIZED |
| | | SET ORIGINAL ID INFORMATION BY EACH DRIVE MANUFACTURER | NO MANAGEMENT BY SPECIFIC ORGANIZATION DETERMINE INFORMATION OF UNSUPPORTED MANUFACTURER WHEN SPECIFIC INFORMATION CANNOT BE READ | • NO ID INFORMATION MANAGEMENT ORGANIZATION IN UNITS OF DRIVE MANUFACTURERS IS REQUIRED<br>• ID INFORMATION CAN BE ARBITRARILY SET |

FIG. 14A

| NUMBER OF PIECES OF ID INFORMATION 2081 | ATTRIBUTE OF ID INFORMATION 2082 | VARIOUS EMBODIMENTS 2083 | DETAILED CONTENTS OF EMBODIMENTS 2084 | EFFECT OF EMBODIMENTS 2085 |
|---|---|---|---|---|
| INDEPENDENT INFORMATION 2091 | CHARACTER INFORMATION 2096 | DIRECTLY DESCRIBE DRIVE MANUFACTURER NAME IN LINK INFORMATION | DESCRIBE MANUFACTURER NAME USING CHARACTER CODE 2034 (JIS CODE OR THE LIKE) SET IN LINK INFORMATION | • DRIVE MANUFACTURER ID INFORMATION CAN BE EASILY SET<br>• ID DUPLICATION AMONG DIFFERENT DRIVE MANUFACTURERS HARDLY OCCURS |
| | | DESIGNATE CORRESPONDING NUMBER FROM DRIVE MANUFACTURER LIST TABLE (DESCRIBED BY CHARACTER INFORMATION) | REGISTER MANUFACTURER NAME IN LIST TABLE SET AT DIFFERENT POSITION IN UNITS OF DISCS, AND DESIGNATE THE REGISTERED NUMBER IN LINK INFORMATION | • NO CHARACTER CODE NEED BE SET IN LINK INFORMATION<br>• REGISTERED MANUFACTURER NAME CAN BE DETECTED<br>• INFORMATION SIZE IN LINK INFORMATION CAN BE MINIMIZED |
| | | DESCRIBE IN CHARACTER INFORMATION DRIVE MODEL NUMBER FOR WHICH LINK INFORMATION IS SET | DETERMINE BASED ON DRIVE MODEL NUMBER THAT ONLY MANUFACTURER WHICH SELLS THAT MODEL CAN USE SPECIFIC INFORMATION | • LINK INFORMATION CAN BE FLEXIBLY SET UP IN UNITS OF DRIVE MODELS<br>• A PLURALITY OF PIECES OF ID INFORMATION CAN BE ASSIGNED |

FIG. 14B

| NUMBER OF PIECES OF ID INFORMATION 2081 | ATTRIBUTE OF ID INFORMATION 2082 | VARIOUS EMBODIMENTS 2083 | DETAILED CONTENTS OF EMBODIMENTS 2084 | EFFECT OF EMBODIMENTS 2085 |
|---|---|---|---|---|
| COMBINE INDEPENDENT INFORMATION WITH INFORMATION IN RIGHT COLUMN 2092 | INFORMATION COMBINED WITH TIME INFORMATION 2097 | USE TIME (BCD FORMAT) 2036 WHEN DRIVE MANUFACTURER ID INFORMATION IS SET TOGETHER | DETERMINE MANUFACTURER THAT CAN USE SPECIFIC INFORMATION FROM TIME INFORMATION IN BCD FORMAT AND DRIVE MANUFACTURER ID INFORMATION | • ID DUPLICATION AMONG DIFFERENT DRIVE MANUFACTURERS CAN BE AVOIDED<br>• UNSUPPORTED MANUFACTURER RECOGNITION ERROR RATE CAN BE GREATLY REDUCED BY COMBINING TWO PIECES OF INFORMATION |
| | INFORMATION COMBINED WITH ADDITIONAL INFORMATION 2098 | USE ADDITIONAL INFORMATION 2037 SET BY DRIVE MANUFACTURER TOGETHER | DETERMINE MANUFACTURER THAT CAN USE SPECIFIC INFORMATION FROM ADDITIONAL INFORMATION AND DRIVE MANUFACTURER ID | |
| | INFORMATION COMBINED WITH PASSWORD 2099 | USE PASSWORD INFORMATION 2072 FOR SETTING SECURITY TOGETHER | DETERMINE MANUFACTURER THAT CAN USE SPECIFIC INFORMATION FROM PASSWORD AND DRIVE MANUFACTURER ID | |

FIG. 14C

| CATEGORY ID 2040 | LINK PATTERN 2041 | OUTLINE OF FUNCTION CONTENTS 2131 | RELEVANT OBJECT INFORMATION CONTENT RANGE 2132 | MANAGEMENT/CONTROL INFORMATION COMPLYING WITH STANDARDS OF LINKED OBJECTS 2133 | THIRD PARTY INFORMATION THAT CAN BE COMMONLY USED 2134 |
|---|---|---|---|---|---|
| 1 | A | SYSTEMATICALLY MANAGE INFORMATION RECORDED IN RECORDING MULTILAYERS | ALL | PGC_info. 1103 PGC_info. 1107 | COMPANIES B AND C |
| 2 | A | VIDEO RECORDING USING PROGRAM RESERVATION INFORMATION | ALL | ALL PIECES OF MANAGEMENT/ CONTROL INFORMATION | COMPANIES B AND C |
| 3 | A | SEARCH PROCESS USING QURRY INFORMATION | ALL | ALL PIECES OF MANAGEMENT/ CONTROL INFORMATION | COMPANY D |
| 4 | B | PLAY BACK/DISPLAY VIDEO/STILL PICTURE INFORMATION RECORDED IN DIFFERENT FORMAT | PTT 1408 | VOB_info. 1107 OBJECT 2007 | COMPANY B |
| 5 | B | VARIABLE SPEED PLAYBACK PROCESS | ALL | Cell_info. 1108 | COMPANY C |
| 6 | B | SIMULTANEOUSLY PLAY BACK/DISPLAY AFTER-RECORDED INFORMATION | ALL | Cell_info. 1108 | COMPANY A ONLY |

FIG. 18A

| CATEGORY ID 2040 | LINK PATTERN 2041 | OUTLINE OF FUNCTION CONTENTS 2131 | RELEVANT OBJECT INFORMATION CONTENT RANGE 2132 | MANAGEMENT/CONTROL INFORMATION COMPLYING WITH STANDARDS OF LINKED OBJECTS 2133 | THIRD PARTY INFORMATION THAT CAN BE COMMONLY USED 2134 |
|---|---|---|---|---|---|
| 7 | B | DISPLAY/OUTPUT SPECIAL EDIT VIDEO INFORMATION | PTT 1408 | Cell_info. 1108 | COMPANY B |
| 8 | C | CM/COMMENT AUTOMATIC INSERTION | PTT 1407 | Cell_info. 1108 | COMPANIES C AND D |
| 9 | D | ADD SECURITY FUNCTION | PTT 1407 | VOB_info. 1107 | COMPANY A ONLY |
| 10 | D | SIMULTANEOUS DISPLAY OF SMALL WINDOW | PTT 1407 | Cell_info. 1108 | COMPANY A ONLY |
| 11 | D | SET IMAGE QUALITY IMPROVING PARAMETER | ALL | VOB_info. 1107 | COMPANY D |
| 12 | D | SET USER RECORDING/ PLAYBACK LOCATION | ALL | Cell_info. 1108 | COMPANIES B AND C |

(A) EDIT CONTROL INFORMATION 1023

| EDIT HISTORY INFORMATION 2141 | LINK INFORMATION 2003 |
|---|---|

(B)

| DATE/TIME INFORMATION OF LATEST EDIT PROCESS 2144 | DATE/TIME INFORMATION OF SECOND LATEST EDIT PROCESS 2145 | DATE/TIME INFORMATION OF THIRD LATEST EDIT PROCESS 2146 | ... | INFORMATION PERTAINING TO DETAILED EDIT HISTORY CONTENTS 2149 |
|---|---|---|---|---|

| DESIGNATION LOCATION | SETTING METHOD OF DESIGNATION LOCATION | DESCRIPTION OF PRACTICAL METHOD | EFFECTS (MERITS) OF RESPECTIVE EMBODIMENTS |
|---|---|---|---|
| ARBITRARY LOCATION CAN BE DESIGNATED | DIRECTLY INSERT "POINTER INFORMATION" IN COMMON INFORMATION [A] | • DIRECTLY INSERT "POINTER INFORMATION" IN COMMON INFORMATION 2001<br>• DESCRIBE TAG INFORMATION AND POINTER SIZE INFORMATION AT HEAD POSITION OF POINTER INFORMATION TO AVOID CONFUSION WITH OTHER COMMON INFORMATION<br>• DESIGNATE ID (OR NUMBER) OF CORRESPONDING LINK INFORMATION IN POINTER INFORMATION | • ARBITRARY LOCATION AND RANGE IN COMMON INFORMATION 2001 CAN BE DESIGNATED<br>• SINCE POINTER INFORMATION SIZE IS SMALL, ENTIRE COMMON INFORMATION 2001 IS FREE FROM ANY LARGE INCREASE IN INFORMATION SIZE DUE TO INSERTION |

| DESIGNATION LOCATION | SETTING METHOD OF DESIGNATION LOCATION | DESCRIPTION OF PRACTICAL METHOD | EFFECTS (MERITS) OF RESPECTIVE EMBODIMENTS |
|---|---|---|---|
| ARBITRARY LOCATION CAN BE DESIGNATED | DIRECTLY INSERT "LINK INFORMATION" IN COMMON INFORMATION [B] | • DIRECTLY INSERT "LINK INFORMATION" IN COMMON INFORMATION 2001<br>• DESCRIBE TAG INFORMATION AND POINTER SIZE INFORMATION AT HEAD POSITION OF POINTER INFORMATION TO AVOID CONFUSION WITH OTHER COMMON INFORMATION<br>• DISTRIBUTE INDIVIDUAL LINK INFORMATION IN COMMON INFORMATION 2001 | • ARBITRARY LOCATION AND RANGE IN COMMON INFORMATION 2001 CAN BE DESIGNATED<br>• SINCE LINK INFORMATION CAN BE DIRECTLY PLAYED BACK IN COMMON INFORMATION 2001, QUICK ACCESS TO 2002 IS ACHIEVED |

FIG. 21B

| DESIGNATION LOCATION | SETTING METHOD OF DESIGNATION LOCATION | DESCRIPTION OF PRACTICAL METHOD | EFFECTS (MERITS) OF RESPECTIVE EMBODIMENTS |
|---|---|---|---|
| DESIGNATION LOCATION AND RANGE ARE LIMITED IN ADVANCE → VOB_Info, Cell_Info, PGC_Info, AND THE LIKE | ASSURE DESCRIPTION COLUMN FOR DESIGNATING LINK INFORMATION IN COMMON INFORMATION [C] | • ASSURE DESCRIPTION COLUMN INDICATING ID (OR NUMBER) OF LINK INFORMATION AT INFORMATION DESCRIPTION LOCATIONS PERTAINING TO CORRESPONDING VOBs, CELLS, PGCs IN VIDEO OBJECT INFORMATION 1107, PGC CONTROL INFORMATION 1103, AND CELL PLAYBACK INFORMATION 1108<br>• COLUMN HAS NO ENTRY IF LINK INFORMATION IS NOT DESIGNATED | • SINCE TAG INFORMATION AND SUBSEQUENT INFORMATION INSERTED IN COMMON INFORMATION 2001 NEED NOT BE SKIPPED, READ ERROR IN INFORMATION 2001 HARDLY OCCURS IN COMMON INFORMATION 2001 PLAYBACK APPARATUS WHICH DOES NOT USE LINK INFORMATION |

FIG. 21C

| DESIGNATION LOCATION | SETTING METHOD OF DESIGNATION LOCATION | DESCRIPTION OF PRACTICAL METHOD | EFFECTS (MERITS) OF RESPECTIVE EMBODIMENTS |
|---|---|---|---|
| DESIGNATION LOCATION AND RANGE ARE LIMITED IN ADVANCE → VOB_Info, Cell_Info, PGC_Info, AND THE LIKE | PROVIDE INFORMATION OF DESIGNATION LOCATION AND DESIGNATION RANGE IN COMMON INFORMATION TO LINK INFORMATION [D] | •CORRESPONDING DESIGNATION LOCATION AND DESIGNATION RANGE INFORMATION IN COMMON INFORMATION 2001 COMPLYING WITH STANDARDS ARE DESCRIBED IN LINK INFORMATION 2003, AS SHOWN IN FIG.13<br>•IN FIG.13, BY DESIGNATING PRIORITY ORDER, A PLURALITY OF PARALLEL LINKS CAN BE DESIGNATED FROM ONE LINK INFORMATION TO A PLURALITY OF LOCATIONS IN COMMON INFORMATION 2001<br>•THERE IS NO INFLUENCE ON CONTENTS OF COMMON INFORMATION 2001 IRRESPECTIVE OF PRESENCE/ABSENCE OF LINK INFORMATION 2003 AND SPECIFIC INFORMATION 2003 | •SINCE TAG INFORMATION AND SUBSEQUENT INFORMATION INSERTED IN COMMON INFORMATION 2001 NEED NOT BE SKIPPED, READ ERROR IN COMMON INFORMATION 2001 HARDLY OCCURS IN INFORMATION PLAYBACK APPARATUS WHICH DOES NOT USE LINK INFORMATION<br>•INFORMATION SIZE IN COMMON INFORMATION 2001 CAN BE MINIMIZED<br>•INFLUENCE ON INFORMATION PLAYBACK APPARATUS THAT DOES NOT USE LINK INFORMATION IS MINIMUM |

FIG.21D

| LINK INFORMATION ALLOCATION | DESCRIPTION OF DETAILED CONTENTS | RELATIONSHIP WITH METHOD OF SETTING DESIGNATION LOCATION IN COMMON INFORMATION (CORRESPONDING TO SYMBOLS IN FIG.21) | EFFECTS (MERITS) OF RESPECTIVE EMBODIMENTS |
|---|---|---|---|
| IN COMMON INFORMATION 2001 | ALLOCATE IN PORTION (E.G., IN EDIT CONTROL INFORMATION 1023 LIKE IN EMBODIMENT SHOWN IN FIG.19) OF COMMON INFORMATION 2001 | A,B,C,D | WHEN USER ERRONEOUSLY ERASE COMMON INFORMATION 2001, SINCE LINK INFORMATION IS ERASED TOGETHER, INFORMATION PLAYBACK APPARATUS HARDLY CAUSES OPERATION ERROR |

FIG.22A

| LINK INFORMATION ALLOCATION | DESCRIPTION OF DETAILED CONTENTS | RELATIONSHIP WITH METHOD OF SETTING DESIGNATION LOCATION IN COMMON INFORMATION (CORRESPONDING TO SYMBOLS IN FIG.21) | EFFECTS (MERITS) OF RESPECTIVE EMBODIMENTS |
|---|---|---|---|
| IN SPECIFIC INFORMATION 2002 | ALLOCATE IN PORTION OF SPECIFIC INFORMATION 2002 TOGETHER | A,C,D | WHEN USER ERRONEOUSLY ERASES SPECIFIC INFORMATION, SINCE LINK INFORMATION IS ERASED TOGETHER, INFORMATION PLAYBACK APPARATUS HARDLY CAUSES OPERATION ERROR |

FIG. 22B

| LINK INFORMATION ALLOCATION | DESCRIPTION OF DETAILED CONTENTS | | RELATIONSHIP WITH METHOD OF SETTING DESIGNATION LOCATION IN COMMON INFORMATION (CORRESPONDING TO SYMBOLS IN FIG.21) | EFFECTS (MERITS) OF RESPECTIVE EMBODIMENTS |
|---|---|---|---|---|
| ALLOCATE AT ORIGINAL LOCATION (DIFFERENT FROM COMMON INFORMATION 2001 AND SPECIFIC INFORMATION 2002) | ALLOCATE ALL PIECES OF LINK INFORMATION AT ONE LOCATION TOGETHER | | A,C,D | |
| | ALLOCATE LINK INFORMATION USED IN UNITS OF DRIVE MANUFACTURERS TOGETHER | | | LINK INFORMATION IS EASILY MANAGED IN UNITS OF MANUFACTURERS |

FIG.22C

| RBP | FIELD NAME | CONTENTS | NUMBER OF BYTES |
|---|---|---|---|
| 0 TO 31 | MNF_ID | MANUFACTURER ID | 32 BYTES |
| 32 TO 36 | REC_TM | TIME WHEN THIS MNFI WAS RECORDED | 5 BYTES |
| 37 TO – | MNFI_DT | MANUFACTURER'S INFORMATION DATA | VARIABLE LENGTH BYTES |
| TOTAL | | | 37+VARIABLE LENGTH BYTES |

= DRIVE MANUFACTURER ID INFORMATION 2035
= LAST RECORDING/CHANGE TIME (DATE) INFORMATION OF LINK INFORMATION 2061

FIG. 35

INFORMATION RECORDING MEDIUM, INFORMATION RECORDING METHOD AND APPARATUS, AND INFORMATION PLAYBACK METHOD AND APPARATUS

BACKGROUND OF THE INVENTION

The present invention relates to an information recording medium, the contents of which can be played back by a plurality of types of information playback apparatuses provided by different manufacturers or distributors. The present invention also relates to an information recording method and apparatus for recording information on such information recording medium. Furthermore, the present invention relates to an information playback method and apparatus for playing back information recorded on such information recording medium.

In recent years, optical discs as information recording media have been extensively studied and developed. Optical discs include a CD (Compact disc) that has prevailed, and a DVD (Digital Video disc) that has a large storage size. The DVD includes a DVD-Video that can record/play back video information. The formats of information recorded on information recording media such as a CD, DVD, and the like are specified by standards described in standard books. The manufacturers of information recording media record information formatted according to the standards on information recording media.

Information recording/playback apparatuses that record information on information recording media and play back information recorded on the information recording media are manufactured by a plurality of manufacturers. However, as described above, since information is recorded on the information recording medium according to the standards, similar playback results are obtained irrespective of the manufacturers of information recording/playback apparatuses. That is, information recording/playback apparatuses can neither differentiate functions nor provide their originality. As a result, the principle of competition of the manufacturers does not work in term of functions, and technical development in the DVD-Video market may be disturbed.

Since information is recorded on an information recording medium according to fixed standards, functions cannot be quickly expanded in correspondence with advances of technologies. That is, in order to add a new function to an information recording medium, the standards must be upgraded in correspondence with the new function to be added. However, since much time is required for upgrading the standards, it is hard to add new functions in quick response to the advances of technologies.

BRIEF SUMMARY OF THE INVENTION

The present invention has been made to solve the aforementioned problems, and has as its object to provide the following information recording medium, information recording method and apparatus, and information playback method and apparatus:

(1) an information recording medium which allows to achieve differentiation and originality of functions in units of models of information playback apparatuses provided by different manufacturers or distributors;

(2) an information recording method which records information on an information recording medium to be able to achieve differentiation and originality of functions in units of models of information playback apparatuses provided by different manufacturers or distributors;

(3) an information recording apparatus which records information on an information recording medium to be able to achieve differentiation and originality of functions in units of models of information playback apparatuses provided by different manufacturers or distributors;

(4) an information playback method which plays back information from an information recording medium on which information is recorded to be able to achieve differentiation and originality of functions in units of models of information playback apparatuses provided by different manufacturers or distributors;

(5) an information playback apparatus which plays back information from an information recording medium on which information is recorded to be able to achieve differentiation and originality of functions in units of models of information playback apparatuses provided by different manufacturers or distributors;

(6) an information recording medium which has a data structure with high expandability of functions;

(7) an information recording method which records a data structure with high expandability of functions on an information recording medium;

(8) an information recording apparatus which records a data structure with high expandability of functions on an information recording medium;

(9) an information playback method which plays back information from an information recording medium on which a data structure with high expandability of functions on an information recording medium is recorded; and

(10) an information playback apparatus which plays back information from an information recording medium on which a data structure with high expandability of functions on an information recording medium is recorded.

An information recording medium according to the present invention comprises a first area which records common information which can be commonly played back by a plurality of types of information playback apparatuses provided by different manufacturers or distributors and complies with common standards, a second area which records specific information which can be played back by only an information playback apparatus of a specific type provided by a specific manufacturer or distributor, and a third area which records link information indicating a link between the common information and specific information.

An information recording method according to the present invention comprises the steps of: recording common information which can be commonly played back by a plurality of types of information playback apparatuses provided by different manufacturers or distributors and complies with common standards; recording specific information which can be played back by only an information playback apparatus of a specific type provided by a specific manufacturer or distributor; and recording link information indicating a link between the common information and specific information.

An information recording apparatus according to the present invention comprises recording means for recording common information which can be commonly played back by a plurality of types of information playback apparatuses provided by different manufacturers or distributors and complies with common standards, recording specific information which can be played back by only an information playback apparatus of a specific type provided by a specific manufacturer or distributor, and recording link information indicating a link between the common information and specific information.

An information playback method according to the present invention comprises the step of: comparing ID information stored in an information playback apparatus side of a specific type provided by a specific manufacturer or distributor, and ID information played back from an information recording medium, and playing back specific information, which is recorded on the information recording medium and can be played back by only the information playback apparatus of the specific type, on the condition that the two pieces of ID information match each other.

An information playback apparatus according to the present invention comprises ID information storage means for storing ID information, and playback means for comparing the ID information stored in the storage means and ID information played back from an information recording medium, and playing back specific information, which is recorded on the information recording medium and can be played back by only an information playback apparatus of a specific type, on the condition that the two pieces of ID information match each other.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 4 is a view showing the recording locations of video objects along the sequence on the information recording medium;

FIG. 5 is a schematic view showing the data structure in an allocation map table;

FIGS. 9A to 9F are views for explaining the VOB sequence order according to VOBI;

FIGS. 13A to 13C are views showing the contents of one link information;

FIGS. 14A to 14C are views showing the contents that pertain to drive manufacturer ID information;

FIGS. 18A and 18B are views for explaining category IDs in company A;

FIG. 19 is views showing the internal data structure of edit control information;

FIGS. 21A to 21D are explanatory views of a method of setting a designated location in "common information complying with standards" corresponding to each link information;

FIGS. 22A to 22C are explanatory views of the allocation of link information;

FIG. 35 is a view showing the data structure of Manufacturer's Information #1 (MNFI#1).

DETAILED DESCRIPTION OF THE INVENTION

Preferred embodiments of the present invention will be described hereinafter with reference to the accompanying drawings.

[1] Outline of Data Structure on Information Storage Medium

The recording information contents (data structure) of information recorded on an information storage medium (Optical Disc or DVD_RTR disc 1001) that can record and play back video information and music information shown in FIG. 1A will be explained below.

Figure 1:
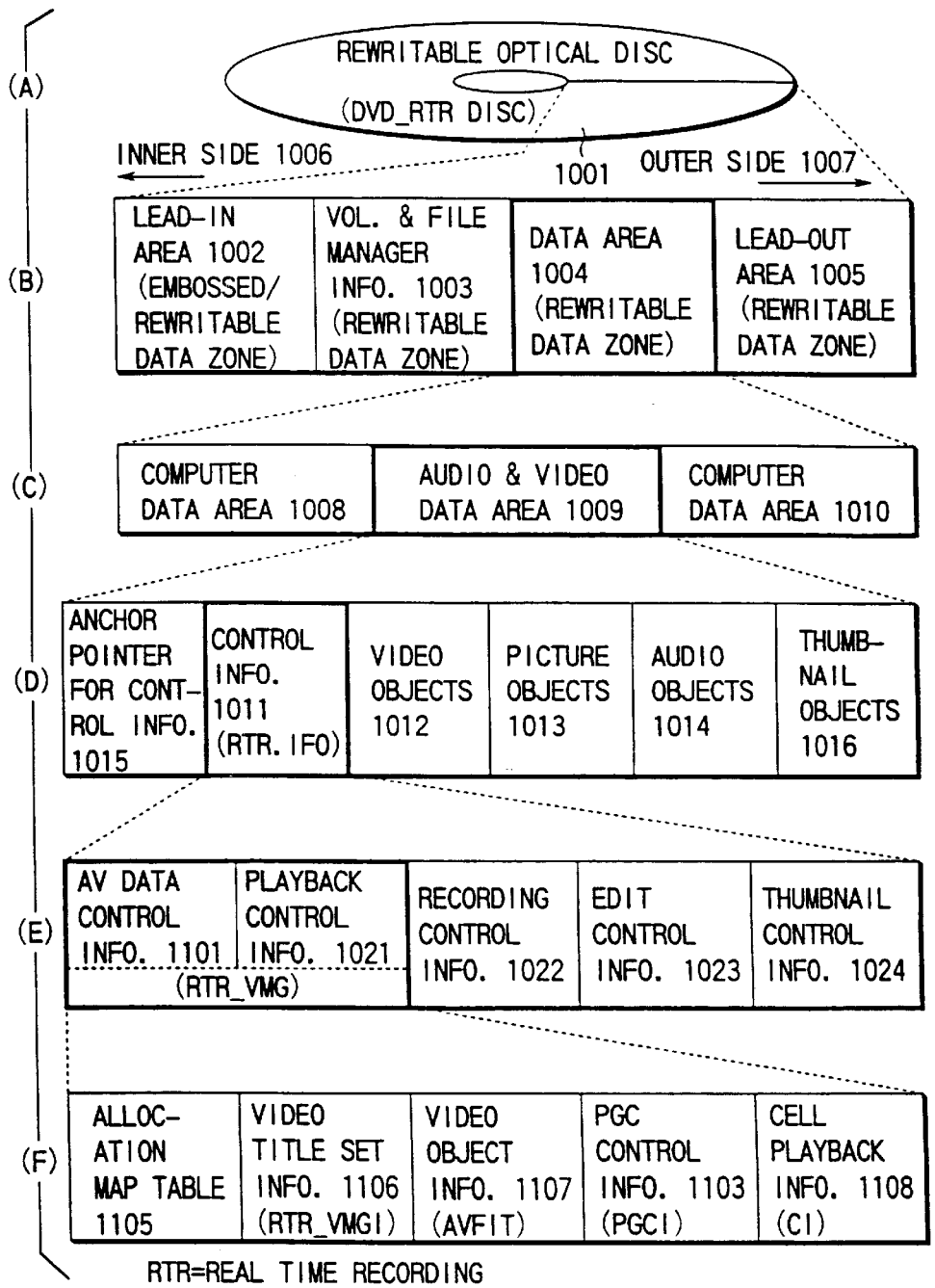
FIG. 1 is schematic views showing the data structure on an information recording medium capable of recording/playback.

The data structure of information recorded on the information storage medium (optical disc 1001) is roughly divided, in the order from inner side 1006 in FIG. 1B, into:

lead-in area 1002 having an embossed data zone whose light reflection surface has an embossed pattern, a mirror zone whose surface is flat (mirror surface), and a rewritable data zone capable of information rewriting;

volume & file manager information 1003 that records information which is recorded on a rewritable data zone which can be recorded/rewritten by the user, and pertains to the entire file or volume of audio & video data;

data area 1004 made up of a rewritable data zone that can be recorded/rewritten by the user; and lead-out area 1005 made up of a rewritable data zone capable of information rewriting.

The embossed data zone of lead-in area 1002 records in advance:

information such as the disc type indicating a DVD-ROM, DVD-RAM, DVD-R, or the like, disc size, recording density, physical sector numbers indicating the recording start/end positions, and the like, which pertain to the entire information storage medium;

information such as the recording power and width, erase power, playback power, and linear velocity upon recording and erasure, which pertain to the recording/playback/erasure characteristics; and information such as the manufacturing number and the like, which pertain to the manufacture of each information storage medium.

The rewritable data zone of each of lead-in and lead-out areas 1002 and 1005 has a unique disk name recording field for each information recording medium, a test recording field (for confirming recording/erasure conditions), and a management information recording field that pertains to a defective field in data area 1004, and an information recording/playback apparatus can record information on these fields.

Data area 1004 sandwiched between lead-in and lead-out areas 1002 and 1005 can record both computer data and audio & video data, as shown in FIG. 1C. The recording order, each recording information size, and the like of computer data and audio & video data can be arbitrarily determined. Locations where the computer data are recorded will be referred to as computer data areas 1008 and 1010, and a location where the audio & video data are recorded will be referred to as audio & video data area 1009 hereinafter.

As shown in FIG. 1D, the data structure of information recorded in audio & video data area 1009 contains:

anchor pointer for control information 1015: information indicating the start location (start address) where control information 1011 is recorded in audio & video data area 1009;

control information 1011: control information (corresponding to RTR.IFO shown in FIG. 2) required upon executing respective processes, i.e., video recording (audio recording), playback, editing, and search;

video objects 1012: video recording information of video data contents;

picture objects 1013: still picture information such as still pictures, slide pictures, and the like;

audio objects 1014: audio recording information of audio data contents;

thumbnail objects 1016: information such as thumbnails used upon searching for a location the user wants to watch or upon editing; and so on.

Video objects 1012, picture objects 1013, audio objects 1014, and thumbnail objects 1016 shown in FIG. 1D mean groups of information classified in units of contents (data contents). Hence, all pieces of video information recorded on audio & video data area 1009 are contained in video objects 1012, all pieces of still picture information are contained in picture objects 1013, all pieces of audio information are contained in audio objects 1014, and all pieces of thumbnail information used in video information management and search are contained in thumbnail objects 1016.

VOB (video object) 1403 shown in FIG. 3D (to be described later) indicates a cluster of information recorded in AV file (i.e., audio & video file) 1401, and has a definition different from that of video objects 1012 shown in FIG. 1D. Note that similar terms often have quite different meanings.

Furthermore, as shown in FIG. 1E, the contents of control information 1011 include:

AV data control information 1101: management information which manages the data structure in video object 1012 or manages information that pertains to the recording locations on optical disc 1001 as an information storage medium;

playback control information 1021: control information required upon playback;

recording control information 1022: control information required upon recording (video/audio recording);

edit control information 1023: control information required upon editing;

thumbnail control information 1024: management information that pertains to thumbnails (thumbnail object) used to search for a location the user wants to watch in video data or to edit; and the like.

Figure 2:
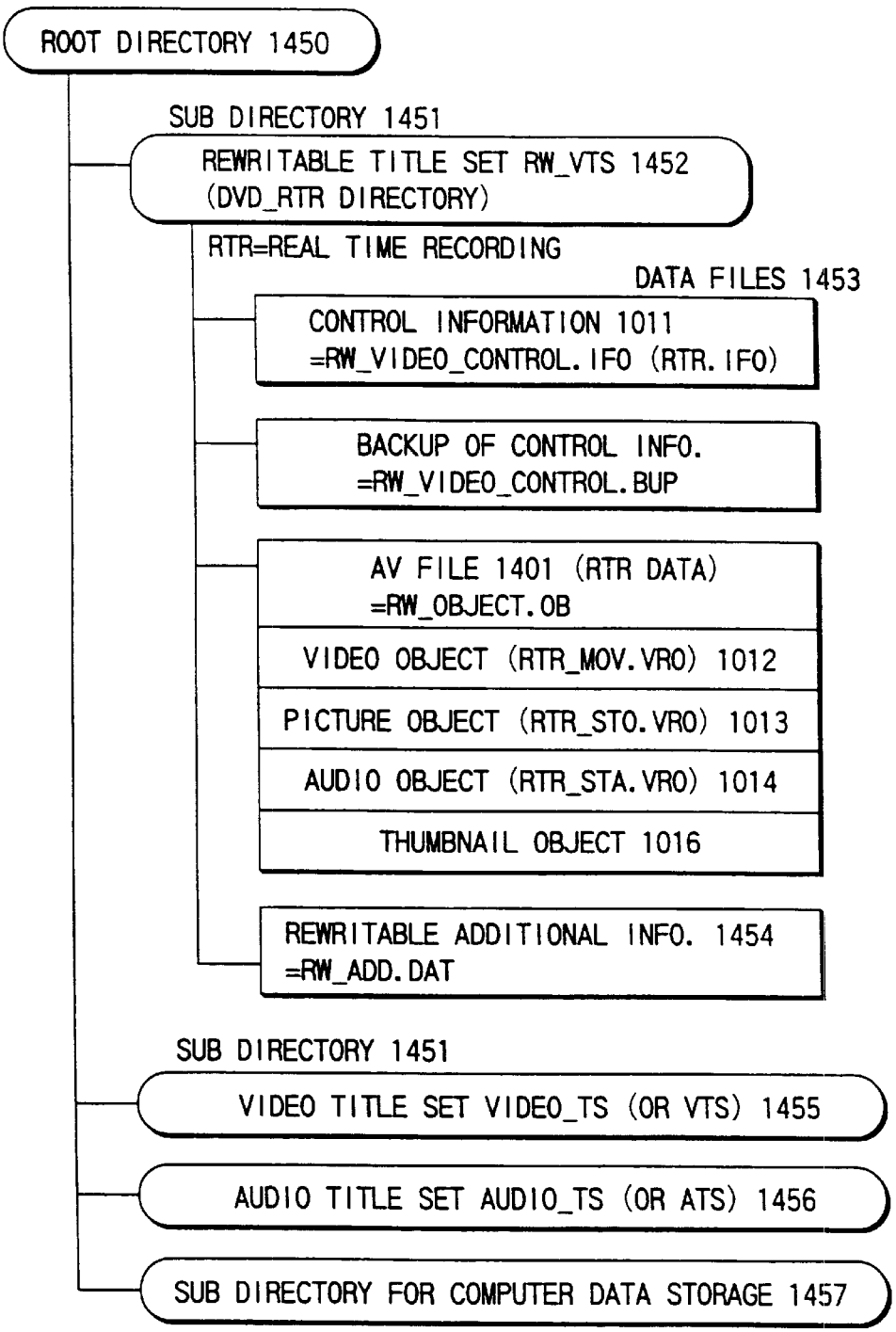
FIG. 2 is a schematic view showing the directory structure of data files stored in a data area.

Note that Control information 1101 and playback control information 1021 shown in FIG. 1E correspond to RTR.IFO shown in FIG. 2.

Figure 3:
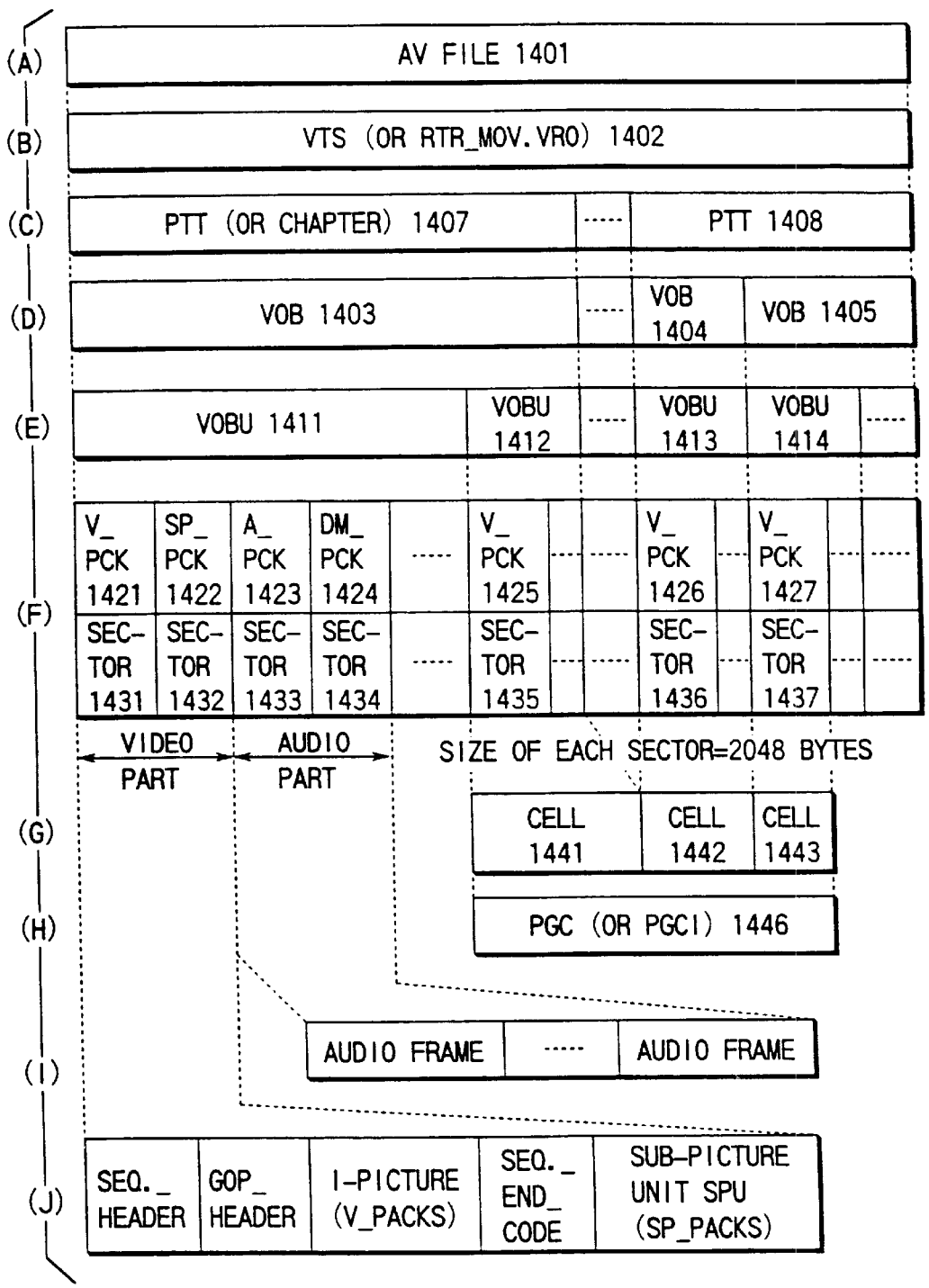
FIG. 3 is schematic views showing the data structure in an AV file recorded on the information recording medium.

As shown in FIG. 1F, the data structure in AV data control information 1101 shown in FIG. 1E is comprised of:

allocation map table 1105: information which pertains to address setups along the actual layout, identification of recorded/unrecorded areas, and the like on the information storage medium (optical disc 1001);

video title set information 1106: time information (corresponding to RTR_VMGI in FIG. 8) which indicates the overall information contents in AV file 1401 shown in FIG. 3A, and includes link information among VOBs, grouping information of a plurality of VOBs for management and search, a time map table, and the like;

video object information 1107: information (corresponding to M_AVFIT/S_AVFIT in FIG. 8) which indicates information pertaining to each VOB in AV file 1401, and pertains to attribute (characteristic) information in units of VOBUs, and each VOBU contained in the VOB;

PGC control information 1103: information that pertains to a video information playback program (sequence); and cell playback information 1108: information that pertains to the data structure of a basic video information unit upon playback.

The aforementioned contents are a brief explanation of the data structure shown in FIGS. 1A to 1F. Some additional explanations of each information will be given below.

Volume & file manager information 1003 records:

information that pertains to the entire volume;

the number of files of contained PC data, and the number of files associated with AV data;

information associated with recording layer information and the like.

Especially, as the recording layer information, information 1003 records:

the number of layers that form a disc (e.g., a single RAM/ROM two-layered disc has two layers, a single ROM two-layered disc also has two layers, and n single-sided discs are counted as n layers);

a logical sector number range table (capacity in units of layers) assigned in units of layers;

the characteristics (e.g., a DVD-RAM disc, a RAM section of a RAM/ROM two-layered disc, a CD-ROM, a CD-R, and the like) in units of layers;

an assigned logical sector number range table (including rewritable area capacity information of each area) in units of zones on a RAM area of each layer; and unique ID information of each layer (e.g., to find out a disc exchange event in a multi-disc pack). With this information, continuous logical sector numbers can be set even for a multi-disc pack or RAM/ROM two-layered disc to handle such discs or disc as a single, large volume space.

Playback control information 1021 records:

information that pertains to a playback sequence which combines PGCs;

information (a sequence for continuously playing back all recorded cells) indicating a pseudo recording location considering the information storage medium as a single tape like a VTR or DVC in relation to the above information;

information that pertains to simultaneous playback on a plurality of screens having different kinds of video information;

search information: information which records cell IDs corresponding to search categories, and a table of start times in a given cell, and allows the user to select and directly access the video information of interest; and the like.

Recording control information 1022 records:

program reservation recording information and the like.

Furthermore, edit control information 1023 records:

special edit information in units of PGCs (corresponding time setup information and special edit contents are described as EDL information); and file conversion information (which converts a specific field in an AV file into a file such as an AVI file that can undergo special editing on a PC, and designates the storage location of the converted file).

Thumbnail control information 1024 describes:

management information that pertains to thumbnail objects 1016 (designation information of the recording location of each thumbnail picture in audio & video data area 1009 and a VOB or cell associated with each thumbnail picture, location information in a VOB or cell associated with each thumbnail picture, and the like (the VOB and cell will be explained in detail later upon explaining the contents of FIGS. 3A to 3J)).

The directory structure of data files in the data area will be described below.

All pieces of information are recorded in units of files in data area 1004 in FIG. 1B, and the relationship among data files is managed by the directory structure shown in FIG. 2.

Referring to FIG. 2, a plurality of subdirectories 1451 are contained within root directory 1450 to allow easy classification in units of recorded file contents. In the embodiment shown in FIG. 2, data files that pertain to computer data recorded on computer data areas 1008 and 1010 shown in FIG. 1C are recorded under subdirectory 1457 for computer data storage, and audio & video data recorded on audio & video data area 1009 are recorded under rewritable video title set RW_VTS 1452. On the other hand, upon copying video information recorded on a DVD Video disc or (DVD Audio disc) to the disc shown in FIG. 1A, data are copied under video title set VIDEO_TS 1455, and audio title set AUDIO_TS 1456.

Control information 1011 in FIG. 1D is recorded as a single file for recording/playback video management data. In the embodiment in FIG. 2, that information has file name RW_VIDEO_CONTROL.IFO (or real time recording information; abbreviated as RTR.IFO). Furthermore, identical information is also recorded as backup information with file name RW_VIDEO_CONTROL.BUP.

In the embodiment shown in FIG. 2, all of video objects (RTR_MOV.VRO) 1012, picture objects (RTR_STO.VRO) 1013, audio objects (RTR_STA.VRO) 1014, and thumbnail objects 1016 are recorded as single AV file 1401 (the file name in the embodiment in FIG. 2 is RW_OBJECT.OB).

Rewritable additional information 1454 (not shown in FIGS. 1A to 1F) that can be used upon recording/playing back video information can be simultaneously recorded. That information is recorded as a single file, which has file name RW_ADD.DAT in the embodiment in FIG. 2.

FIGS. 3A to 3J show an example of the data structure in an AF file. As shown in FIG. 3B, entire AV file 1401 forms single VTS (video title set) (or RTR movie object RTR_MOV.VRO) 1402. VTS 1402 contains a group of a plurality of VOBs (video objects) 1403, 1404, and 1405, which are separated into a plurality of part_of_titles (or a plurality of chapters) 1407 and 1408 in accordance with the contents of audio & video data and the order of information recorded in AV file 1401.

VOBs 1403, 1404, and 1405 in FIG. 3D are defined as sets of audio & video data recorded in AV file 1401, and have definition contents different from video objects 1012 shown in FIG. 1D that primarily serve the purposes of classification items of video information/still picture information/audio information/thumbnail information and the like. Hence, VOBs 1403, 1404, and 1405 in FIG. 3D record not only information classified into video objects 1012, but also information classified into picture objects 1013, audio objects 1014, and thumbnail objects 1016.

Associated VOBs are grouped into a plurality of PTTs (part_of_titles or chapters) 1407 and 1408 based on information contents recorded in VOBs 1403, 1404, and 1405. That is, PTTs 1407 and 1408 are formed as sets of one or a plurality of VOBs. In the embodiment shown in FIG. 3C, PTT 1408 is formed by two VOBs, i.e., VOBs 1404 and 1405, and PTT 1407 is formed by one VOB 1403 alone.

Minimum basic units of video information are called VOBUs (video object units) 1411 to 1414, and data in VOBs 1403 to 1405 are formed as sets of VOBUs 1411 to 1414, as shown in FIG. 3E.

MPEG1 or MPEG2 is prevalently used as the video information compression technique in VOBs 1403 to 1405.

MPEG segments video information into groups called GOPs in 0.5-sec increments, and compresses video information in units of GOPs. Video information compression units of VOBUs 1411 to 1414 are formed to have nearly the same size as that of GOP in synchronism with GOP.

Furthermore, VOBUs 1411 to 1414 are recorded while being segmented into sectors 1431 to 1437 in units of 2,048 bytes. Sectors 1431 to 1437 record raw video information, sub-picture information, audio information, and dummy information in units of packs in the form of pack structures, i.e., V_PCKs (video packs) 1421, 1425, 1426, and 1427, SP_PCK (sub-picture pack) 1422, A_PCK (audio pack) 1423, and DM_PCK (dummy pack) 1424. Each dummy pack size is 2,048 bytes. However, since each pack has a 14-byte pack header at the start of it, the information size recorded in each pack is 2,034 bytes.

Note that DM_PCK (dummy pack) 1424 is inserted for the purposes of:

addition of information to be additionally recorded after video recording (for example, memo information indicating that after-recording information is inserted into an audio pack and replaced by a dummy pack is inserted in sub-picture information (a sub-picture pack) and is replaced by a dummy pack).

The recording area of a DVD-RAM (DVD_RTR) disc as an example of the information storage medium (optical disc 1001) shown in FIG. 1A is segmented into a plurality of sectors. 2,048-byte data can be recorded per sector. In this DVD-RAM disc, recording/playback is done in units of sectors (2,048 bytes). Hence, when a DVD-RAM disc is used as the information storage medium (optical disc 1001), the respective packs are recorded in units of sectors 1431 to 1437, as shown in FIG. 3F.

As shown in FIGS. 3B and 3D, VTS (video title set or RTR_MOV.VRO) 1402 is formed by a sequence of all VOBs 1403 to 1405 in AV file 1401. By contrast, a playback sequence described in playback control information (pack control information) 1021 can designate an arbitrary range in an arbitrary VOB, and can play it back in an arbitrary playback order.

Basic video information units upon playback are called cells 1441, 1442, and 1443. Each of cells 1441, 1442, and 1443 can designate an arbitrary range in an arbitrary VOB, but cannot make designation across a plurality of VOBs (one cell cannot set a range by linking a plurality of VOBS).

In the embodiment shown in FIG. 3G, cell 1441 designates one VOBU 1412 in VOB 1403, cell 1442 designates whole VOB 1404, and cell 1443 designates the range of only a specific pack (V_PCK 1427) in VOBU 1414.

Information indicating a video information playback sequence is set by PGC (program chain) 1446, and is described by designating a single cell or by link information of a plurality of cells. For example, in the embodiment shown in FIG. 3H, PGC (program chain) 1446 forms a playback program as a link of cells 1441, 1442, and 1443 (the relationship between the cell and PGC will be described in detail later).

VOBU 1403 in FIG. 3D can contain not only video information but also audio information. In this case, VOBU 1411 that forms VOB 1403 contains V_PCK 1421 and SP_PCK 1422 that construct a video part, and A_PCK 1423 and DM_PCK (for after recording) 1424 that construct an audio part.

The video part is formed by a sequence header and GOP header composed of some contents on the start side of V_PCK, MPEG I-picture composed of the contents of a V_PCK group, a sequence end code composed of some contents on the end side of V_PCK, and sub-picture unit SPU composed of the contents of SP_PCK.

The audio part contains audio data to be played back in synchronism with still picture playback using I-picture of the video part, and is comprised of one or more audio frames.

The contents of allocation map table 105 in FIG. 1F will be described below with reference to FIG. 4.

As described above, the recording area of the DVD-RAM disc is segmented into a plurality of sectors, and logical sector numbers (LSNS) are continuously assigned in ascending order from the inner side.

A case will be examined below wherein video information is recorded in data area 1004 of the information storage medium (optical disc 1001) in the following sequence.

1. An area for recording AV file 1401 is assured in a continuous area (a<g) from logical sector numbers (LSN) a+1 to g in data area 1004 on the information storage medium (optical disc 1001).

2. Data of VOB#1 1461 is recorded in a continuous area (b<c) from logical sector numbers (LSN) b+1 to c in the area for recording AV file 1401.

3. Data of VOB#2 1462 is recorded in a continuous area (d<e) from logical sector numbers (LSN) d+1 to e in the area for recording AV file 1401.

As a result of the above processes in 1. to 3., three unrecorded areas "from a+1 to b", "from c+1 to d", and "from e+1 to g" in logical sector numbers (LSN) remain in AV file 1401. When video information of VOB#3 with a large data size is recorded in these unrecorded areas, the following processes are required.

4. Data of VOB#3 is segmented into a plurality of data in correspondence with the unrecorded area sizes in the area for recording AV file 1401.

5. First segmented data 1463 of VOB#3 is recorded in a continuous area (a<b) from logical sector numbers (LSN) a+1 to b.

6. Next segmented data 1464 of VOB#3 is recorded in a continuous area (c<d) from logical sector numbers (LSN) c+1 to d.

7. Last segmented data 1465 of VOB#3 is recorded in a continuous area (f<g) from logical sector numbers (LSN) f+1 to g.

As a result, unrecorded area 1460 "from e+1 to f" in logical sector numbers (LSN) remains in AV file 1401. FIG. 4 shows the distribution of physical recorded positions of VOBS in AV file 1401 as a result of the above processes in 1. to 7.

As can be seen from the above description, when data in AV file 1401 is partially erased or when new data is additionally recorded in an unrecorded area in AV file 1401, single VOB data must be segmented and recorded at a plurality of locations like data 1463, 1464, and 1465 of VOB#3.

Allocation map table 1105 shown in FIG. 1F shows information indicating the distribution of physical positions of identical data distributed and recorded in AV file 1401 in units of VOBS. FIG. 5 shows the information contents of allocation map table 1105 taking the data allocation shown in FIG. 4 as an example. Allocation map table 1105 is comprised of distribution information 1621 of positions of unrecorded areas, and a plurality of pieces of distribution information 1622, 1623, and 1624 of positions of recorded data in units of VOBS.

A cluster of data units having continuous logical sector numbers in each VOB will be defined as an "extent". In the embodiment shown in FIG. 4, data of VOB#3 are recorded as three extents. In the above example, since an area from logical sector numbers a+1 to b has continuous logical sector numbers, this area forms "extent#γ 1473". That is, the recording positions of the data of VOB#3 are distributed to three locations, i.e., extent#γ 1473, extent#δ 1474, and extent#ε 1475.

The position distribution information that pertains to unrecorded areas or each VOB in allocation map table 1105 shown in FIG. 5 records the number 1601, 1602, 1603, or 1604 of extents at its first position. After that, first address 1606, 1607, 1608, 1609, 1610, or 1611 and size 1614, 1615, 1616, 1617, 1618, or 1619 of each extent are recorded. The first address is expressed by a "differential number" (or relative sector number) from the first logical sector number of AV file 1401. When each first address is expressed by a differential number, if the entire contents of AF file 1401 are transplanted to another information recording medium, information in allocation map table 1105 need not be changed, thus improving file portability. In FIG. 5, the extent size is expressed by the number of sectors. The extent size may be expressed by the last address of each extent in place of the number of sectors in FIG. 5.

In the DVD-RAM disc (DVD_RTR disc) format, information indicating a physical address on the information storage medium (optical disc 1001) is called a physical sector number (PSN), the entire address used by the file system is called a logical sector number (LSN), and an address defined on the file system in data area 1004 in FIG. 1A is called a logical block number (LBN), thus distinguishing PSN, LSN, and LBN from each other. However, if this convention is always observed, the description becomes complicated. For this reason, FIG. 5 uses an expression based on logical sector numbers (LSN) for the sake of easy understanding.

Figure 6:
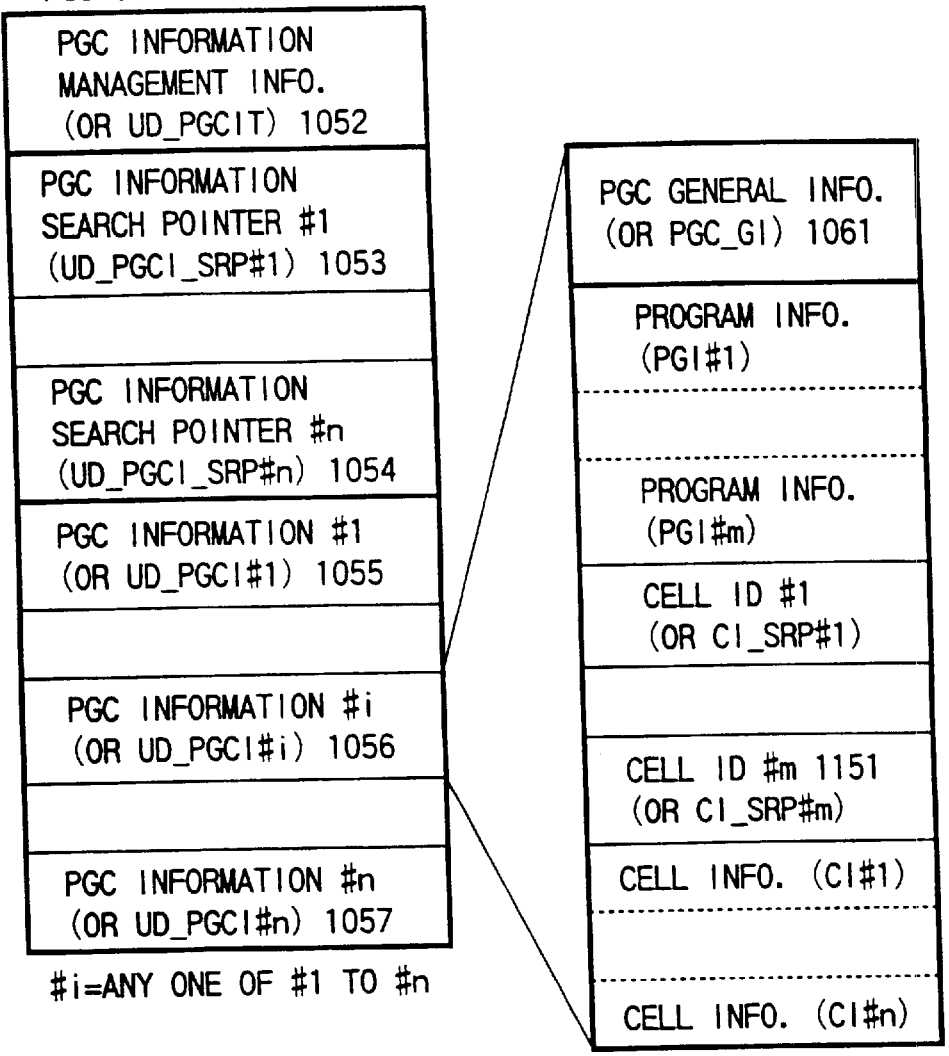
FIG. 6 is a schematic view showing the data structure in PGC control information.

The contents of playback control information 1021 will be described below with reference to FIGS. 6 to 7B. PGC (program chain) control information 1103 in playback control information 1021 has the data structure shown in FIG. 6, and the playback order is determined by PGC and cells. PGC is a unit that designates the playback order of cells and executes a given playback sequence. On the other hand, each cell indicates a playback period that designates playback data in each VOB by the start and end addresses, as shown in FIGS. 3D to 3F.

PGC control information 1103 is composed of PGC information management information 1052, one or more search pointers 1053 and 1054 of PGC information, and a plurality of pieces of PGC Information 1055, 1056, and 1057.

PGC information management information 1052 contains information (number of PGC information) indicating the number of PGCs. Each of search pointers 1053 and 1054 of PGC Information points to the first position of each PGC information, and allows an easy search. Each PGC information 1055, 1056, or 1057 consists of PGC general information 1061, one or more pieces of program information (PGI#m), one or more cell IDs (or CI_SRP#m), and one or more pieces of cell information (CI#m). PGC general information (PGC_GI) 1061 contains information (number of cell playback information) indicating the playback time of PGC and the number of cells. Or PGC_GI 1061 may contain information indicating the number of programs (PGs) and the number of search pointers (CI_SRP) of cell information.

Figures 7A, 7B:
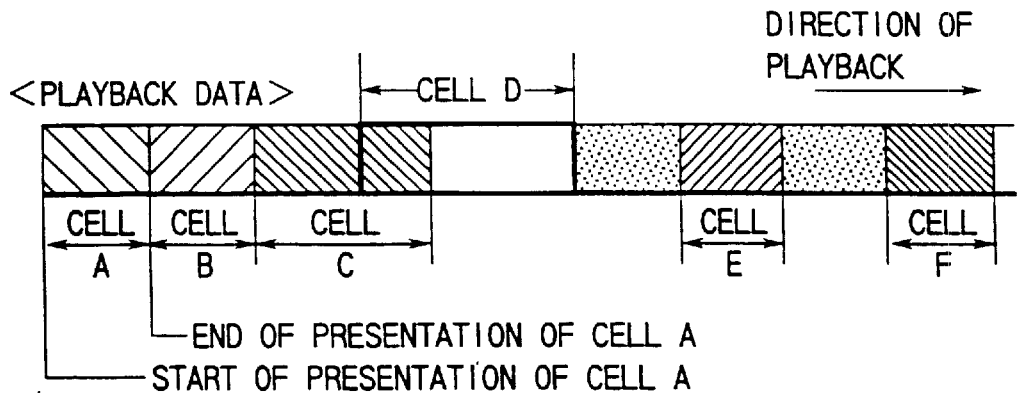
FIGS. 7A and 7B are views showing a playback example of video information using a PGC.

As shown in FIG. 7A, playback data are designated as a playback period in units of cells from cell-A to cell-F, and PGC information is defined in each PGC.

1. PGC#1 exemplifies a case wherein it is composed of cells that designate a continuous playback period, and its playback order is cell-A→cell-B→cell-C.

2. PGC#2 exemplifies a case wherein it is composed of cells that designate an intermittent playback period, and its playback order is cell-D→cell-E→cell-F.

3. PGC#3 exemplifies a case wherein playback can be done intermittently irrespective of the direction of playback or repetitive playback, and its playback order is cell-E→cell-A→cell-D→cell-B→cell-E.

Control information (RTR.IFO) 1011 shown in FIGS. 1D or 2 contains navigation data RTR_VMG (real time recording video manager) corresponding to control information 1101 and control information 1021, as shown in FIG. 1E. This RTR_VMG contains video title set information VTSI (or information RTR_VMGI of RTR_VMG) 1106, as shown in FIG. 1F.

This information (RTR_VMGI) 1106 contains information used upon playing back a sequence of VOBs 1403, 1404, 1405, . . . , shown in FIG. 3D.

The data structure and contents of RTR_VMG in FIG. 1E (or RTR.IFO in FIG. 2) will be explained below with reference to FIG. 8.

Figure 8:
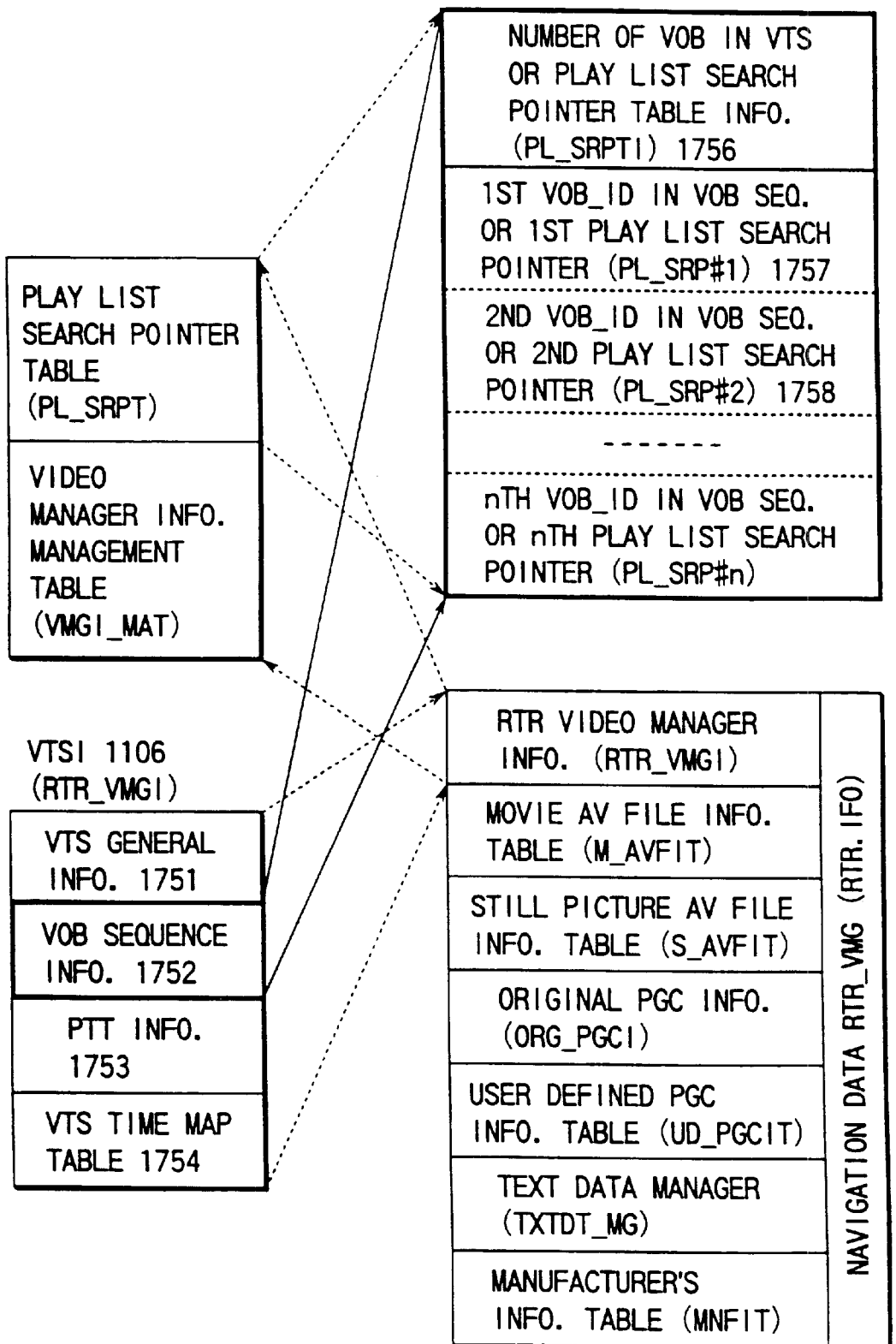
FIG. 8 is a schematic view showing the data structure in VTSI.

As shown in FIG. 8, navigation data RTR_VMG (control information RTR.IFO) is comprised of RTR video manager information (RTR_VMGI), a movie AV file information table (M_AVFIT), a still picture AV file information table (S_AVFIT), original PGC information (ORG_PGCI), a user-defined PGC information table (UD_PGCIT), a text data manager (TXTDT_MG), and a table (MNFIT) of information that pertains to the manufacturer.

RTR_VMGI contained in this RTR_VMG corresponds to video title set (VTS) information 1106 shown in FIG. 1F.

This information (RTR_VMGI) 1106 contains VTS general information 1751, VOB sequence information 1752, PTT information 1753, and VTS time map table 1754, as shown in FIG. 8.

Put otherwise, this information (RTR_VMGI) 1106 contains a play list search pointer table (PL_SRPT) corresponding to VOB sequence information 1752, and a video manager information management table (VMGI_MAT) corresponding to VTS general information 1751.

Table PL_SRPT contains information 1756 indicating the number of VOBs in VTS (or the number of play list search pointers and the end address of PL_SRPT), information 1757 indicating the ID of the first VOB in a VOB sequence (or first play list search pointer PL_SRP#1), information 1758 indicating the ID of the second VOB in the VOB sequence (or second play list search pointer PL_SRP#2), and the like.

Each play list search pointer (PL_SRP) contains information (PL_TY) indicating the type of a play list, PGC number information (PGCN) corresponding to this play list, information (PL_CREATE_TM) indicating the date of creation of this play list, information (PRM_TXTI) of primary text associated with this play list, number information (IT_TXTI_SRPN) of a search pointer of item text used in this play list, and thumbnail pointer information (THM_PTRI) indicating a thumbnail picture corresponding to the recording contents of this play list.

The table (PL_SRPT) that contains these pieces of information 1756, 1757, 1758, . . . corresponds to VOB sequence information 1752 contained in VTSI (RTR_VMGI) 1106.

The contents of VTSI (RTR_VMGI) 1106 can be summarized as follows.

That is, as shown in FIG. 8, the data structure in video title set information (or RTR_VMGI) 1106 records:

video title set general information 1751 . . . This information pertains to general contents of a video title set (or RTR data in AV file 1401 in FIG. 2);

video object sequence information 1752 . . . In the data structure shown in FIGS. 3A to 3J, serial numbers are set for all VOBs in video title set 1402 (=AV file 1401). This information describes serial number information of VOBs according to this sequence;

part_of_titles information 1753 . . . Object data recorded in AV file 1401 are grouped in units of associated data for the purpose of each data management and search, and video title names are set in units of groups. The group (part_of_title) is formed of a set of VOBs. This information describes VOB information contained in each part_of_title; and video title set time map table 1754 . . . This information pertains to VOBU position information at specific time intervals according to the video object sequence in relation to VOBs which are classified into video objects 1012 and audio objects 1014 in video title set 1402.

The detailed data structure in video object sequence information 1752 is shown on the right side in FIG. 8. That is, the total number 1756 of VOBs (or PL_SRPTI) contained in the video title set is recorded at the first position. After that, VOB_IDs (or PL_SRP#1, PL-SRP#2, . . . , PL_SRP#n) 1757, 1758, . . . corresponding to serial numbers are recorded in the sequence (video object sequence) order.

The sequence indicated by video object sequence information 1752 can be arbitrarily set by the user or information recording/playback apparatus side in, e.g., "the recording order to AV file 1401 (ascending order of recording time)", "the recording allocation order on the information storage medium (optical disc) shown in FIG. 4", "the VOB size order", and the like. By sequentially determining the order of all VOBS in VTS (video title set) 1402, a user interface similar to a VTR that records video data on a single table can be provided.

For example, the following processes can be done using video object sequence information 1752:

to search for a scene the user wants to watch by fast-forwarding (FF) or rewinding (FR) a tape;

to confirm the entire recording contents by fast-forwarding (FF) the tape; and to search for an unnecessary recorded scene by fast-forwarding (FF) or rewinding (FR) the tape, and to overwrite new video information on that scene.

The information contents of video object sequence information 1752 shown on the right side in FIG. 8 will be explained below with reference to FIGS. 9A to 9F. A case will be examined first wherein VOB#1 to VOB#3 are recorded to have the allocation order on the information storage medium (optical disc) shown in FIG. 4, and this recording is done in the order of 1. to 7. described in "description of allocation map table contents". FIG. 9C shows the sequence order which is set for these data in "the recording order to AV file 1401 (ascending order of recording time)". Compared to FIG. 4, the allocation order from extent#α 1471 to extent#ξ 1470 has changed. "First VOB_ID 1757 in the video object sequence" shown in FIG. 8 designates "VOB#1 1461" in FIG. 9C, and "second VOB_ID 1758 in the video object sequence" designates "VOB#2 1462" in FIG. 9C.

FIG. 9F shows another embodiment designated by video object sequence information 1752. VOB#A 1771 and VOB#B 1772 belong to (are classified to) video objects (movie VOB information M_VOBI#) 1012, VOB#C 1773, VOB#F 1776, and VOB#G 1777 to audio objects 1014, and VOB#D 1774 and VOB#E 1775 to picture objects (still picture VOB group information S_VOGI#) 1013. In this way, the sequence order can be designated independently of the VOB types. In FIG. 9F, VOBS (VOB#H 1778 and VOB#I 1779) that belong to thumbnail objects 1016 are set at the end of the sequence.

Figure 10:
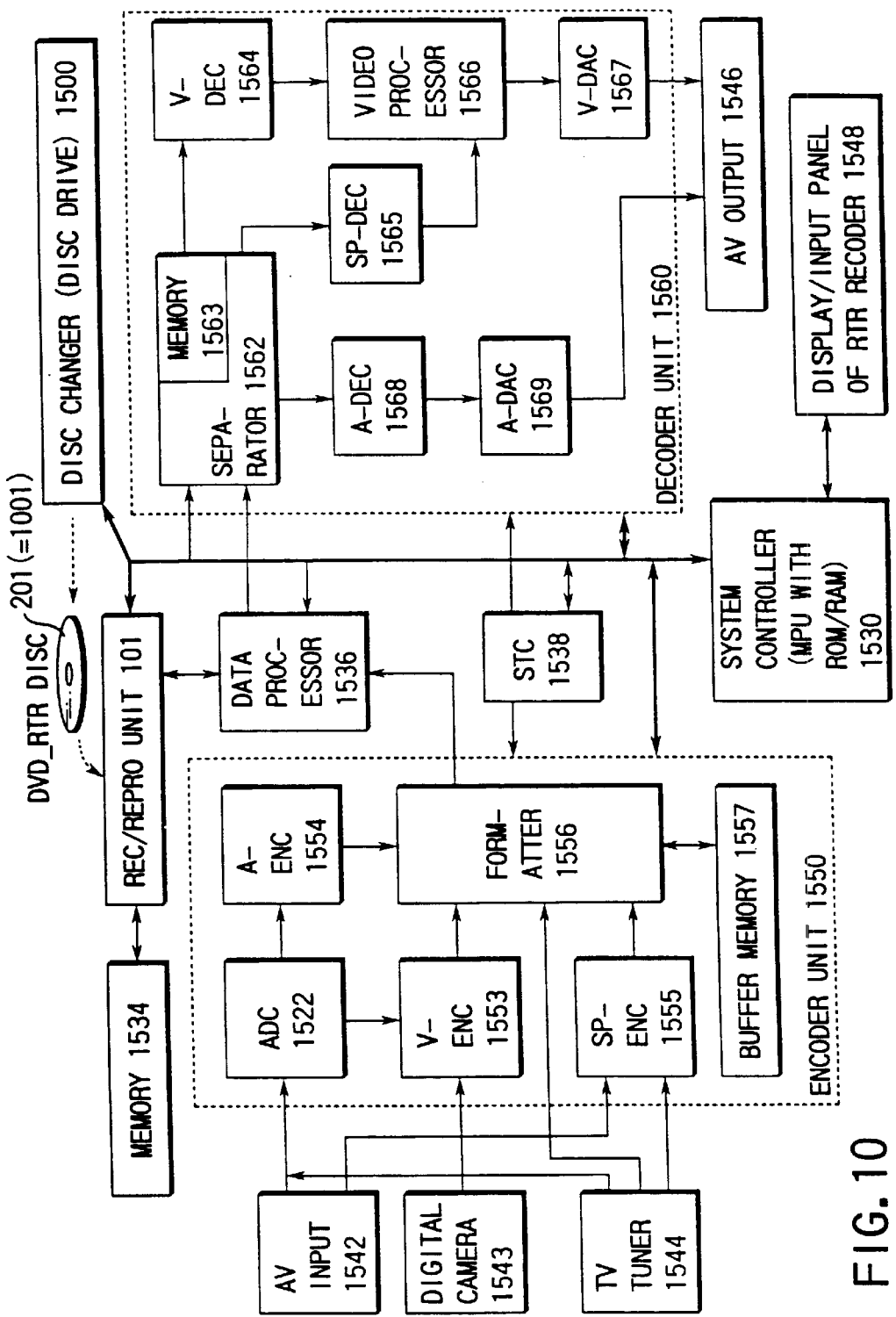
FIG. 10 is a schematic block diagram showing the arrangement of an information recording/playback apparatus.

FIG. 10 is a block diagram for explaining the arrangement in the RTR video recorder. In this specification, reference numerals are indicated within blocks to save space.

The apparatus main body of the video recorder shown in FIG. 10 is roughly comprised of disc changer (disc drive unit) 1500 for rotating one to be used of one or a plurality of information storage media (optical discs) 1001, and executing recording and playback of video information with respect to optical disc 1001, encoder unit 1550 that constructs the video recording side, decoder unit 1560 that constructs the playback side, and system controller (MPU) 1530 which incorporates a ROM and RAM (semiconductor memory), and controls the operations of the apparatus main body.

Encoder unit 1550 comprises ADC (analog-to-digital converter) 1552, video encoder (V encoder) 1553, audio encoder (A encoder 1554), sub-picture encoder (SP encoder) 1555, formatter 1556, and buffer memory 1557.

ADC 1552 receives an external analog video signal+external analog audio signal from AV input 1542, or analog TV signal+analog audio signal from TV tuner 1544. This ADC 1552 converts the input analog video signal into digital data at, e.g., a sampling frequency=13.5 MHz and the number of quantization bits=8. (More specifically, luminance component Y, color difference component Cr (or Y-R), and color difference component Cb (or Y-B) are respectively quantized by 8 bits.)

Likewise, ADC 1552 converts the input analog audio signal into digital data at, e.g., a sampling frequency=48 kHz and the number of quantization bits=16.

When an analog video signal and digital audio signal are input to ADC 1552, the digital audio signal passes through ADC 1552. (A process for reducing jitter superposed on a digital signal, a process for changing the sampling rate and the number of quantization bits, or the like without changing the contents of a digital audio signal may be done.)

When a digital video signal and digital audio signal are input to ADC 1552, these signals pass through ADC 1552 (for these digital signals, a jitter reduction process, sampling rate change process, or the like that do not change their contents may be done).

When still picture information sensed by digital camera 1543 is input in addition to the input video signals, it is directly input to V encoder 1553 without the intervention of ADC 1552.

A digital video signal component output from ADC 1552 is sent to formatter 1556 via video encoder (V encoder) 1553. A digital audio signal component output from ADC 1552 is sent to formatter 1556 via audio encoder (A encoder) 1554. Or a still picture signal directly input to V encoder 1553 is sent from V encoder 1553 to formatter 1556.

V encoder 1553 has a function of converting the input digital video signal into a digital signal compressed at variable bit rate on the basis of the MPEG2 or MPEG1 specifications.

In digital camera 1543, still picture information is recorded in the bitmap or JPEG format. By contrast, in the present invention, a still picture is recorded on optical disc 1001 in the I-picture format of MPEG2. For this purpose, in the present invention, V encoder 1553 has format conversion functions of "bitmap→MPEG2", "JPEG→MPEG2", and the like.

A encoder 1554 has a function of converting the input digital audio signal into a digital signal (or linear PCM digital signal) compressed at fixed bit rate on the basis of the MPEG or AC-3 specifications.

When a digital video signal (for example, a signal from a DVD video player with an independent output terminal of a sub-picture signal) is input from AV input 1542, or when a DVD video signal with such data structure is broadcasted and is received by TV tuner 1544, the sub-picture signal component (sub-picture pack) in the video signal is input to sub-picture encoder (SP encoder) 1555. Sub-picture data input to SP encoder 1555 is arranged into a predetermined signal format, and is then sent to formatter 1556.

Formatter 1556 executes predetermined signal processing of the input video signal, audio signal, sub-picture signal, and the like using buffer memory 1557 as a work area, and outputs recording data that matches a predetermined format (file structure) to data processor 1536.

In case of digital broadcast, a video signal is transmitted in the TS (transport stream) format of MPEG2. In general, when a video signal is recorded on information storage medium (optical disc) 1001 in the MPEG2 format, the PS (program stream) format is used. Hence, upon receiving digital broadcast, the received signal is directly sent from TV tuner 1544 to formatter 1556, which executes "TS→PS conversion".

Standard encode process contents for creating the recording data will be briefly explained below. More specifically, when encoder unit 1550 shown in FIG. 10 starts an encode process, parameters required for encoding video (main picture) data and audio data are set. Main picture data is pre-encoded using the set parameters, and optimal code amount distribution for the selected average transfer rate (recording rate) is calculated. Then, the main picture data is encoded based on the code amount distribution obtained by pre-encoding. At this time, audio data is encoded simultaneously.

As a result of pre-encoding, if it is determined that the data compression amount is insufficient (a desired video program cannot fall within information storage medium (optical disc) 1001 to be used), and pre-encoding can be re-done (if the source to be recorded is a source that can be repetitively played back such as a video tape, video disc, or the like), main picture data is partially re-encoded, and the previously pre-encoded main picture data portion is replaced by the re-encoded main picture data portion. With a series of processes described above, the main picture and audio data are encoded, and the average bit rate value required for recording can be greatly reduced.

Likewise, parameters required for encoding sub-picture data are set, and encoded sub-picture data is generated.

The encoded main picture, audio, and sub-picture data are combined, and are converted into the data structure of desired video objects.

More specifically, a cell as a minimum unit of main picture data (video data) is set, the configuration of cells that form a program chain, attributes of the main picture, sub-picture, and audio data, and the like are set (some of such attribute data use information obtained upon encoding the respective data), and management information that contains various kinds of information which pertain to cells is recorded in the management information recording area (control information 1011 in FIG. 1D or RTR.IFO in FIG. 2).

The encoded main picture, audio, and sub-picture data are segmented into packs each having a predetermined size (2,048 bytes). Dummy packs that can be used in, e.g., after recording, are inserted into these packs as needed. Note that time stamps such as PTS (presentation time stamp), DTS (decode time stamp), and the like are described in packs other than dummy packs, as needed. As for PTS of sub-picture data, a time arbitrarily delayed from PTS of main picture data or audio data in the identical playback time band can be described.

Data cells are arranged in units of VOBUs to allow playback in the time code order of data, thus forming a VOB consisting of a plurality of cells.

Upon digitally copying video information from the digital output of the RTR video recorder shown in FIG. 10, since the contents of the cells, program chains, management tables, time stamps, and the like are determined in advance, they need not be created again.

The arrangement for reading/writing (recording and/or playing back) information from/to optical disc 1001 comprises disc drive unit (disc changer) 1500, information recording/reproducing unit 101, memory 1534, data processor 1536, and system time counter (or system time clock; STC) 1538.

Memory 1534 is used to buffer a given amount of data to be written on optical disc 1001 (data output from encoder unit 1550) via information recording/reproducing unit 101, and to buffer a given amount of data played back from optical disc 1001 (data input to decoder unit 1560) via information recording/reproducing unit 101.

For example, when memory 1534 comprises a 4-Mbyte semiconductor memory (DRAM), it can buffer recording or playback data for approximately 8 seconds at an average recording rate of 4 Mbps. When memory 1534 comprises a 16-Mbyte EEPROM (flash memory), it can buffer recording or playback data for approximately 30 seconds at an average recording rate of 4 Mbps. Furthermore, when memory 1534 comprises a 100-Mbyte, very small HDD (hard disc drive), it can buffer recording or playback data for 3 minutes or more at an average recording rate of 4 Mbps.

Also, memory 1534 can also be used to temporarily store recording information when optical disc 1001 is used up during video recording, until optical disc 1001 is exchanged by a new disc.

When information recording/reproducing unit 101 uses a high-speed recording/reproducing unit having a speed equal to or higher than double speeds, memory 1534 can also be used to store readout data exceeding a normal amount read out from the drive per unit time. When memory 1534 buffers readout data upon playback, even when an optical head (not shown) has caused read errors due to vibration shock or the like, playback data buffered by memory 1534 can be used instead, thus preventing a playback image from being discontinued.

If an external card slot (not shown in FIG. 10) is provided to the RTR video recorder, the EEPROM can be offered as an option IC card. On the other hand, if an external drive slot or SCSI interface is provided to the RTR video recorder, the HDD can be offered as an option extension drive.

When a personal computer is used as a DVD video recorder by software, the free area of a hard disc drive or main memory of the personal computer itself can be used as memory 1534 shown in FIG. 10.

Under the control of system controller (MPU) [incorporating the ROM and RAM] 1530, data processor 1536 shown in FIG. 10 performs:

supply of a video information signal to be recorded from encoder unit 1550 to information recording/ reproducing unit 101;

transfer of a video information signal played back by information recording/reproducing unit 101 to another unit;

rewrite of management information (control information 1011) recorded on information storage medium (optical disc) 1001;

partial deletion of video information and management information (control information 1011 or RTR.IFO or RTR_VMG) as data recorded on information storage medium (optical disc) 1001; and the like.

System controller 1530 includes an MPU (or CPU), a ROM as an IC memory written with control programs and the like, and a RAM as an IC memory that provides a work area required for executing programs.

Of the execution results of system controller 1530, the contents the user of the RTR video recorder should know are displayed on display/input panel 1548 of the RTR video recorder.

Note that the control timings of disc changer 1500, information recording/reproducing unit 101, data processor 1536, and encoder unit 1550 and/or decoder unit 1560 by system controller (MPU) 1530 can be determined based on time data supplied from STC 1538 (video recording/playback are normally executed in synchronism with time clocks from STC 1538, but other processes may be executed at timings independently of STC 1538).

Decoder unit 1560 comprises separator 1562 for separating the respective packs from video information with the pack structure recorded on optical disc 1001, memory 1563 used upon executing pack separation and other signal processes, video decoder (V decoder) 1564 for decoding main picture data (the contents of video packs) separated by separator 1562, sub-picture decoder (SP decoder) 1565 for decoding sub-picture data (the contents of sub-picture packs) separated by separator 1562, audio decoder (A decoder) 1568 for decoding audio data (the contents of audio packs) separated by separator 1562, video processor 1566 for appropriately mixing sub-picture data from SP decoder 1565 with video data output from V decoder 1564, i.e., superposing sub-picture data such as menus, highlight buttons, superimposed dialogs, and the like on main picture data, and outputting them, video digital-to-analog converter (V•DAC) 1567 for converting the digital video output from video processor 1565 into an analog video signal, and audio digital-to-analog converter (A•DAC) 1569 for converting the digital audio output from A decoder 1568 into an analog audio signal.

The analog video signal (analog video information signal) output from V•DAC 1567, and the analog audio signal output from A•DAC 1569 are supplied to an external component (not shown; a multi-channel stereo system having two to six channels+monitor TV or projector) via AV output 1546.

OSD (On Screen Display) data output from system controller (MPU) 1530 is input to separator 1562 in decoder unit 1560, and is then input to video processor 1566 via V decoder 1564 (not decoded). The OSD data is superimposed on main picture data, and they are supplied to an external monitor TV connected to AV output 1546. Thus, a warning message is displayed together with main picture data.

The internal structure of information recording/reproducing unit (physical system block) 101 will be explained below with reference to FIG. 11.

<A> Functions of Information Recording/Reproducing Unit
<A-1> Basic Function of Information Recording/Reproducing Unit The information recording/reproducing unit executes:
- a process for recording new information or rewriting information (including erasure of information) using a focused beam spot on a predetermined position on information recording medium (optical disc 1001) 201; and
- a process for reproducing (playing back) already recorded information using a focused beam spot from a predetermined position on information recording medium (optical disc 1001) 201.

<A-2> Basic Function Implementation Means of Information Recording/Reproducing Unit As means for implementing the aforementioned basic functions, the information recording/reproducing unit executes:
- a process for tracing (tracking) a focused beam spot along a track (not shown) on information recording medium 201;
- a process for switching information recording/reproducing/erasing modes by changing the limit amount of a focused beam spot with which information recording medium 201 is irradiated; and
- a process for converting externally input recording signal d into an optimal signal to attain high-density recording at the low error rate.

<B> Mechanical Structure and Operations of Detection Section
<B-1> Basic Structure of Optical Head 202 and Signal Detection Circuit
<B-1-1> Signal Detection by Optical Head 202

Optical head 202 is basically constructed by a semiconductor laser element serving as a light source, photodetector, and objective lens (none of them are shown).

A laser beam emitted by the semiconductor laser element is focused on information recording medium (optical disc) 201 by the objective lens. The laser beam reflected by a light reflecting film or light reflective recording film of information recording medium (optical disc) 201 is photoelectrically converted by the photodetector.

A detection current obtained by the photodetector is current-voltage-converted into a detection signal by amplifier 213. This detection signal is processed by focus/track error detection circuit 217 or binarization circuit 212. In general, the photodetector is divided into a plurality of photodetection areas, and individually detects changes in amount of light on the respective photodetection areas. These detection signals undergo arithmetic operations of sums and differences in focus/track error detection circuit 217 to detect focus and track errors. A change in amount of light reflected by the light reflecting film or light reflective recording film of information recording medium (optical disc) 201 is detected to reproduce a signal on information recording medium 201.

<B-1-2> Focus Error Detection Method

As a method of optically detecting the focus error amount, one of the following methods is often used:

Astigmatism method: An optical element (not shown) for producing astigmatism is placed in a detection circuit for detecting a laser beam reflected by the light reflecting film or light reflective recording film of information recording medium (optical disc) 201, and a change in shape of the laser beam with which the photodetector is irradiated is detected. A photodetection region is diagonally divided into four areas. Focus/track error detection circuit 217 calculates the difference between diagonal sums of detection signals obtained from the respective detection areas, thus obtaining a focus error detection signal.

Knife edge method: A knife edge for asymmetrically intercepting some beam components of a laser beam reflected by information recording medium 201 is placed. A photodetection region is divided into two areas, and the difference between detection signals obtained from these detection areas is calculated to obtain a focus error detection signal.

<B-1-3> Track Error Detection Method

Information recording medium (optical disc) 201 has a spiral or concentric track, on which information is recorded. Information is reproduced or recorded/erased by tracing a focused beam spot along the track. In order to stably trace the focused beam spot along the track, a relative positional displacement between the track and focused beam spot must be detected. As the track error detection method, the following methods or the like are normally used:

DPD (Differential Phase Detection) method: A change in intensity distribution of a laser beam reflected by the light reflecting film or light reflective recording film of information recording medium (optical disc) 201 on the photodetector is detected. A photodetection region is diagonally divided into four areas. Focus/track error detection circuit 217 calculates the difference between diagonal sums of detection signals obtained from the respective detection areas, thus obtaining a track error detection signal.

Push-Pull method: A change in intensity distribution of a laser beam reflected by information recording medium (optical disc) 201 on the photodetector is detected. A photodetection region is divided into two areas, and the difference between detection signals obtained from these detection areas is calculated to obtain a track error detection signal.

Twin-Spot Method: A diffraction element or the like is inserted in a light transmission system between the semiconductor laser element and information recording medium 201 to wavefront-split light into a plurality of light components, and changes in amount of reflected light of ±1st-order diffracted light components with which information recording medium 201 is irradiated are detected. Photodetection areas for respectively detecting the amount of reflected light of +1st-order diffracted light and that of −1st-order diffracted light are placed independently of the photodetection region for detecting a reproducing signal, and the difference between detection signals from these areas is calculated to obtain a track error signal.

<B-1-4> Objective Lens Actuator Structure

The objective lens (not shown) for focusing a laser beam emitted by the semiconductor laser element on information recording medium 201 is movable in two axial directions in accordance with an output current from objective lens actuator drive circuit 218. The objective lens moves in:

a direction perpendicular to information recording medium 201 to correct focus errors; and the radial direction of information recording medium 201 to correct track errors.

As prevalent objective lens actuator structures, the following schemes are used:

Shaft slide scheme: A blade integrally formed on the objective lens moves along a central shaft. Upon moving the blade along the central shaft, focus errors are corrected; upon rotating the blade about the central shaft, track errors are corrected.

4-wire scheme: A blade integrally formed on the objective lens is coupled to a stationary system via four wires, and moves in two axial directions using elastic deformations of wires.

In either method, permanent magnets and coils are used, and the blade moves by supplying a current to the coil coupled to the blade.

<B-2> Rotation Control System of Information Recording Medium 201

Information recording medium (optical disc) 201 is mounted on turntable 221 that rotates by the driving force of spindle motor 204.

The rotational speed of information recording medium 201 is detected based on a reproduced signal obtained from information recording medium 201. More specifically, the detection signal (analog signal) output from amplifier 213 is converted into a digital signal by binarization circuit 212, and PLL circuit 211 generates a constant period signal (reference clock signal) based on that digital signal. Information recording medium rotational speed detection circuit 214 detects the rotational speed of information recording medium 201 using this clock signal, and outputs the detected speed.

A correspondence table that stores the information recording medium rotational speeds in correspondence with radial positions where information is reproduced or recorded/erased on information recording medium 201 is recorded in advance in semiconductor memory 219. Upon determining the reproducing or recording/erasing position, controller 220 sets a target rotational speed of information recording medium 201 by looking up information in semiconductor memory 219, and informs spindle motor drive circuit 215 of that value.

Spindle motor drive circuit 215 detects the difference between this target rotational speed and the output signal (current rotational speed) of information recording medium rotational speed detection circuit 214, and supplies a drive current corresponding to this detection result to spindle motor 204 to control its rotational speed to be constant. The output signal from information recording medium rotational speed detection circuit 214 is a pulse signal having frequency corresponding to the rotational speed of information recording medium 201, and spindle motor drive circuit 215 controls both the frequency and pulse phase of this signal.

<B-3> Optical Head Moving Mechanism

Optical head moving mechanism (feed motor) 203 for moving optical head 202 in the radial direction of information recording medium 201 is provided.

As a guide mechanism for moving optical head 202, a rod-like guide shaft is often used. Optical head 202 moves using friction produced between this guide shaft and a bushing attached to a portion of optical head 202. Also, a method using a bearing that reduces the frictional force using rotation may be used.

In the driving force transmission method for moving optical head 202, a rotation motor (not shown) with a pinion (rotation gear) is inserted in a stationary system, and a rack as a linear gear that meshes with the pinion is placed on the side surfaces of optical head 202, thereby converting rotation of the rotation motor into rectilinear motion of optical head 202. As another driving force transmission method, a linear motor scheme which inserts a permanent magnet in the stationary system, and rectilinearly moves optical head 202 by supplying a current to a coil set on optical head 202 may be used.

In either of the rotation or rectilinear motor scheme, basically, a current is supplied to the feed motor to generate a driving force for moving optical head 202. This driving current is supplied from feed motor drive circuit 216.

<C> Functions of Control Circuits

<C-1> Focused Beam Spot Trace Control

In order to correct focus or track errors, a circuit for supplying the driving current to an objective lens actuator (not shown) in optical head 202 in accordance with the output signal (detection signal) from focus/track error detection circuit 217 is objective lens actuator drive circuit 218. Circuit 218 includes a phase compensation circuit for improving characteristics in correspondence with the frequency characteristics of the objective lens actuator so as to attain high-speed response of objective lens movement up to a higher frequency region.

Objective lens actuator drive circuit 218 executes in accordance with a command from controller 220:

an ON/OFF process of focus/track error correction (focus/track loop);

a process for moving the objective lens in the direction (focus detection) perpendicular to information recording medium 201 at low speed (executed when focus/track loop=OFF); and a process of moving a focused beam spot to a neighboring track position by slightly moving it in the radial direction (a direction across the track) of information recording medium 201 using kick pulses.

<C-2> Laser Light Amount Control

<C-2-1> Switch Process between Reproduction and Recording/Erasure

Reproduction and recording/erasure are switched by changing the amount of light of a focused beam spot with which information recording medium 201 is irradiated.

The following relation generally holds for an information recording medium using the phase change scheme:

[light amount upon recording]>[light amount upon erasing]>[light amount upon reproducing]

and, the following relation generally holds for an information recording medium using a magneto-optical scheme:

[light amount upon recording]≈[light amount upon erasing]>[light amount upon reproducing]

In case of the magneto-optical scheme, recording and erasure processes are controlled by changing the polarity of an external magnetic field (not shown) applied to information recording medium 201 upon recording/erasing.

Upon reproducing information, information recording medium 201 is continuously irradiated with light of a given amount.

When new information is recorded, light pulses of a given amount are intermittently superposed on the light upon reproducing. When the semiconductor laser element emits light pulses in a large amount, light reflective recording film of information recording medium 201 locally changes optically or in shape, thus forming a recording mark. When information is overwritten on a region where information has already been recorded, the semiconductor laser element emits light pulses.

When already recorded information is erased, the information recording medium is continuously irradiated with light in a given amount larger than that upon reproducing. Upon continuously erasing information, the amount of light to be irradiated is reset to that upon recording at specific periods, e.g., in units of sectors, so as to intermittently reproduce information parallel to the erasure process. That is, the erasure process is done by intermittently reproducing the track number and address of a track to be erased, and confirming if an error occurs in the erased track.

<C-2-2> Laser Emission Control

Optical head 202 incorporates a photodetector (not shown) for detecting the amount of light emitted by the semiconductor laser element. Semiconductor laser drive circuit 205 detects any difference between the output (the detection signal of the amount of light emitted by the semiconductor laser element) from that photodetector and an emission reference signal supplied from recording/reproducing/erasing control waveform generation circuit 206, and feeds back a driving current to the semiconductor laser on the basis of the difference.

<D> Operations Pertaining to Control System for Mechanism

<D-1> Start-Up Control

When information recording medium (optical disc) 201 is set on turntable 221 and start-up control is started, processes are done according to the following procedure.

(1) Controller 220 informs spindle motor drive circuit 215 of a target rotational speed, and spindle motor drive circuit 215 supplies a driving current to spindle motor 204, thus initiating rotation of spindle motor 204.

(2) At the same time, controller 220 issues a command (execution command) to feed motor drive circuit 216, which supplies a driving current to optical head drive mechanism (feed motor) 203 to move optical head 202 to the innermost peripheral position of information recording medium 201. It is confirmed if optical head 202 has reached an inner peripheral position beyond a region of information recording medium 201 where information has been recorded.

(3) When spindle motor 204 has reached the target rotational speed, that status (status report) is sent to controller 220.

(4) Semiconductor laser drive circuit 205 supplies a current to the semiconductor laser element in optical head 202 in correspondence with a reproducing light amount signal sent from controller 220 to recording/reproducing/erasing control waveform generation circuit 206, thus starting laser emission.

*The optimal amount of light upon reproducing varies depending on the type of information recording medium (optical disc) 201. Upon starting up, the lowest amount of light is set.

(5) Objective lens actuator drive circuit 218 controls to retract the objective lens (not shown) in optical head 202 to a position farthest from information recording medium 201 and to make the objective lens slowly approach information recording medium 201 in accordance with a command from controller 220.

(6) At the same time, focus/track error detection circuit 217 monitors the focus error amount, and sends status to controller 220 when the objective lens has reached the vicinity of an in-focus position.

(7) Upon receiving the status, controller 220 sends a command to objective lens actuator drive circuit 218 to turn on the focus loop.

(8) Controller 220 sends a command to feed motor drive circuit 216 while the focus loop is kept ON, thus slowly moving optical head 202 toward the outer periphery of information recording medium 201.

(9) At the same time, controller 220 monitors a reproduced signal from optical head 202. When optical head 202 has reached the recording region on information recording medium 201, controller 220 stops movement of optical head 202, and sends a command to objective lens actuator drive circuit 218 to turn on the track loop.

(10) An "optimal amount of light upon reproducing" and "optimal amount of light upon recording/erasing" recorded on the inner peripheral portion of information recording medium (optical disc) 201 are reproduced, and that information is recorded on semiconductor memory 219 via controller 220.

(11) Furthermore, controller 220 sends a signal corresponding to the "optimal amount of light upon reproducing"

to recording/reproducing/erasing control waveform generation circuit 206, thus re-setting the amount of light emitted by the semiconductor laser element upon reproducing.

(12) The amount of light emitted by the semiconductor laser element upon recording/erasing is set in correspondence with the "optimal amount of light upon recording/erasing" recorded on information recording medium 201.

<D-2> Access Control

<D-2-1> Reproduce Information at Access Destination on Information Recording Medium 201

Information that pertains to recording locations and contents of information on information recording medium 201 varies depending on the type of information recording medium 201, and is normally recorded in

- a directory management region: a group of such information is recorded on the inner or outer peripheral region of information recording medium 201;
- a navigation pack: the navigation pack is contained in a VOBS (Video Object Set) complying with the data structure of a PS (Program Stream) of MPEG2, and records information that pertains to the recording location of next video data; or the like in information recording medium 201.

When specific information is to be reproduced or recorded/erased, information in the aforementioned region is reproduced, and an access destination is determined based on the information obtained therefrom.

<D-2-2> Coarse Access Control

Controller 220 calculates the radial position of the access destination to obtain the distance between the calculated position and the current position of optical head 202.

Speed curve information that allows optical head 202 to reach the target position in the shortest period of time with respect to the required moving distance is recorded in advance in semiconductor memory 219. Controller 220 reads out that information, and controls movement of optical head 202 by the following method according to the speed curve.

Controller 220 sends a command to objective lens actuator drive circuit 218 to turn off the track loop, and controls feed motor drive circuit 216 to start movement of optical head 202.

When the focused beam spot crosses a track on information recording medium 201, focus/track error detection circuit 217 generates a track error detection signal. Using this track error detection signal, the speed of the focused beam spot relative to information recording medium 201 can be detected.

Feed motor drive circuit 216 calculates the difference between the relative speed of the focused beam spot obtained from focus/track error detection circuit 217, and the target speed information obtained as needed from controller 202, and feeds back the result to the driving current to be supplied to optical head drive mechanism (feed motor) 203, thus moving optical head 202.

As described in "<B-3> Optical Head Moving Mechanism", friction always acts between the guide shaft and bushing or bearing. When optical head 202 is moving at high speed, dynamic friction acts. However, at the beginning of movement and immediately before stop of movement, static friction acts since the moving speed of optical head 202 is low. At this time, since the relative frictional force increases (especially immediately before stop of movement), the gain of current to be supplied to optical head drive mechanism (feed motor) 203 is increased in accordance with a command from controller 220.

<D-2-3> Fine Access Control

When optical head 202 has reached the target position, controller 220 sends a command to objective lens actuator drive circuit 218 to turn on the track loop.

The focused beam spot is tracing along the track on information recording medium 201 to reproduce the address or track number of that portion.

The current focused beam spot position is detected from the reproduced address or track number. Controller 220 calculates the number of error tracks from the target position to be reached, and informs objective lens actuator drive circuit 218 of the number of tracks required for moving the focused beam spot.

When objective lens actuator drive circuit 218 generates a pair of kick pulses, the objective lens slightly moves in the radial direction of information recording medium 201, thus moving the focused beam spot to a neighboring track position.

Objective lens actuator drive circuit 218 temporarily turns off the track loop, generates kick pulses corresponding in number to information from controller 220, and then turns on the track loop again.

Upon completion of fine access, controller 220 reproduces information (address or track number) at the position where the focused beam spot is tracing, and confirms that the beam spot is accessing a target track.

<D-3> Continuous Recording/Reproducing/Erasing Control

The track error detection signal output from focus/track error detection circuit 217 is input to feed motor drive circuit 216. In the aforementioned "start-up control" and "access control", controller 220 controls feed motor drive circuit 216 not to use the track error detection signal.

After it is confirmed by access that the focused beam spot has reached a target track, some track error detection signals are supplied as driving current to optical head moving mechanism (feed motor) 203 via motor drive circuit 216 in response to a command from controller 220. This control continues during the period in which the reproducing or recording/erasing process continues.

The central position of information recording medium 201 is slightly decentered from that of turntable 221. When some track error detection signals are supplied as the driving current, entire optical head 202 moves finely in correspondence with decentering.

When the reproducing or recording/erasing process continues for a long period of time, the focused beam spot position gradually moves toward the inner or outer periphery. When some track error detection signals are supplied as the driving current to optical head moving mechanism (feed motor) 203, optical head 202 gradually moves toward the inner or outer periphery in correspondence with the driving current.

In this manner, the load on track error correction of the objective lens actuator is reduced, and the track loop can be rendered stable.

<D-4> End Control

When the operation is to end upon completion of a series of processes, the processes proceed in accordance with the following procedure.

(1) Controller 220 sends a command to objective lens actuator drive circuit 218 to turn off the track loop.

(2) Controller 220 sends a command to objective lens actuator drive circuit 218 to turn off the focus loop.

(3) Controller 220 sends a command to recording/reproducing/erasing control waveform generation circuit 206 to stop emission of the semiconductor laser element.

(4) Controller 220 informs spindle motor drive circuit 215 of zero reference rotational speed.

\<E\> Flow of Recording Signal/Reproduced Signal to Information Recording Medium

\<E-1\> Signal Format Recorded on Information Recording Medium 201

Figure 11:
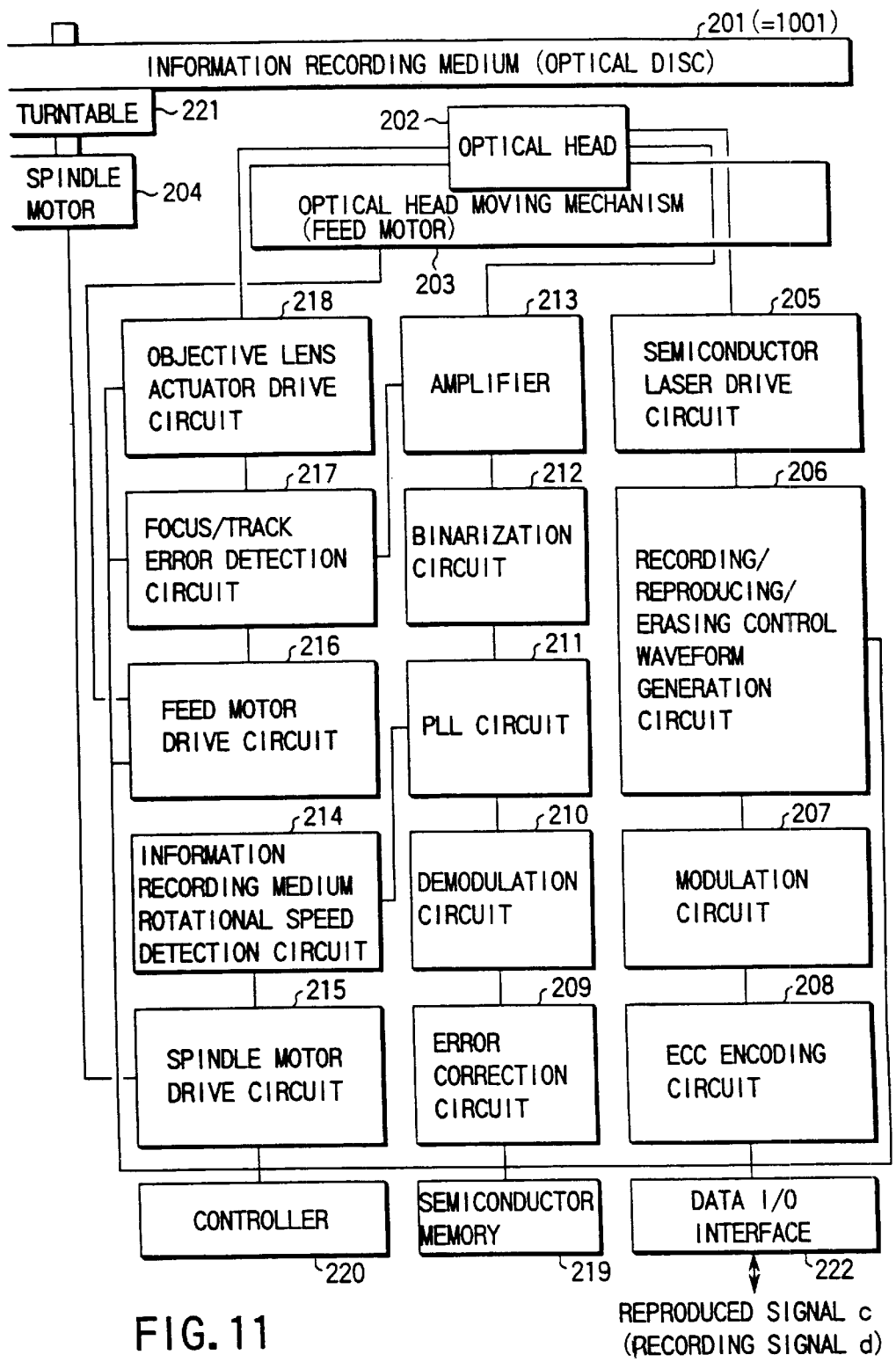
FIG. 11 is a schematic block diagram showing the arrangement (physical system) of the information recording/playback apparatus.

As shown in FIG. 11, the information recording/reproducing unit (physical system block) performs "appending of an error correction function" and "signal conversion of recording information (modulation/demodulation of a signal)" for a signal recorded on information recording medium 201 to meet requirements:

- to allow correction of recording information errors resulting from defects on information recording medium 201;
- to simplify a reproducing processing circuit to set DC components of a reproduced signal at zero; and
- to record information on information recording medium 201 at highest possible density.

\<E-2\> Flow of Signal upon Recording

\<E-2-1\> ECC (Error Correction Code) Appending Process

Information to be recorded on information recording medium 201 is input to data I/O interface 222 as recording signal d in the form of a raw signal. This recording signal d is recorded on semiconductor memory 219 and, after that, ECC encoding circuit 208 executes an ECC appending process as follows.

An embodiment of a method of appending an ECC using a product code will be explained below.

Recording signal d is arranged in rows in units of 172 bytes in semiconductor memory 219, and 192 rows form one ECC block. For a raw signal (recording signal d) in one ECC block formed by "row: 172×column: 192 bytes", 10-byte inner code PI is calculated for each 172-byte row, and is additionally recorded in semiconductor memory 219. Furthermore, 16-byte outer code PO is calculated for each 1-byte column, and is additionally recorded in semiconductor memory 219.

As an embodiment of recording such codes on information recording medium 201, a total of 2,366 bytes, i.e., 12 rows containing inner codes PI+1 line for outer codes PO:

$$(2,366=(12+1)\times(172+10))$$

are recorded in one sector as one unit.

Upon completion of appending inner and outer codes PI and PO, ECC encoding circuit 208 reads signals in units of 2,366 bytes corresponding to one sector from semiconductor memory 219, and transfers them to modulation circuit 207.

\<E-2-2\> Signal Modulation

In order to make the DC component (DSV: Digital Sum Value) of a reproduced signal approach zero, and to record information on information recording medium 201 at high density, modulation circuit 207 executes signal modulation as conversion of the signal format.

Modulation circuit 207 and demodulation circuit 210 include a conversion table that indicates the relationship between an original signal and modulated signal. Modulation circuit 207 segments a signal transferred from ECC encoding circuit 208 in units of a plurality of bits in accordance with a given modulation scheme, and converts segmented signals into other signals (codes) while looking up the conversion table.

For example, when 8/16 modulation (RLL(2,10) code) is used as the modulation scheme, there are two different conversion tables, which are switched as needed to make the DC component (DSV: Digital Sum Value) after modulation approach zero.

\<E-2-3\> Recording Waveform Generation

When a recording mark is recorded on information recording medium (optical disc) 201, the recording scheme normally used includes two different schemes:

- mark length recording: "1" is located at the leading and trailing end positions of a recording mark; and
- mark position recording: the central position of a recording mark matches the "1" position.

Upon executing mark length recording, a long recording mark need be formed. In this case, when light with an amount required for recording is kept irradiated for a predetermined period of time, a "raindrop"-like recording mark, only a trailing end portion of which has a larger width, forms due to the heat accumulation effect of the light reflective recording film of information recording medium 201. In order to remove such shortcoming, when a long recording mark is formed, a plurality of divided recording pulses are used or the recording waveform is changed stepwise.

Recording/reproducing/erasing control waveform generation circuit 206 generates the aforementioned recording waveform in correspondence with a recording signal sent from modulation circuit 207, and sends it to semiconductor laser drive circuit 205.

\<E-3\> Flow of Signal upon Reproducing

\<E-3-1\> Binarization & PLL Circuits

As described in "\<B-1-1\> Signal Detection by Optical Head 202", a signal on information recording medium 201 is reproduced by detecting a change in amount of light reflected by the light reflecting film or light reflective recording film of information recording medium (optical disc) 201. A signal obtained by amplifier 213 has an analog waveform. Binarization circuit 212 converts that signal into a binary digital signal consisting of "1"s and "0"s using a comparator.

PLL circuit 211 extracts a reference signal upon reproducing information from the reproduced signal obtained by binarization circuit 212. PLL circuit 211 incorporates a variable frequency oscillator. The frequencies and phases of a pulse signal (reference clock) output from that oscillator and the signal output from binarization circuit 212 are compared, and the comparison result is fed back to the oscillator output.

\<E-3-2\> Demodulation of Signal

Demodulation circuit 210 includes a conversion table that indicates the relationship between the modulated signal and demodulated signal. A signal is restored to an original signal by looking up the conversion table in response to the reference clock obtained by PLL circuit 211. The restored (demodulated) signal is recorded on semiconductor memory 219.

\<E-3-3\> Error Correction Process

Error correction circuit 209 detects error positions from the signal saved on semiconductor memory 219 using inner and outer codes PI and PO, and sets pointer flags of the error positions.

After that, signals at error positions are corrected as needed in correspondence with the error pointer flags while reading out signals from semiconductor memory 219, and are transferred to data I/O interface 222 after inner and outer codes PI and PO are removed.

A signal sent from ECC encoding circuit 208 is output as reproduced signal c from data I/O interface 222.

Figure 12:
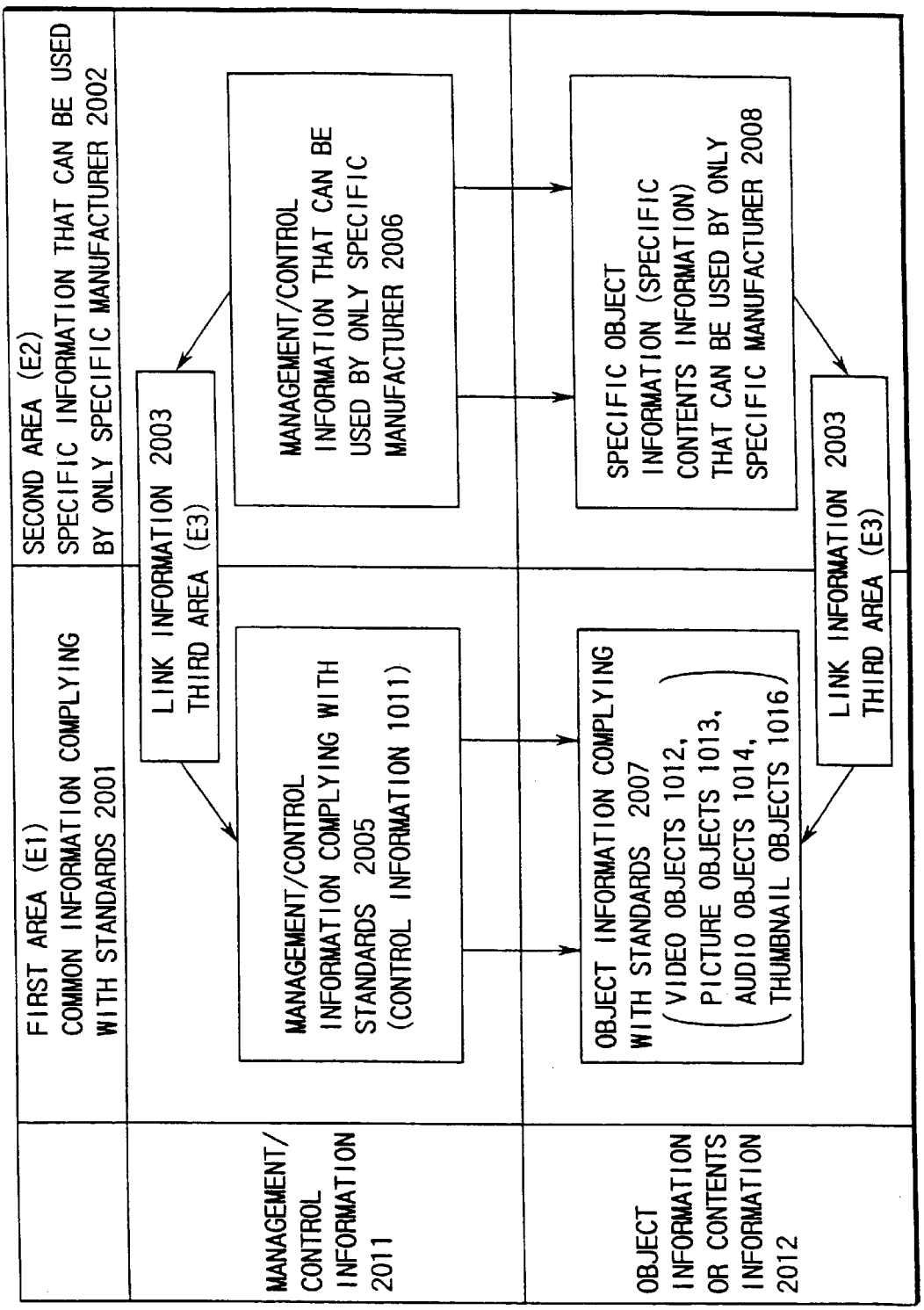
FIG. 12 is a view showing common information, specific information, and link information recorded on the information recording medium, and the relationship between the common information and specific information.

\<\<1\>\> Expansion Information Use Method for Common Information Complying with Standards FIG. 12 shows the basic concept of the present invention.

For example, information recorded on an information recording medium (optical disc 1001) according to the standards set in a public place like DVD-Video is called common information 2001 complying with standards.

Common information 2001 complying with standards is separated into object information or contents information 2012 which indicates information of contents themselves of information such as video information, still picture information, audio information, and the like, and management/control information 2011 for managing/controlling that information. These two pieces of information comply with the standards, and can be played back and edited by any drivers (information recording/playback apparatuses) irrespective of their manufacturers.

When an original function beyond those specified by the standards is provided by only a driver (information recording/reproducing apparatus) of a specific manufacturer, and information that pertains to the original function is recorded on the information recording medium (optical disc 1001), such information can be recorded on a recording region of specific information 2002 which can be used by only a specific manufacturer. Specific information 2002 which can be used by only a specific manufacturer is recorded on that region on the information recording medium (optical disc 1001), which is different from that of common information 2001 complying with standards. Information that pertains to contents themselves of information such as video information, still picture information, audio information, or the like of the information that can be played back by only the driver (information recording/playback apparatus) of the specific manufacturer is defined by specific object information (specific contents information) 2008 that can be used by only a specific manufacturer. Information required for managing and controlling this specific object information (specific contents information) 2008 that can be used by only a specific manufacturer is defined by management/control information 2006 that can be used by only a specific manufacturer.

Even the driver (information recording/playback apparatus) of the specific manufacturer having the original function basically operates according to function rules specified by the standards. Hence, the driver (information recording/playback apparatus) basically executes operations and processes using common information 2001 complying with standards, and executes special processes by reading out specific information 2002 which can be used by only a specific manufacturer in only a portion that requires a specific function. That is, a location or timing requiring specific information 2002 which can be used by only a specific manufacturer is set in association with the contents of common information 2001 complying with standards. Information that indicates association of specific information 2002 which can be used by only a specific manufacturer with common information 2001 complying with standards is defined as "link information 2003".

The basic concept and objectives of the present invention are summarized as follows.

A plurality of pieces of link information uniquely created by recorders (information recording/playback apparatuses) of a plurality of companies can be parallelly stored and used.

The need for ID assignment is obviated in a specific organization in association with manufacturer ID information that sets link information. As a result, no application for seeking permission/authorization of the specific organization is required, and a new manufacturer can freely enter the market.

After video information is edited by a recorder (information recording/playback apparatus) of another company, the influence of edited video information on link information can be detected by a recorder (information recording/playback apparatus) of the self company.

FIGS. 13A to 13C show information contents recorded in one link information. The features of the information contents are summarized below.

(1) One link information can simultaneously indicate a plurality of link sources/link destinations:

When an identical original function (a function that can be implemented by only a driver of a specific manufacturer) is to be designated at a plurality of locations in management/control information 2005 complying with standards, such parallel links set at a plurality of locations can reduce the number of pieces of link information required.

When a plurality of original functions (functions that can be implemented by only a driver of a specific manufacturer) are to be designated at a single location in management/control information 2005 complying with standards, such parallel links set at a plurality of locations can reduce the number of pieces of link information required.

(2) A method of allowing parallel storage and use of a plurality of pieces of link information uniquely created by recorders of a plurality of companies:

In the structure of the present invention, a plurality of pieces of link information can parallelly correspond to a single VOB or cell. Each link information records "last recorded/modified time (date) information 2061 of corresponding link information". Also, each link information records "drive manufacturer group ID information (ID of a group formed by a plurality of manufacturers) 2034 of a drive manufacturer group that can use specific information in association with the corresponding link information" or "drive manufacturer ID information (drive manufacturer name or the like) 2035 of a drive manufacturer that can use specific information in association with the corresponding link information", and the manufacturer name that can use the corresponding link information can be detected from this information.

(3) A method of obviating the need for manufacturer ID assignment in the specific organization:

An example will be explained with reference to FIGS. 13A to 13C.

Manufacturer group ID information 2034, drive manufacturer ID information 2035, and model information 2073 (e.g., the oldest model that can use specific information) indicating models which can use specific information are recorded as text information.

Furthermore, in order to cope with identical manufacturer names (related companies and the like), the link information further contains "additional information 2037 that pertains to this link information that a drive manufacturer can set", and confusion can be avoided by setting, e.g., a password. As a text information recording method, "ID information 2033 of a character code for drive manufacturer use" (e.g., JIS code ID or the like) is set in the link information.

FIGS. 14A to 14C summary other embodiments which pertain to a method of setting "drive manufacturer ID information" according to the present invention.

FIG. 12 shows common information, specific information, and link information recorded on the information recording medium, and schematically shows links between common information 2001 and specific information 2002. An example of a method of linking common information 2001 and specific information 2002 will be explained in detail below. Information that pertains to a link pattern with respect to each specific information 2002 is recorded in the column of "information 2041 that pertains to the link pattern of specific information associated with this link information" in link information 2003, as shown in FIG. 13A.

In the embodiment of the present invention, there are four different link patterns as follows.

(1) Link Pattern A: Call Process from External Program/Specific Information Side This pattern uses the processing method shown in FIG. 15. That is, object information 2007 complying with standards in common information 2001 complying with standards is directly used from management/control information 2006 side that can be used by only a specific manufacturer. Since each object information is managed by video object information 1077 side, information 2006 calls video object information 1107 in practice. As another method, a method of calling cell playback information 1108 as a display unit or PGC control information 1103 that indicates continuous playback programs is available.

Examples of the method of using this pattern are as follows.

Management information 2006 that can be used by only a specific manufacturer systematically manages video information, still picture information, and audio information in all of a plurality of information recording media (optical discs 1001) or a whole information recording medium having a plurality of recording layers like a multi-disc pack or multi-layered disc, so as to systematically manage PGC control information 1103, cell playback information 1108, and video object information 1107 (information of each recording layer) which are managed in units of layers.

Program recording reservation information is provided to management/control information 2006 side that can be used by only a specific manufacturer, and information obtained by video recording using that reservation information is recorded as common information 2001 complying with standards (recorded video information is recorded as video object 1012, and management information that pertains to the video information is recorded in management/control information 2005 complying with standards).

Query information (tree structure information with a large number of layers, keyword query information, and the like) for video information or a huge number of pieces of still picture information recorded is provided to management/control information 2006 side that can be used by only a specific manufacturer, and required video information or still picture information recorded in video objects 1012 or picture objects 1013 is retrieved by search and displayed.

Figure 15:
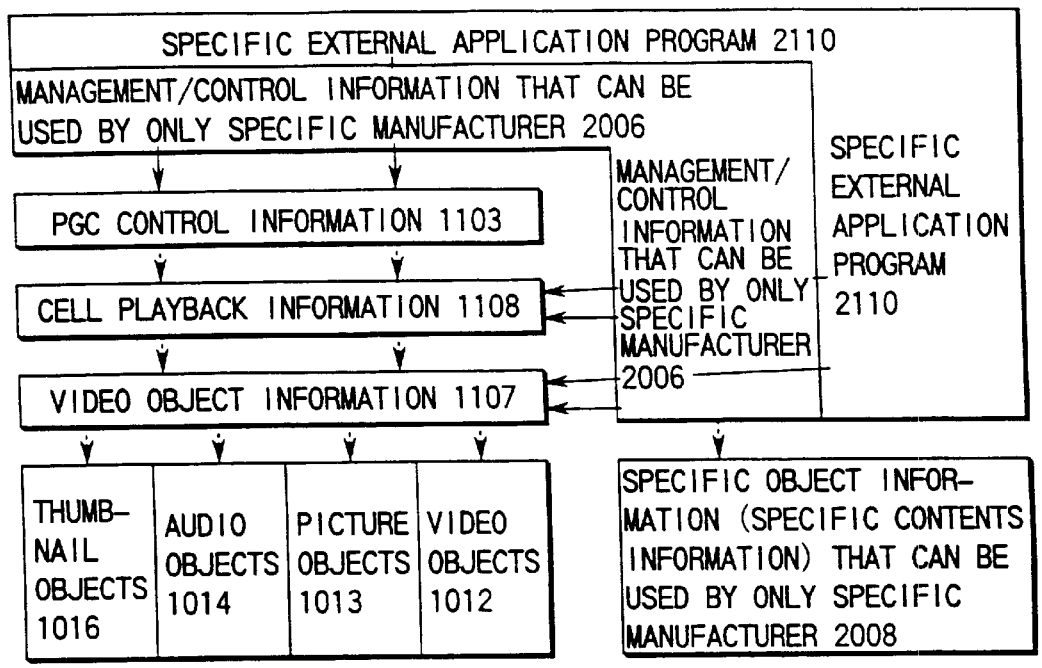
FIG. 15 is a view for explaining link pattern A.

Management/control information 2006 that can be used by only a specific manufacturer shown in FIG. 15 has information contents for implementing functions associated with basic functions, which are specified by the standards associated with common information 2001. However, the present invention is limited to such specific contents, and management/control information 2006 may be used as an external component for specific external application program 2110. For example, information of picture objects 1013 or video objects 1012 may be pasted in a portion of a document created on document creation software, or may be similarly pasted in presentation software. Furthermore, an application program having a function of extracting some data in video information in video objects 1012, automatically converting the extracted data into CG (computer graphics) data using, e.g., an edge extraction technique, and animating that CG data as the user wants using, e.g., a morphing technique can be created using the technique of the present invention.

(2) Link Pattern B: Partial Exchange Process

Figure 16:
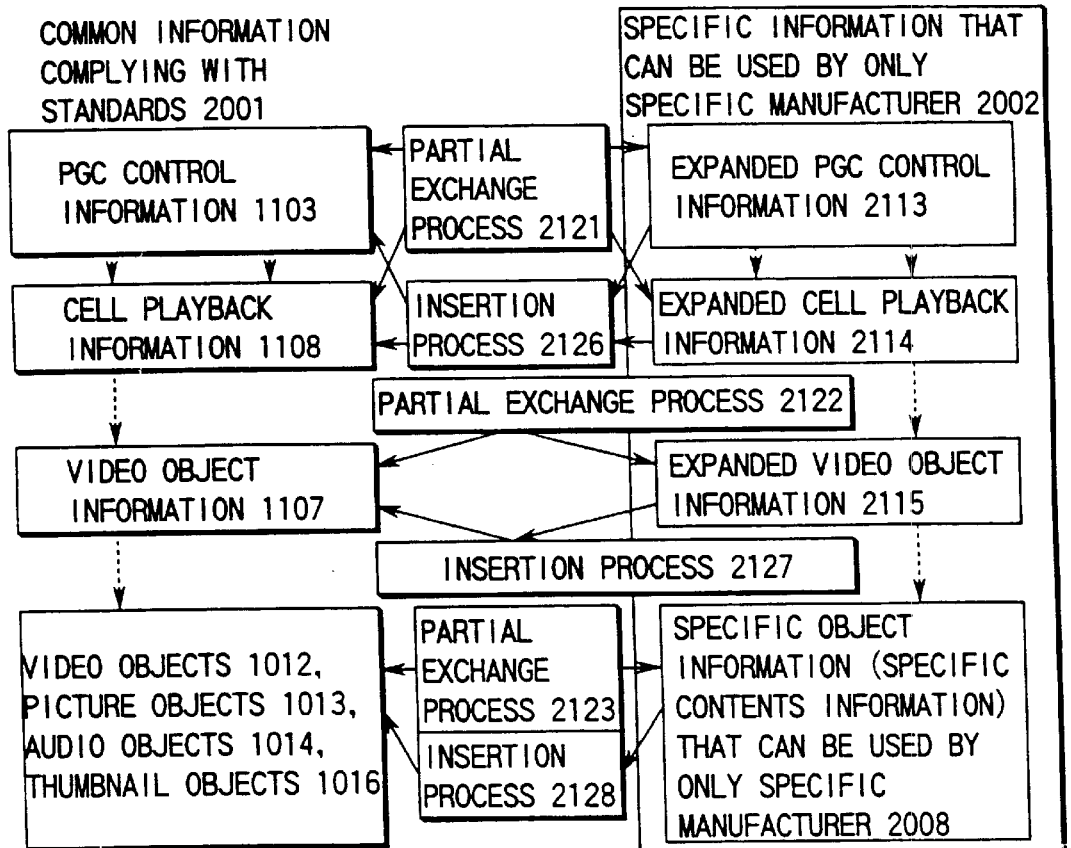
FIG. 16 is a view for explaining link patterns B and C.

This pattern uses the processing method shown in FIG. 16. That is, information obtained by appending information, which has information contents similar to, e.g., VOB 1403 and cell 1443 and correspond to an original function, to object information 2007 complying with standards with the structure shown in FIGS. 3A to 3J is recorded in "expanded video object information 2115" and "expanded cell playback information 2114". By selecting link information 2003 later, VOB 1403 and cell 1443 are replaced by the alternative (exchange) information in specific information 2002 that can be used by only a specific manufacturer upon playing back and displaying information.

Examples of applications using this processing method are as follows.

Recording Format Conversion of Object Information

In the DVD Video specifications, the recording format of video information is limited to "MPEG1" or "MPEG2". For example, when information recorded in the DV (digital video) format is recorded with the data structure shown in FIGS. 3A to 3J, video information converted into the MPEG2 format is recorded (this information is recorded in video objects 1012 shown in FIG. 16), and original video information in the DV format is also recorded as another file in computer data area 1008 shown in FIG. 1C. This information serves as specific object information (specific contents information) 2008 that can be used by only a specific manufacturer shown in FIG. 16. Furthermore, management/control information which pertains to this video information in the DV format is recorded as another file in computer data area 1008, and is used as management/control information 2006 that can be used by only a specific manufacturer.

Upon playback, an information playback apparatus of a general manufacturer plays back video information recorded in the MPEG2 format in video objects 1012 shown in FIG. 16. By contrast, an information playback apparatus of a specific manufacturer can play back original video information in the DV format, which is recorded in specific object information (specific contents information) 2008 that can be used by only a specific manufacturer. In general, since video information in the DV format has higher image quality than MPEG2 information, a technique unique to the specific manufacturer can be provided.

The same applies not only to video information but also to still picture information. That is, picture objects 1013 shown in FIG. 16 are recorded in the "MPEG2 I-picture format". Still picture information in the bitmap or JPEG format captured by a digital camera is recorded in picture objects 1013 shown in FIG. 16 after format conversion. At the same time, an original picture in the JPEG format is recorded in specific object information (specific contents information) 2008 that can be used by only a specific manufacturer. The information playback apparatus of the specific manufacturer can play back the original picture in the JPEG format with higher resolution (higher image quality) using link information 2003.

Variable Speed Playback

Cell playback information 1108 shown in FIG. 16 records information for normal playback speed alone. For example, upon making FF (fast playback) or FR (fast rewind) at double or quadruple speed, frame-decimated playback must be designated. Information indicating a playback procedure corresponding to FF or FR is recorded in advance in cell playback information 2114, and only an information playback apparatus of a specific manufacturer can achieve FF or FR playback using link information 2003.

After-Recording Insertion Process

When audio information is overwritten by after recording while playing back video information already recorded in video objects 1012 shown in FIG. 16, only the audio information to be additionally recorded is recorded in audio objects 1014 in common information 2001 complying with standards. After that, as information that replaces the corresponding information in cell playback information 1108 used for playing back the video information already recorded in video objects 1012, information indicating the mechanism for simultaneously playing back the video information in video objects 1012 and after-recorded information in audio objects 1014 is created, and is recorded in expanded cell playback information 2114 in specific information 2002 that can be used by only a specific manufacturer. Only an information playback apparatus manufactured by the specific manufacturer can simultaneously play back and output the aforementioned video information and after-recorded audio information using expanded cell playback information 2114.

Video Information Display after Special Edit

Common information 2001 complying with standards does not contain any special edit information for video information. For example, when the user wants to execute "fade-in" and "chromakey" special edit processes for VOB 1404 in FIG. 3D, management/control information is created by appending "fade-in" and "chromakey" special edit process information contents to management/control information corresponding to VOB 1404 in FIG. 3D contained in video object information 1107 in FIG. 16, and is recorded in expanded video object information 2115. An information playback apparatus manufactured by the specific manufacturer reads the corresponding information recorded in expanded video object information 2115, and displays and outputs video information which has undergone the special edit processes. Note that the special edit information is described in the EDL format in expanded video object information 2115.

(3) Link Pattern C: Specific Information Insertion Process

This pattern uses the processing method shown in FIG. 16. For example, assume that an information playback apparatus manufactured by a general manufacturer plays back in the order of cell 1441→cell 1442→cell 1443, as shown in FIG. 3G. By contrast, a specific manufacturer records cell* in expanded cell playback information 2114 shown in FIG. 16, and designates its insertion location to be "immediately after cell 1442" in link information 2003. An information playback apparatus manufactured by the specific manufacturer can play back PGC 1446 shown in FIG. 3H in the order of "cell 1441→cell 1442→cell*→cell 1443" using link information 2003.

As an example, CM automatic insertion using this method may be attained.

(4) Link Pattern D: Function Expansion Process

Figure 17:
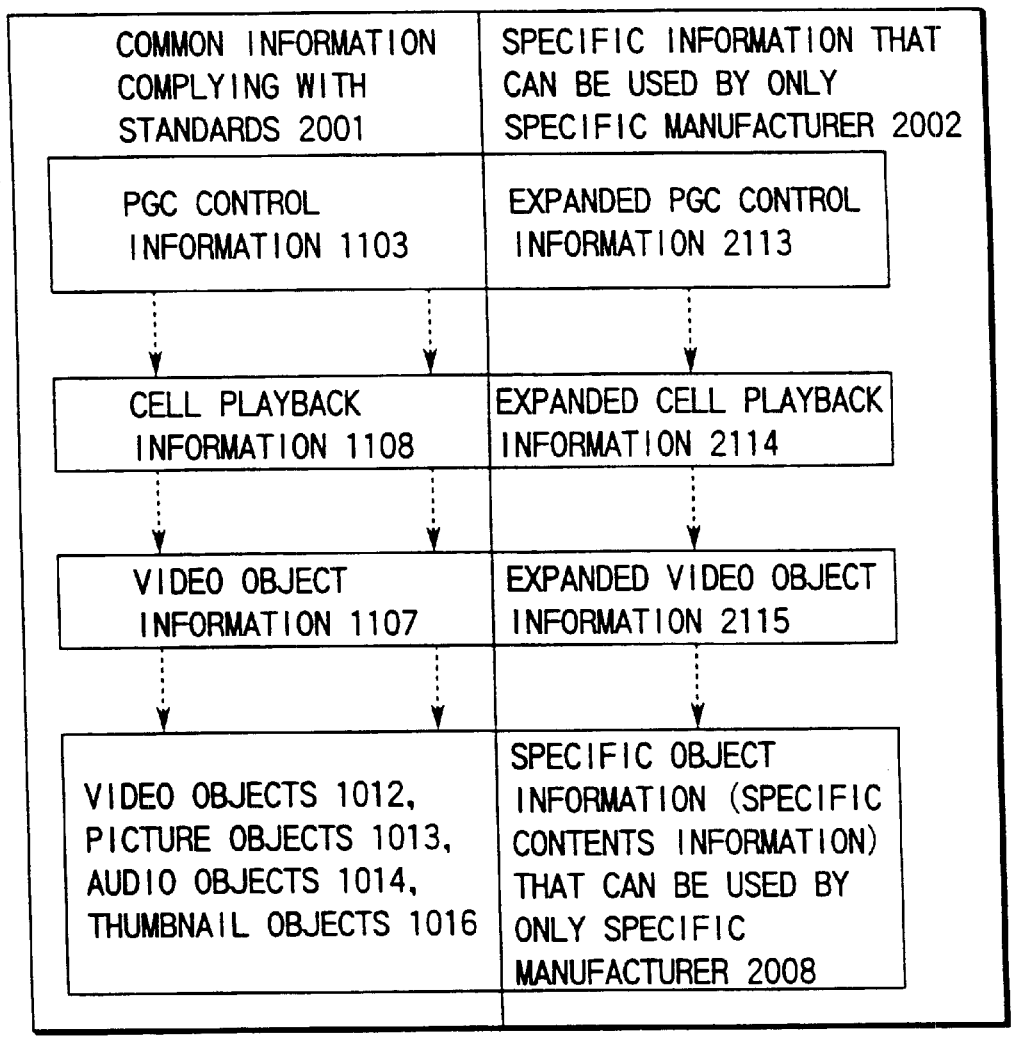
FIG. 17 is a view for explaining link pattern D.

This pattern uses the processing method shown in FIG. 17, and an original expanded function is directly appended to video object information or cell. Examples of this pattern are as follows.

Parental Lock/Security Function

For example, a security control or parental lock function using password setting is provided to only VOB 1404 in FIG. 3D. This password information is recorded in expanded video object information 2115 shown in FIG. 17.

Small Window Simultaneous Display Function

For example, expanded function information which allows only cell 1442 in FIG. 3G to make small window display, and can display another video information parallel to the small window display is provided to expanded cell playback information 2114 shown in FIG. 17.

Displayed Picture Characteristic Improving Function

In video information recorded by, e.g., a camcorder, playback pictures are often dark or fogged or have poor color tone due to backlight or insufficient illumination. Parameters such as "darkness adjustment", "color tone adjustment", and the like are recorded in expanded video object information 2115 in FIG. 17, and parameters for improving picture characteristics are set upon editing after video recording. An information playback apparatus of a specific manufacturer corrects the picture characteristics according to the parameter values using link information upon displaying pictures.

Location Designation Information upon Recording/Playback which can be Set by User For example, when the location the user watched last upon previous playback is recorded in expanded PGC control information 2113 in FIG. 17, the user can play back information from that location upon next playback.

The information recording medium (optical disc 1001) records information in a plurality of contents (PTT 1407, PTT 1408, and the like shown in FIG. 3C). Also, the information recording medium (optical disc 1001) records common information 2001 complying with standards and specific information 2002 that can be used by only a specific manufacturer in units of contents. Furthermore, the information recording medium (optical disc 1001) records link information 2003 indicating the relationship between common information 2001 complying with standards and specific information 2002. Using a category ID to be described below, different functions can be implemented in units of contents.

FIGS. 18A and 18B show the contents of function information (category ID) 2040 which pertains to specific information in information of the link information shown in FIG. 13A, and is common to a plurality of companies. FIGS. 18A and 18B show a list of category IDs of company A as an example. The common function contents and link pattern symbols shown in FIGS. 18A and 18B match the contents described in "<<4>> Link Pattern".

As shown in FIGS. 18A and 18B, the characteristic feature of the present invention lies in that the manufacturer names of information recording/playback apparatuses or information playback apparatuses that can use contents vary depending on the information contents (PTT 1407 (one type of contents), PTT 1408 (another type of contents) in FIG. 3C) recorded in the information recording medium (optical disc 1001), and different corresponding category IDs can be set. As a result, a category ID that can apply a parental lock to the entire adult video movie, and can cancel the parental lock of only a portion children are free to watch can be set, thus allowing control in terms of discipline. In this case, when category IDs are set depending on the recorded contents, the present invention can greatly contribute to wholesome upbringing of young people.

When only a plurality of specific manufacturers implement a specific function according to their agreement, function information (category ID) 2040 which pertains to specific information and is common to a plurality of companies is effectively used. For example, a case will be examined below wherein companies A, B, C, and D conclude agreements with each other to be able to commonly use common functions other than category IDs 6, 9, and 10. The common functions other than category IDs 6, 9, and 10 shown in FIGS. 18A and 18B can be used by not only company A but also by companies B, C, and D according to FIGS. 18A and 18B. Therefore, company B searches drive manufacturer IDs 2035 in link information shown in FIG. 13A for link information that describes company A, and checks if that link information includes category IDs 2040= 1, 2, 4, 7, or 12. If such category IDs are found, company B uses the corresponding functions commonly to company A. This means that drive manufacturers that can use contents vary depending on the recorded contents, as in the above description.

Note that companies A, B, C, and D may be considered as either manufacturers or distributors of information recording/playback apparatuses.

A method of checking influences on link information set by an information playback apparatus of the self company after contents recorded on a given information recording medium (optical disc 1001) have changed by an edit process using an information recording/playback apparatus (recorder) of another company will be explained below.

FIGS. 19A to 19F show the internal data structure of edit control information 1023 shown in FIG. 1E.

When data in audio & data area 1009 shown in FIG. 1C has been edited (including addition of new data), history information that pertains to an edit process (addition of new data) must be recorded in edit history information 2141 shown in FIG. 19B. As edit history information 2141, information 2149 that pertains to detailed contents of edit histories, edit (additional recording or change) date/time information 2144, information 2145, and information 2146 are recorded. In an embodiment shown in FIG. 19C, date/time information 2145 and information 2146 of the second and third latest edit processes are recorded together with date/time information 2144 of the latest edit process.

Figure 20:
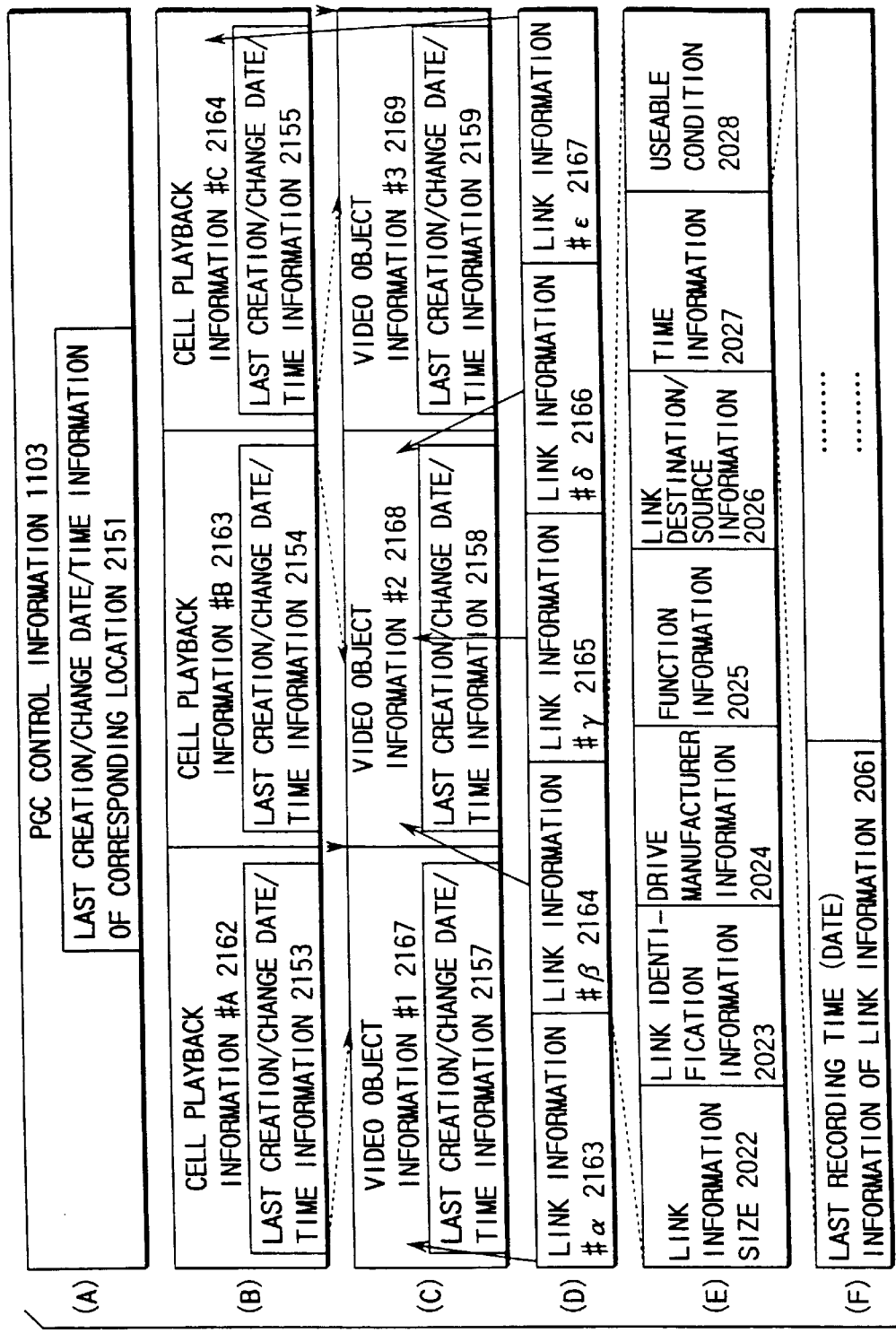
FIG. 20 is views showing the link and time relationships between management/control information complying with standards and link information.

A plurality of pieces of link information 2003 having the data structure shown in FIGS. 13A to 13C are recorded on the information recording medium (optical disc 1001), as shown in FIG. 20D. A case will be explained below wherein, for example, link information #β 2164 is used. One link information #β 2164 records various kinds of information shown in FIG. 20E or classification items 2020 in FIGS. 13A to 13C, and especially, classification item 2020 of "time information 2027 that pertains to this link information" of those information records "last recording time (date) information 2061 of this link information", as shown in FIG. 20F (or FIG. 13C). Last recording time (date) information 2061 of this link information is played back to read the date and time when link information #β 2164 was created or edited/changed last. This date/time is compared with the latest editing date/time of information in audio & video data area 1009 shown in FIG. 19C. If the latter date is equal to or earlier than the former date, it is determined that link information #β 2164 was created or changed (edited) at the same time as or after the latest edit process of information in audio & video data area 1009. In this case, link information #β 2164 can be used without any problem.

Conversely, when information in audio & video data area 1009 was edited after link information #β 2164 had been created or changed (edited) (when "date/time information 2144 of the latest edit process shown in FIG. 19C" is later than "last recording time (date) information 2061 of link information shown in FIG. 20F", since information in audio & video data area 1009 was changed after link information #β 2164 had been created or changed (edited), it may not be possible to use link information #β 2164. In management/control information 2011 (FIG. 12) in common information 2001 complying with standards, as shown in FIGS. 20A to 20C, all of PGC control information 1103, cell playback information 2162 to information 2164, and video object information 2167 to information 2169 record their last creation/change (edit) date/time information 2151 to information 2159. Therefore, in the aforementioned case, locations in common information 2001 complying with standards, which are designated by link information #β 2164, are checked. In an embodiment shown in FIGS. 20A to 20F, since link information #β 2164 designates video information #2 2168 as a link source, last creation/change (edit) date/time information 2158 of video object #2 2168 is played back and compared. When last recording time (date) information 2061 of link information #β 2164 is equal to later than last creation/change (edit) date/time information 2158 of video object information #2 2168, it is determined that locations other than video object information #2 2168 were edited, and this link information #β 2164 can be used without any problems. By contrast, when last recording time (date) information 2061 of link information #β 2164 is earlier than last creation/change (edit) date/time information 2158 of video object information #2 2168, since the contents of video object information #2 2168 were changed after link information #β 2164 had been set, it may not be possible to use link information #β 2164. In such case, the information recording/playback apparatus detects changed locations of video object information #2 2168 and a method of changing/correcting specific information 2002 that can be used by only a specific manufacturer corresponding to link information #β 2164, using "correction content automatic inspection information 2042 for automatically changing/correcting contents of specific information that can be used by only a specific manufacturer in correspondence with a change in contents of common information complying with standards" shown in FIG. 13B, and then automatically changes/corrects specific information that can be used by only a specific manufacturer.

On the other hand, when contents of video object information #2 2168 have been changed or edited, its last creation/change (edit) date/time information 2158 is changed in correspondence with that change/edit date, and the contents of specific information that can be used by a specific manufacturer as each of link destinations of corresponding link information #β 2164, information #γ 2165, and #δ 2166 are changed and corrected. In addition, date/time information of each "last recording time (date) information 2061 of link information" is also changed.

Since the information recording medium (optical disc 1001) shown in FIG. 1A has high portability, it is likely to be used in turn in a plurality of information recording/playback apparatuses. For this reason, after link information 2164 is set by an information recording/playback apparatus of company A, if an information recording/playback apparatus of company B changes and edits a link source portion in common information 2001 complying with standards, link information 2164 can no longer be used. As described above, the characteristic features of the present invention lie in that:

(1) "last change/correction (edit) time information" is recorded in both link information 2164 and common information 2001, and these pieces of time information are compared before link information 2164 is used, so as to confirm the validity of link information; and (2) "correction content automatic inspection information 2042" is recorded in advance in link information so as to allow automatic correction of the contents of specific information 2002 even when common information 2001 complying with standards has been changed (edited).

There are four different embodiments of a method of setting a link source (a designation location in common information complying with standards) corresponding to each link information in the present invention, as shown in FIGS. 21A to 21D. (The respective setting methods are set with symbols (A) to (D).)

In one method, a bit sequence (e.g., all "1"s for 8 bytes) which never exists in common information 2001 complying with standards is inserted at an arbitrary position and is used as a "tag" for setting a designation location, and the "tag" inserted position is defined as the designation location of the link source. An information playback apparatus which does not use link information skips data from the "tag" information to inserted data size information that follows immediately after the "tag" information, thus removing the influence of link information. A method of allocating "pointer information" behind "tag" information", and designating corresponding link information (its ID information or link information number 2031) in this "pointer information" ((A) of FIG. 21A) and a method of directly allocating link information 2003 behind "tag" information ((B) of FIG. 21B) are available. In the latter method, a plurality of link information are distributed in common information 2001 complying with standards. The methods of these two embodiments are suitable for link pattern A (call process from external program/specific information side) shown in FIG. 15.

AS tag information, bit sequence information (e.g., all "1"s for 8 bytes) which never exists in common information 2001 is formed and inserted in common information 2001, and "pointer information" or "link information" is allocated immediately after that bit sequence. A drive (information playback apparatus) manufactured by a drive manufacturer that does not use link information checks the pointer size or link information size described immediately after this tag information to skip that range.

By contrast, in case of link pattern B (partial exchange process) or link pattern C (specific information insertion process) shown in FIG. 16 or link pattern D (function expansion process) shown in FIG. 17, the designation range of a link source is determined to be PGC control information 1103, cell playback information 1108, and video object information 1107. (In link pattern A (call process from external program/specific information side) shown in FIG. 15 as well, the link source designation range may be fixed.) In such case, setting methods (C) and (D) shown in FIGS. 21C and 21D are suitably used.

In setting method (C), information recording columns for designating link information (its ID information or link information number 2031) are formed in advance in PGC control information 1103, cell playback information 1108, and video object information 1107.

A method of setting the designation location of link information without changing common information 2001 complying with standards (without exerting any load on common information 2001) is method (D), in which link information contains information that pertains to the link source and link range. "Number 2044 of link designation locations in common information complying with standards", and "first priority link designation location information 2045 in common information complying with standards" to "second priority link designation location information 2046 in common information complying with standards" shown in FIG. 13B are information items set assuming a case that uses method (D).

A file structure having neither link information 2003 nor specific information 2002 corresponding to an expansion function will be explained first.

All pieces of information are recorded in data area 1004 in FIG. 1B in units of files, and the relationship between the data and files are managed by the directory structure, as shown in FIG. 2.

A plurality of subdirectories 1451 are contained within root directory 1450 to allow easy classification in units of recorded file contents. In FIG. 2, data files that pertain to computer data recorded on computer data areas 1008 and 1010 shown in FIG. 1C are recorded under subdirectory 1457 for computer data storage, and audio & video data recorded on audio & video data area 1009 are recorded under rewritable video title set RW_VTS 1452. On the other hand, upon copying video information recorded on a DVD Video disc to the disc shown in FIG. 1A, data are copied under video title set VIDEO_TS 1455 and audio title set AUDIO_TS 1456.

Control information 1011 in FIG. 1D is recorded as a single file for rewritable video management data. In FIG. 2, this information has file name RW_VIDEO_CONTROL.IFO. Furthermore, identical information is also recorded as backup information with file name RW_VIDEO_CONTROL.BUP.

In FIG. 2, all video information data that belong to video objects 1012 shown in FIG. 1D are recorded as a video objects file with file name RW_VIDEO.VOB. That is, all video information data that belong to video objects 1012 shown in FIG. 1D are continuously linked in a single VTS (video title set 1402), as shown in FIG. 3B, and are continuously recorded in a single file named "video objects file". (In other words, all data are recorded together in a single file without dividing a file in units of PTTs (part_of_title) 1407 and 1408.)

All still picture information data that belong to picture objects 1013 are recorded together in a picture objects file with file name RW_PICTURE.POB. Picture objects 1013 contain a plurality of pieces of still picture information. A digital camera adopts a format in which each still picture is recorded as an independent file, but the embodiment of the present invention is characterized in that all still pictures contained in picture objects 1013 are continuously linked in a format similar to that shown in FIGS. 3A to 3J, and are recorded together in a single picture objects file with file name RW_PICTURE.POB.

Likewise, all pieces of audio information that belong to audio objects 1014 are recorded in a single audio objects file with file name RW_AUDIO.AOB, and all pieces of thumbnail information that belong to thumbnail objects 1016 are recorded in a single thumbnail objects file with file name RW_THUMBNAIL.TOB.

Note that the video objects file, picture objects file, audio objects file, and thumbnail objects file are handled as AV file 1401.

Rewritable additional information 1454 (not shown in FIGS. 1A to 1F) that can be used upon recording/playing back video information can be simultaneously recorded. That information is recorded as a single file, which has file name RW_ADD.DAT in the embodiment in FIG. 2.

An embodiment of the present invention that pertains to the allocation of link information will be explained below while comparing with the file structure shown in FIG. 2.

An embodiment in which link information 2003 is allocated in common information 2001 shown in FIG. 22A will be explained first. In case of this embodiment, link information 2003 is recorded together in two files, i.e., control information 1011 in FIG. 2=RW_VIDEO_CONTROL.IFO (rewritable video management data) and backup data of control information 1011=RW_VIDEO_CONTROL.BUP (rewritable video management data backup). As detailed recording locations in these two files, all pieces of link information are recorded together at the recording location of link information 2003 (FIG. 19B) in edit control information 1023 shown in FIG. 1E. In link information 2003, a plurality of pieces of link information 2163 to 2167 are continuously allocated, as shown in FIG. 20D.

Figure 24:
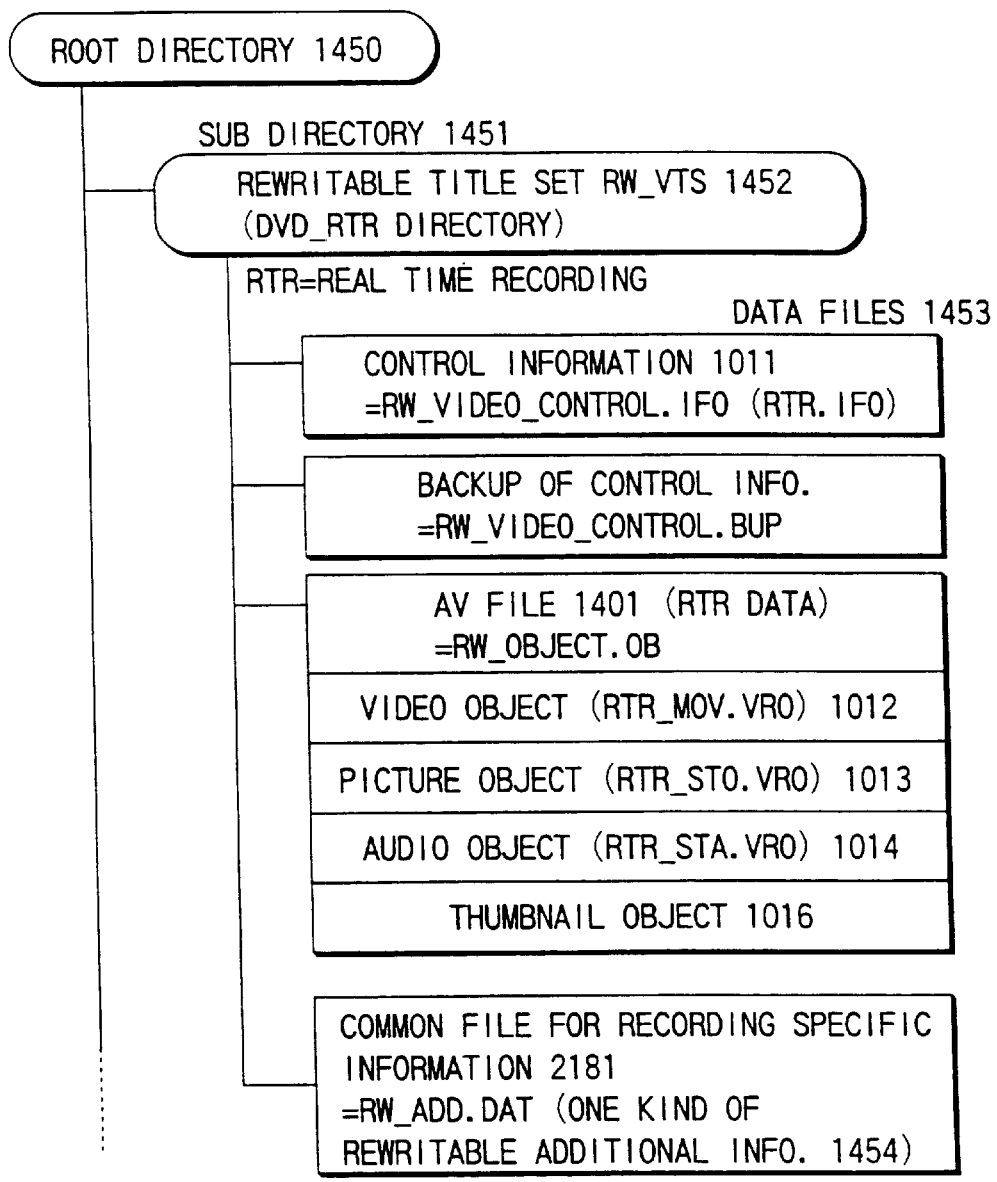
FIG. 24 is a view for explaining the recording location (part 2) of specific information.

An embodiment in which link information is allocated in specific information 2002 shown in FIG. 22B means a state wherein link information is recorded together with specific information 2002 in common file 2181=RW_ADD.DAT (a kind of rewritable additional information 1454) that records specific information, as shown in, e.g., FIG. 24.

Figure 23:
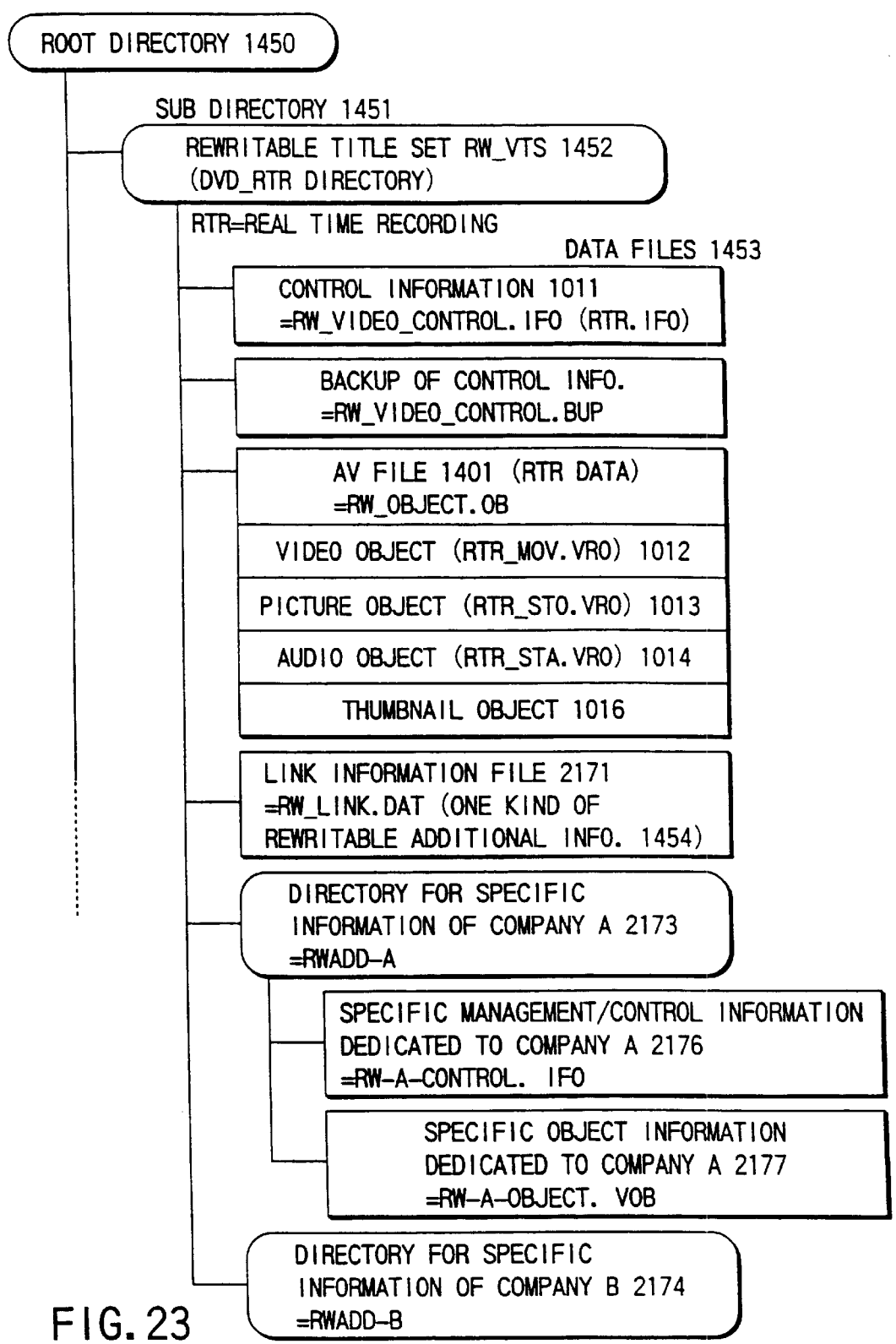
FIG. 23 is a view for explaining the recording location (part 1) of specific information.

In an embodiment shown in FIG. 22C in which all pieces of link information are allocated together at a unique location, unique link information like 2171=RW_LINK.DAT is set under subdirectory 1451 of rewritable video title set RW_VTS 1452, as shown in FIG. 23, and the respective pieces of link information 2163 to 2167 are allocated at neighboring locations, as shown in FIG. 19D. This unique link information like 2171=RW_LINK.DAT is located as a kind of rewritable additional information 1454=RW_ADD.DAT (rewritable video additional information).

An embodiment in which groups of link information to be used in units of drive manufacturers are allocated together shown in FIG. 22C means a file structure shown in FIG. 23. That is, subdirectories (dedicated subdirectory 2185 for company A, and dedicated subdirectory 2186 for company B) in units of drive manufacturers are created under root directory 1450, and link information files in units of drive manufacturers such as dedicated link information 2191 for company A=LINKINFO_A.IFO and the like are set. In the link information file, the respective pieces of link information 2163 to 2167 are allocated and recorded at neighboring locations, as shown in FIG. 19D.

FIG. 23 shows an embodiment of a method of allocating specific information 2002 that can be used by only a specific manufacturer. Basically, specific information is recorded in subdirectory 1451 of rewritable video title set RW_VTS 1452 where common information 2001 complying with standards is recorded. As shown in FIG. 23, directories for recording specific information 2002 are separated in units of drive manufacturers like directory 2173 for specific information of company A=RW_ADD_A and directory 2174 for specific information of company B=RW_ADD_B. Since the directories are separated, as shown in FIG. 23, specific information 2176 and information 2177 of company A can be prevented from being destroyed upon changing, e.g., specific information of company B. Also, as shown in FIG. 12, of specific information 2002 that can be used by only a specific manufacturer, management/control information 2006 that can be used by only a specific manufacturer is recorded in a file of specific management/control information 2176=RW_A_CONTROL.IFO dedicated to company A in FIG. 23, and the contents of specific object information (specific contents information) 2008 that can be used by only a specific manufacturer are recorded in a file of specific object information 2177=RW_A_OBJECT.VOB dedicated to company A in FIG. 23.

FIG. 24 shows another embodiment of a method of allocating specific information 2002 that can be used by only a specific manufacturer in the present invention. This embodiment is characterized in that all pieces of specific information 2002 are recorded together in a single file independently of drive manufacturers of information recording/playback apparatuses that create specific information 2002. Common file 2181 that records specific information has file name RW_ADD.DAT, and is allocated under rewritable video title set RW_VTS 1452 as common subdirectory 1451 where another common information 2001 complying with standards is recorded. Common file 2181 that records specific information is a kind of rewritable additional information 1454=RW_ADD.DAT (rewritable video additional information) shown in FIG. 2.

Figure 25:
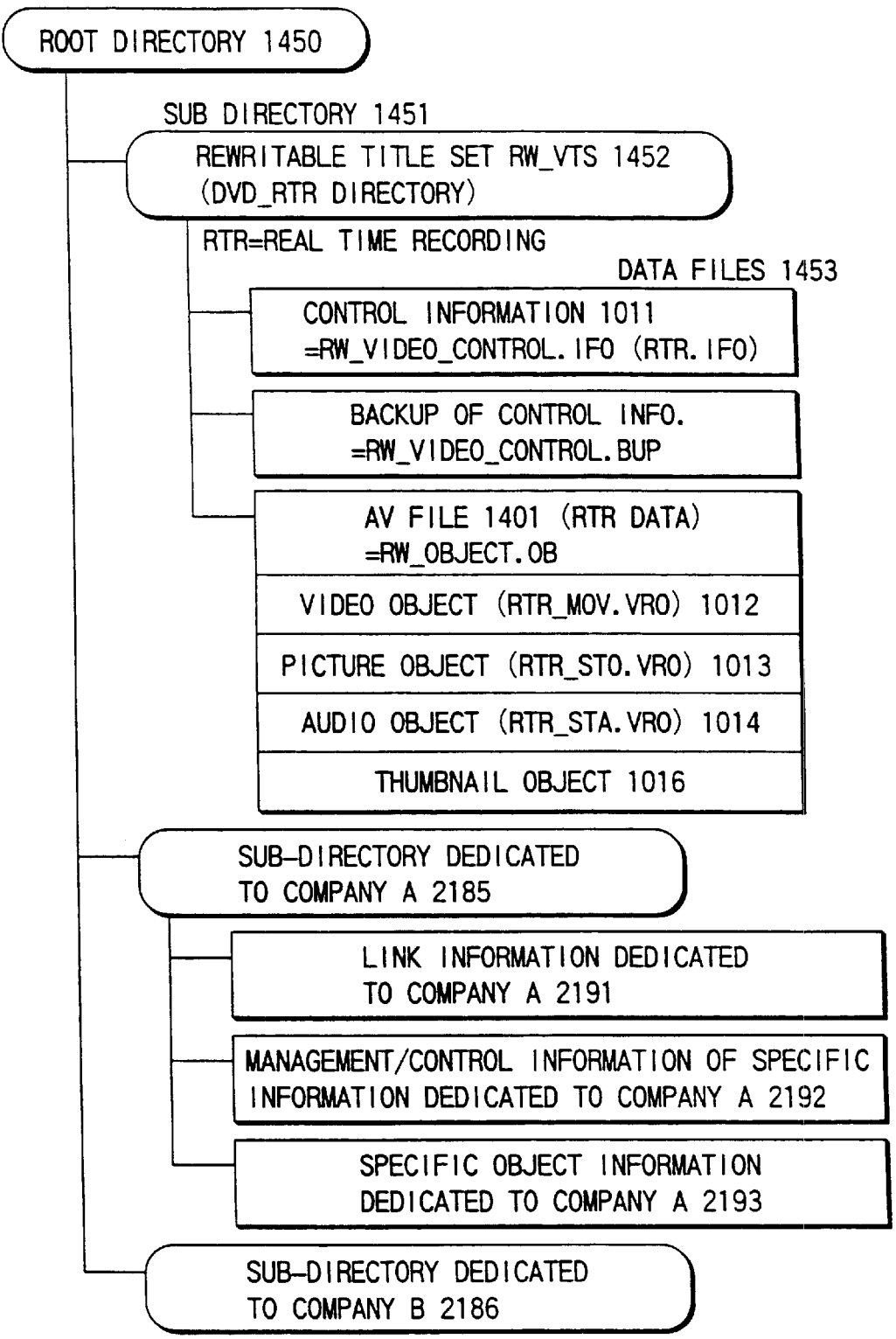
FIG. 25 is a view for explaining the recording location (part 3) of specific information.

Furthermore, FIG. 25 shows still another embodiment of a method of allocating specific information 2002 that can be used by only a specific manufacturer in the present invention. Referring to FIG. 25, specific information 2002 is allocated outside subdirectory 1451 of rewritable video title set RW_VTS 1452 unlike FIGS. 23 and 24. Subdirectories (dedicated subdirectory 2185 for company A, and dedicated subdirectory 2186 for company B) are created under root directory 1450 in units of drive manufacturers of information recording/playback apparatuses for recording specific information, and specific information 2002 is recorded under each subdirectory. Of specific information 2002 that can be used by only a specific manufacturer shown in FIG. 12, management/control information 2006 that can be used by only a specific manufacturer is recorded in a file of specific management/control information 2192=CONTROLIFO_A.IFO dedicated to company A in FIG. 25, and the contents of specific object information (specific contents information) 2008 are recorded in a file of specific object information 2193=A_OBJECT.VOB dedicated to company A in FIG. 25.

Figure 26A:
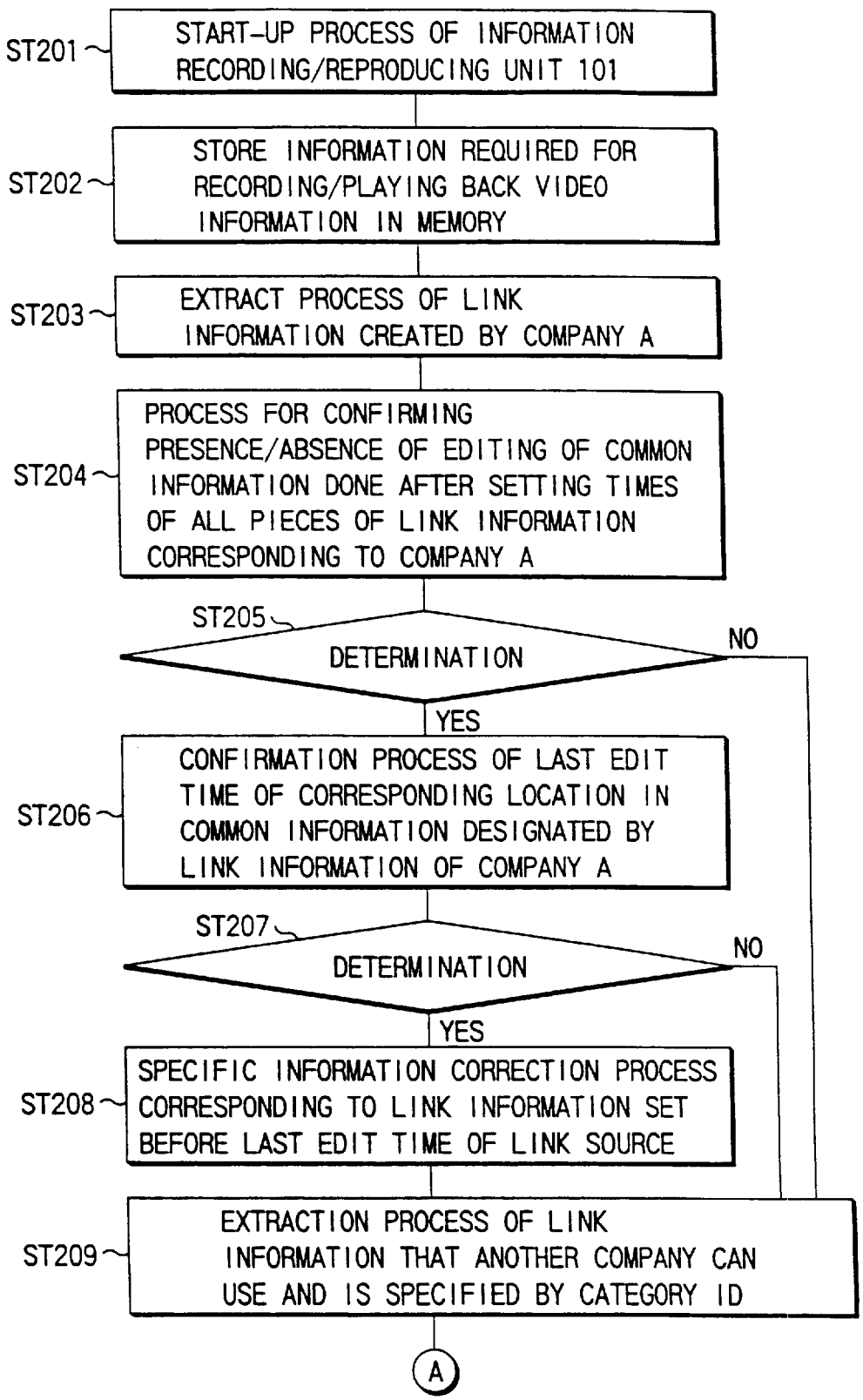
FIGS. 26A and 26B are flow charts each showing the processing sequence for playing back and each displaying using link information by an information recording/playback apparatus available from company A.
Figure 26B:
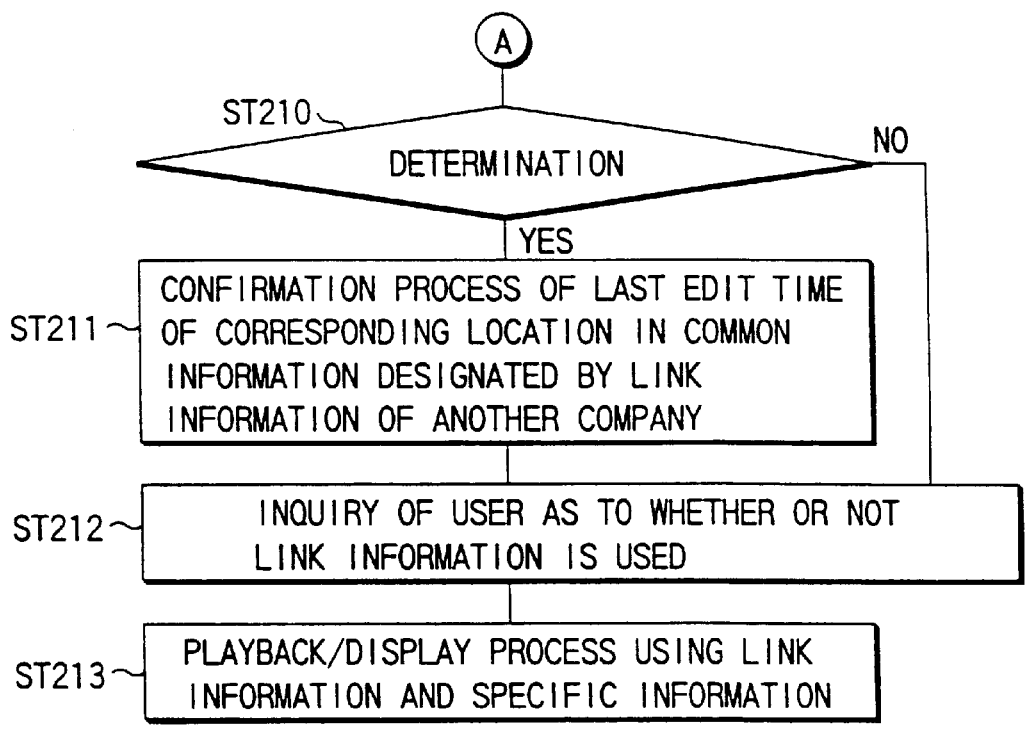

The procedure of a method of playing back and displaying link information in the information recording/playback apparatus for recording video information shown in FIG. 10 will be explained below. An embodiment will be explained while taking as an example a case wherein the information recording/playback apparatus for recording video information is a product of drive manufacturer A. FIGS. 26A and 26B show the playback/display procedure in this case.

The entire flow charts shown in FIGS. 26A and 26B will be explained first.

(ST201) Start-up Process of Information Recording/Reproducing Unit 101

Information recording medium (optical disc) 201 is rotated, and focus/track servo of optical head 202 is turned on to enable information playback from information recording medium (optical disc) 201.

(ST202) Store Information Required for Recording/Playing Back Video Information in Memory System controller (MPU) 1530 controls information recording/reproducing unit 101 to read control information 1011 and link information file 2171 (FIG. 23) from information recording medium (optical disc) 201, and temporarily stores them in its internal semiconductor RAM.

(ST203) Extract Process of Link Information Created by Company A

System controller (MPU) 1530 searches all pieces of link information in link information file 2171 temporarily stored in its internal semiconductor RAM and extracts link information whose drive manufacturer ID information 2035 (FIG. 13A) corresponds to company A.

(ST204) Process for Confirming Presence/Absence of Editing of Common Information Done after Setting Times of all Pieces of Link Information Corresponding to Company A System controller (MPU) 1530 checks last recording time (date) information 2061 (FIG. 13C) of each link information corresponding to company A in link information file 2171 temporarily stored in its internal semiconductor RAM, and compares it with date/time information 2144 (FIG. 19C) of the latest edit process (including addition of new data) to common information, so as to check if the common information has been edited after the setting times of all the pieces of link information corresponding to company A.
(ST205) Determination It is determined whether or not the common information has been edited after the creation/change times of all the pieces of link information corresponding to company A.
(ST206) Confirmation Process of Last Edit Time of Corresponding Location in Common Information Designated by Link Information of Company A System controller (MPU) 1530 extracts last recording time (date) information 2061 (FIG. 13C) of each link information corresponding to company A and corresponding locations (link source designation location and designation range 2026 in FIGS. 13B and 13C) in common information designated by each link information from link information file 2171 temporarily stored in its internal semiconductor RAM.

System controller (MPU) 1530 extracts a plurality of pieces of last creation/change date/time information 2151 to 2159 (FIGS. 20A to 20C) of link source designation locations in common information from control information 1011 temporarily stored in its internal semiconductor RAM.
(ST207) Determination It is determined whether or not the link source designation locations in the common information have been edited after the creation/change times of all the pieces of link information corresponding to company A.
(ST208) Specific Information Correction Process Corresponding to Link Information Set before Last Edit Time of Link Source System controller (MPU) 1530 automatically detects changes in link source designation location using correction contents automatic inspection information 2042 (FIG. 13B) from the link information set before the last edit time of the link source, and changes the contents of the corresponding specific information (specific management/control information 2176 and specific object information 2177 dedicated to company A in FIG. 23) in correspondence with the detected changes.

System controller 1530 updates last recording time information 2071 (FIG. 13C) of the link information to indicate the correction time.
(ST209) Extraction Process of Link Information that Another Company can Use and is Specified by Category ID System controller (MPU) 1530 checks category ID information 2040 (FIG. 13A) of link information corresponding to companies other than company A in link information file 2171 temporarily stored in its internal semiconductor RAM.

System controller (MPU) 1530 compares usable category IDs stored in advance in its internal semiconductor ROM (information that company A can use in a category ID list of other companies is recorded in advance as in FIGS. 18A and 18B) and category IDs of other companies recorded on information recording medium (optical disc) 201 to extract link information which is usable by another company.
(ST210) Determination It is determined whether or not the common information has been edited after the creation/change time of link information that another company can use and is checked in step ST209.
(ST211) Confirmation Process of Last Edit Time of Corresponding Location in Common Information Designated by Link Information of Another Company System controller (MPU) 1530 extracts last recording time (date) information 2061 (FIG. 13C) of each link information usable by another company and corresponding locations (link source designation location and designation range 2026 in FIGS. 13B and 13C) in common information designated by each link information from link information file 2171 temporarily stored in its internal semiconductor RAM.

System controller (MPU) 1530 extracts a plurality of pieces of last creation/change date/time information 2151 to 2159 (FIGS. 20A to 20C) of link source designation locations in common information from control information 1011 temporarily stored in its internal semiconductor RAM, and checks their time relationship.

For link information of another company which set the corresponding location in the common information designated as a link source last before the last edit time, specific information 2176 and information 2177 are not corrected unlike step ST208, and are inhibited from being used.
(ST212) Inquiry of User as to Whether or not Link Information is Used System controller (MPU) 1530 displays, on display/input panel 1548 of RTR recorder, an inquiry of user as to whether the original functions of the information recording/playback apparatus (video recorder) for recording video information are used by utilizing individual usable link information selected by the aforementioned processes or playback/display is made using only common information 2001 complying with standards.

If the user denies use of link information, information is played back from information recording medium (optical disc) 201 using only common information 2001 complying with standards without using any link information, and the playback result is displayed on display/input panel 1548 of RTR recorder.
(ST213) Playback/Display Process Using Link Information and Specific Information Link source corresponding locations in common information 2001 designated in link information, which is designated by the user in response to the inquiry in step ST212, are extracted by searching the contents of link information file 2171 temporarily stored in the semiconductor RAM in system controller (MPU) 1530.

Locations in PGC control information 1103 (FIG. 20A) of the link source designation locations are recorded at other locations in the semiconductor RAM on the basis of control information 1011 temporarily stored in the semiconductor RAM in system controller (MPU) 1530.

Common information 2001 is played back and displayed in accordance with a PGC (FIG. 20A) to be played back designated by the user, and when the playback location has reached the aforementioned link source designation location, specific information 2002 is called via link information 2003 to play back and display information on display/input panel 1548 of RTR recorder on the basis of the original functions.

The flow charts shown in FIGS. 26A and 26B will be described in more detail below. The present invention is characterized by the process (ST204) of checking the relationship between "last recording time information 2061 of link information" recorded in link information shown in FIG. 13C, and "date/time information 2144 of the latest edit process (content change/addition/deletion) of common information 2001" shown in FIG. 19C. With this process, whether or not the contents of common information 2001 have been changed (edited) by an information recording/playback apparatus for recording video information of another company after the corresponding link information had been set last. If the contents of common information 2001 have been changed (edited), it is checked if the location which is designated as a link source by the corresponding link information has been changed (edited) (after the link information was set last) (ST207 and ST210). If the edit result adversely influenced link information, drive manufacturer ID information 2035 in the link information is checked, and
   (1) if the link information is the one created by the self company (company A in the above embodiment), changes in location designated as a link source by the link information as a result of the edit process are automatically detected using correction content automatic inspection information 2042 (FIG. 13B) in the link information, and specific information 2002 (FIG. 12) is automatically changed in accordance with the detection result (ST208 in FIG. 26A); or
   (2) if the link information is other than the one created by the self company (company A), the corresponding specific information is inhibited from being used (ST211 in FIG. 26B).

In the procedure shown in FIG. 26A, even when drive manufacturer ID 2035 indicates not only the self company (company A in the above embodiment) but also another company, category ID 2040 as function information common to a plurality of companies in association with specific information is read, and link information the self company (company A) can use is allowed to be used (ST209 in FIG. 26A).

An example of step ST213 in FIG. 26B will be explained below.

When the original function is a "search process using query information", query information is recorded in advance in management/control information 2006 (FIG. 12) that can be used by only a specific manufacturer, and the user selects information using the contents displayed on display/input panel 1548 of RTR recorder (FIG. 10). Video object information #2 2168 (FIG. 20C) in common information 2001 is then selected using link information 2003 on the basis of information extracted from management/control information 2006 that can be used by only a specific manufacturer in accordance with the user's choice, and is played back and displayed.

On the other hand, when the original function is to execute "variable speed playback" of only a CM location in the recorded information, if cell playback information #c 2164 in FIG. 20B corresponds to a CM portion in the recorded information, expanded cell playback information 2114 (FIG. 16) which records fast playback (FF) information and corresponds to partial exchange process 2121 is recorded in file RW_A_CONTROL.IFO (FIG. 23) for specific management/control information 2176 dedicated to company A as management/control information 2006 (FIG. 12) that can be used by only a specific manufacturer via link information #ϵ 2167 in correspondence with that CM portion. When PGC control information 1103 shown in FIG. 20A is played back and displayed, cell playback information #c 2164 is replaced by expanded cell playback information 2114 to play back the CM portion at speed higher than normal speed.

Figure 27:
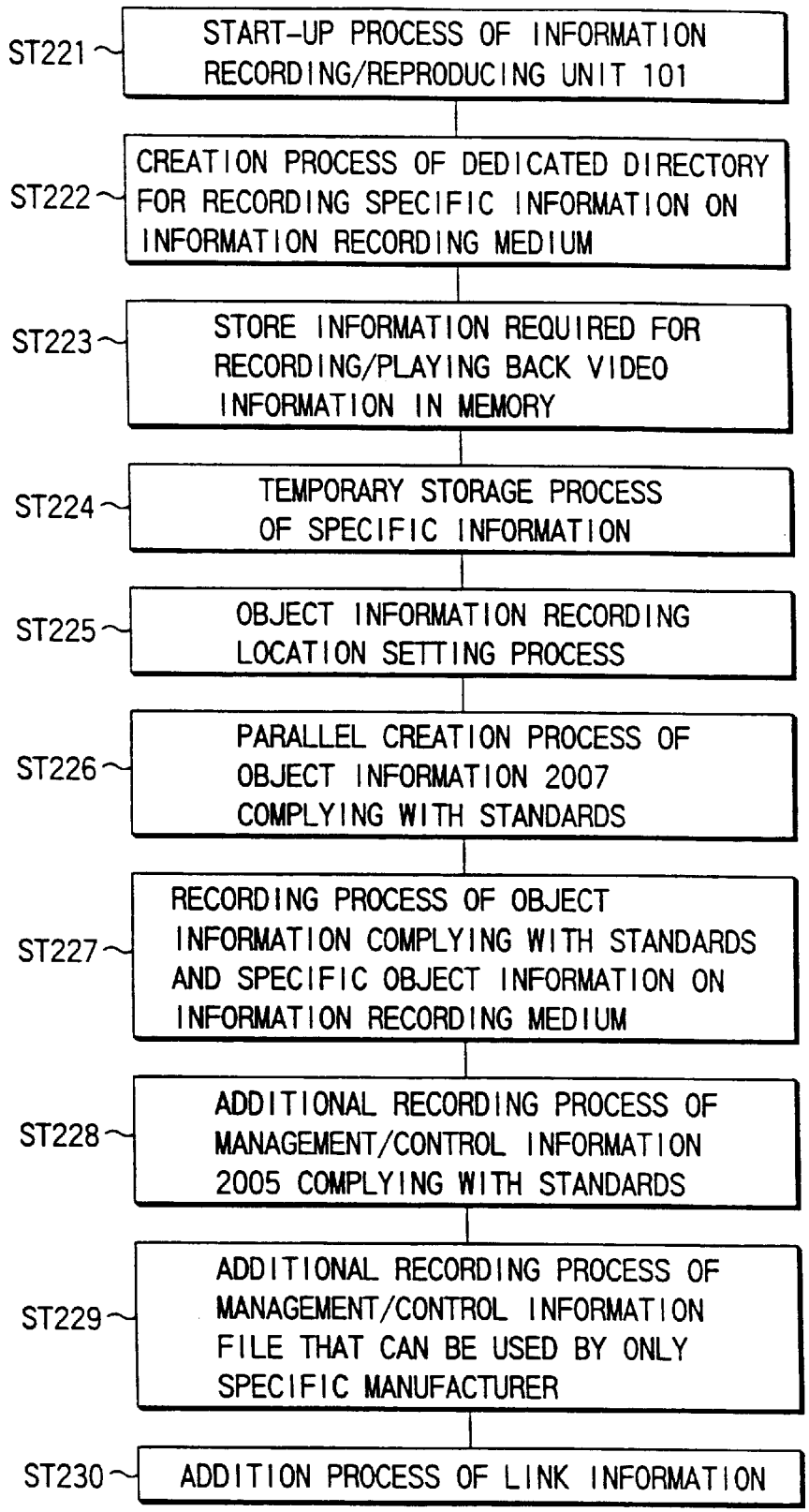
FIG. 27 is a flow chart showing the processing sequence for simultaneously recording common information, link information, and specific information by the information recording/playback apparatus.

FIG. 27 is a flow chart showing the procedure for simultaneously recording common information 2001, link information 2003, and specific information 2002.

The entire flow chart shown in FIG. 27 will be explained first.

(ST221) Start-Up Process of Information Recording/Reproducing Unit 101

Information recording medium (optical disc) 201 is rotated, and focus/track servo of optical head 202 is turned on to enable information playback from information recording medium (optical disc) 201.

(ST222) Creation Process of Dedicated Directory for Recording Specific Information on Information Recording Medium System controller (MPU) 1530 of an information recording/playback apparatus (video recorder) for recording/playing back information receives a command for simultaneously recording common information, link information, and specific information from the user.

System controller (MPU) 1530 creates specific information directory RW_ADD_A 2173 (FIG. 23) for company A on the information recording medium (optical disc 1001 and optical disc 201) (if that directory is already present, this process is skipped).

(ST223) Store Information Required for Recording/Playing Back Video Information in Memory System controller (MPU) 1530 controls information recording/reproducing unit 101 to read control information 1011, link information file 2171 (FIG. 23), and a file of specific management/control information 2176 dedicated to company A from information recording medium (optical disc) 201, and temporarily stores them in its internal semiconductor RAM.

If either link information file 2171 or the file of specific management/control information 2176 dedicated to company A has not been created yet, the non-created file is not read.

(ST224) Temporary Storage Process of Specific Information

Upon receiving specific object information (specific contents information) 2008 from AV input 1542 in FIG. 10, specific object information 2008 is transferred to memory 1534 without converting the specific object information via ADC 1552→V encoder 1555→formatter 1556→data processor 1536→information recording/reproducing unit 101→memory 1534 in accordance with an instruction from system controller (MPU) 1530.

Although the transfer route includes V encoder 1555 and formatter 1556, they transfer the input information intact without any data conversion in this case.

(ST225) Object Information Recording Location Setting Process

The recording locations (allocations viewed from management/control information) of object information 2007 complying with standards and specific object information 2008 are set on the basis of control information 1011 (and link information file 2171) read in step ST223.

(ST226) Parallel Creation Process of Object Information 2007 Complying with Standards Parallel to step ST222, V encoder 1553 and A encoder 1554 convert information input from AV input 1542 into the recording format (MPEG2 or the like) complying with standards, and formatter 1556 re-formats the converted information into the data structure shown in FIG. 3F and temporarily stores that information in memory 1534 as object information 2007 complying with standards.

(ST227) Recording Process of Object Information Complying with Standards and Specific Object Information on Information Recording Medium System controller (MPU) 1530 sends a command to information recording/reproducing unit 101 to create file RW_A_OBJECT.VOB for recording specific object information 2177 dedicated to company A on the information recording medium (optical disc 1001 and optical disc 201) (if such file already exists, this process is skipped).

Information recording/reproducing unit 101 alternately reads out object information 2007 complying with standards and specific object information 2008 from memory 1534 under the control of system controller (MPU) 1530 and records them on the information recording medium (optical disc 1001 and optical disc 201).

Object information 2007 complying with standards is additionally recorded in a video object file, picture object file, or audio object file handled as AV file 1401 in FIG. 23.

Specific object information (specific contents information) 2008 that can be used by only a specific manufacturer is additionally recorded in specific object information file RW_A_OBJECT.VOB 2177 dedicated to company A in FIG. 23.

(ST228) Additional Recording Process of Management/Control Information 2005 Complying with Standards Upon completion of the recording process on the information recording medium in step ST227, system controller (MPU) 1530 collects the added contents according to the recording result in step ST227 with respect to management/control information 2005 complying with standards, and controls information recording/reproducing unit 101 to additionally record additional information in two files RW_VIDEO_CONTROL.IFO and RW_VIDEO_CONTROL.BUP that record control information 1011 in FIG. 23, thus executing the recording process.

(ST229) Additional Recording Process of Management/Control Information File that can be Used by Only Specific Manufacturer If file RW_A_CONTROL.IFO of specific management/control information 2176 dedicated to company A in FIG. 23 is not present in this process, this file is newly created (if that file already exists, the creation process is skipped).

System controller (MPU) 1530 collects contents to be additionally recorded in file RW_A_CONTROL.IFO of specific management/control information 2176 dedicated to company A on the basis of the recording result of specific object information (specific contents information) 2008 in step ST227, and controls information recording/reproducing unit 101 to additionally record those contents in the file.

(ST230) Addition Process of Link Information

If link information file 2171 in FIG. 23 does not exist in this process, a new link information file is created (if that file already exists, the creation process is skipped).

System controller (MPU) 1530 collects link information contents to be added on the basis of the contents of management/control information 2005 and information 2176 recorded in steps ST228 and ST229, and controls information recording/reproducing unit 101 to record additional information in link information file 2171 RW_LINK.DAT.

As shown in FIGS. 13A and 13B, the link information to be additionally recorded includes:

drive manufacturer ID information 2035;

category ID 2040;

correction content automatic inspection information 2042 of specific information; and the like.

Date and time information upon setting additional link information in step ST230 is recorded or updated in last recording/change time (date) information 2061 of this link information shown in FIG. 13C.

The flow chart shown in FIG. 27 will be described in more detail below. An embodiment will be exemplified wherein digital video information recorded on a DV (digital video tape) or a still picture in the JPEG format, which is sensed by digital camera 1543 (FIG. 10), is recorded on information recording medium (optical disc) 201. In steps ST224 and ST227 in FIG. 27, the digital video information in the DV format or still picture information in the JPEG format is recorded in file RW_A_OBJECT.VOB for recording specific object information 2177 dedicated to company A in FIG. 23, and management/control information that pertains to the recorded information is recorded in recording file RW_A_CONTROL.IFO of specific management/control information 2176 dedicated to company A (ST229).

Parallel to this recording process, as shown in steps ST226 and ST227 in FIG. 27, the digital video information in the DV format or still picture information in the JPEG format is converted into digital video information in the MPEG2 format or still picture information of the MPEG2 I-picture format as the recording format that complies with the DVD standards by V encoder 1553, SP encoder 1555, A encoder 1554, and formatter 1556 in FIG. 10, and is recorded as object information 2007 (FIG. 12) complying with standards in a video objects file, picture objects file, or audio objects file handled as AV file 1401 in FIG. 23. At the same time, management/control information 2005 that pertains to the recorded information is recorded in two files RW_VIDEO_CONTROL.IFO and RW_VIDEO_CONTROL.BUP associated with control information 1011 (ST228).

Upon playback/display, the user selects information to be played back, and one of object information 2007 complying with standards and specific object information (specific contents information) 2008 that can be used by a specific manufacturer is played back and displayed on display/input panel 1548 of RTR recorder in accordance with user's choice.

Figure 28:
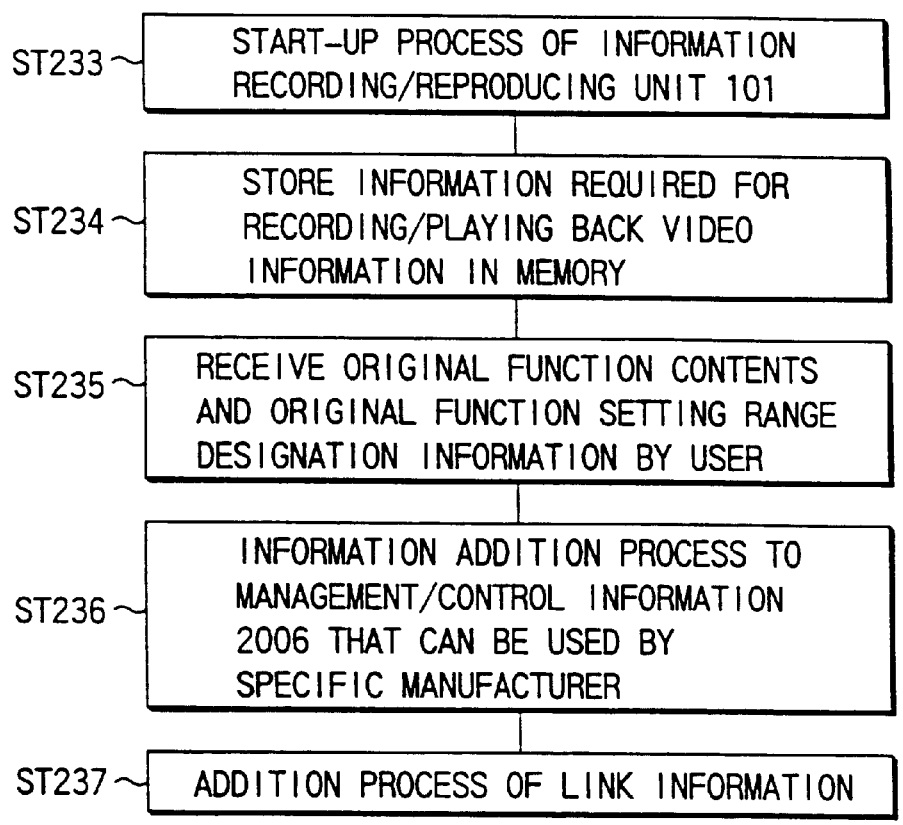
FIG. 28 is a flow chart showing the processing sequence for appending link information and specific information to common information already recorded on the information recording medium.

FIG. 28 is a flow chart showing the method of appending link information 2003 and specific information 2002 to common information 2001 already recorded on the information recording medium.

The entire flow chart shown in FIG. 28 will be explained first.

(ST233) Start-up Process of Information Recording/Reproducing Unit 101

Information recording medium (optical disc) 201 is rotated, and focus/track servo of optical head 202 is turned on to enable information playback from information recording medium (optical disc) 201.

(ST234) Store Information Required for Recording/Playing Back Video Information in Memory System controller (MPU) 1530 controls information recording/reproducing unit 101 to read control information 1011 and link information file 2171 (FIG. 23) from information recording medium (optical disc) 201, and temporarily stores them in its internal semiconductor RAM.

(ST235) Receive Original Function Contents and Original Function Setting Range Designation Information by User The user selects the original function of the information recording/playback apparatus for recording video information (video recorder) via the user interface using display/input panel 1548 of RTR recorder, and designates the range for designating that original function.

System controller (MPU) 1530 interprets the original function contents designated by the user using control information 1011 as management/control information 2005 complying with standards, which is temporarily stored in its internal semiconductor RAM.

(ST236) Information Addition Process to Management/Control Information 2006 that can be Used by Specific Manufacturer System controller (MPU) 1530 creates addition information to management/control information 2006 that can be used by only a specific manufacturer on the basis of the original function contents and range designated by the user, and controls information recording/reproducing unit 101 to additionally record that information in specific management/ control information file 2176 RW_A_CONTROL.IFO dedicated to company A shown in FIG. 23.

(ST237) Addition Process of Link Information

If link information file 2171 shown in FIG. 23 does not exist in this process, a new link information file is created (if such file already exists, the creation process is skipped).

System controller (MPU) 1530 collects link information contents to be added on the basis of the contents of control information 1011 temporarily stored in memory 1534 in step ST234 and management/control information 2006 that can be used by only a specific manufacturer, which is additionally recorded in step ST236, and controls information recording/reproducing unit 101 to record the additional information in link information file 2171 RW_LINK.DAT.

As shown in FIGS. 13A and 13B, the link information to be additionally recorded includes:

drive manufacturer ID information 2035;

category ID 2040;

correction content automatic inspection information 2042 of specific information; and the like.

Date and time information upon setting additional link information in step ST237 is recorded or updated in last recording/change time (date) information 2061 of this link information shown in FIG. 13C.

The flow chart shown in FIG. 28 will be described in more detail below. An embodiment of parental lock or security setup by setting a password in, e.g., cell playback information #c 2164 in FIG. 19B will be explained below. A parental lock or security setup instruction at that location is received from the user (ST235 in FIG. 28).

Expanded cell playback information 2114 (FIG. 16) which is additionally recorded with password information and corresponds to partial exchange process 2121 is recorded in file RW_A_CONTROL.IFO (FIG. 23) for specific management/control information 2176 dedicated to company A as management/control information 2006 (FIG. 12) that can be used by only a specific manufacturer via link information #ϵ 2167 in correspondence with that location (ST236). Upon playing back and displaying PGC control information 1103 shown in FIG. 20A, cell playback information #c 2164 is replaced by expanded cell playback information 2114. When the display timing of this portion has been reached, a password inquiry message for the user is displayed on display/input panel 1548 of RTR recorder. Only when the user inputs a correct password without any errors, this portion can be played back and displayed.

Figure 29:
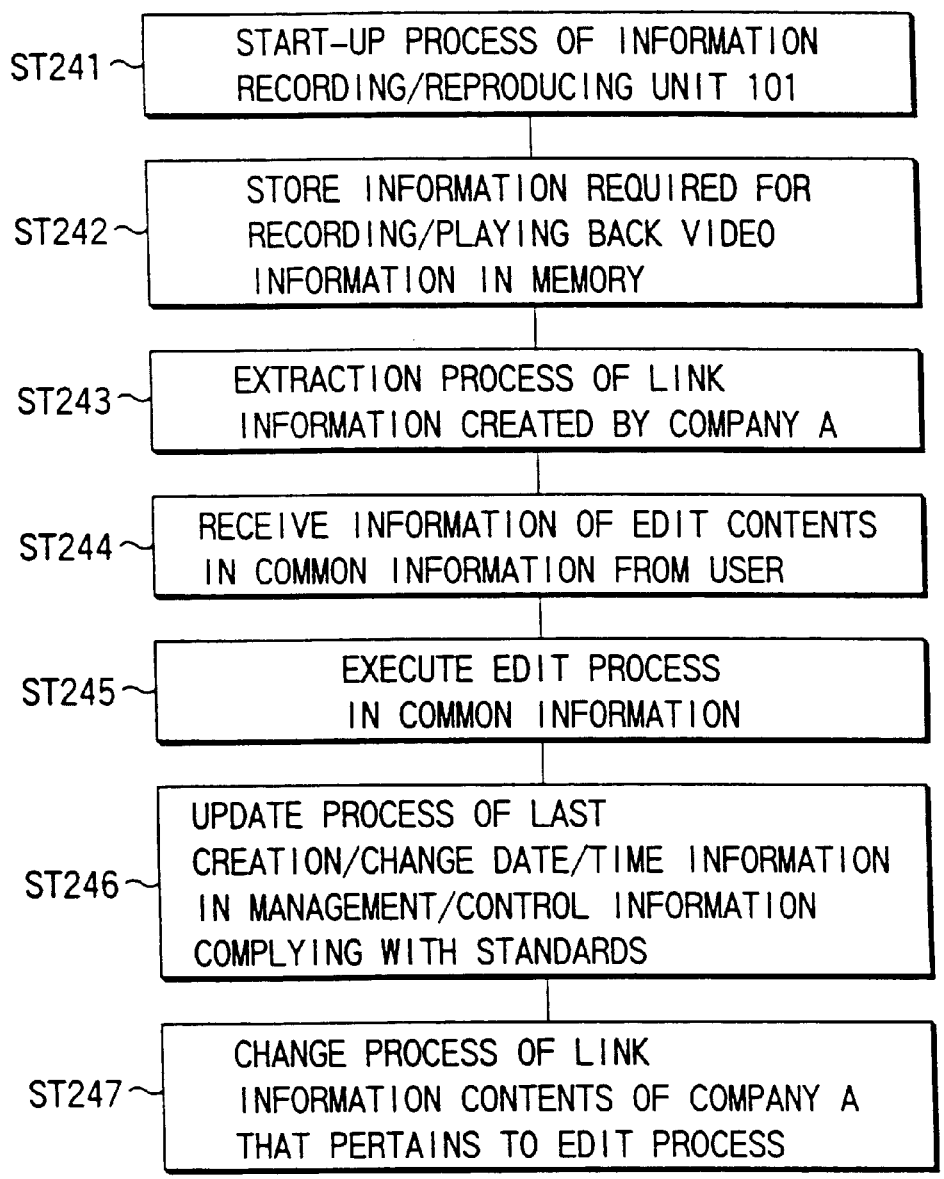
FIG. 29 is a flow chart showing the processing sequence executed when common information already recorded on the information recording medium undergoes an edit process.

FIG. 29 is a flow chart that pertains to processes upon editing common information 2001.

The entire flow chart shown in FIG. 29 will be explained first.

(ST241) Start-up Process of Information Recording/Reproducing Unit 101

Information recording medium (optical disc) 201 is rotated, and focus/track servo of optical head 202 is turned on to enable information playback from information recording medium (optical disc) 201.

(ST242) Store Information Required for Recording/Playing Back Video Information in Memory System controller (MPU) 1530 controls information recording/reproducing unit 101 to read control information 1011 and link information file 2171 (FIG. 23) from information recording medium (optical disc) 201, and temporarily stores them in its internal semiconductor RAM.

(ST243) Extraction Process of Link Information Created by Company A

System controller (MPU) 1530 extracts link information which includes drive manufacturer ID information 2035 (FIG. 13A) corresponding to company A by searching all pieces of link information in link information file 2171 temporarily stored in its internal semiconductor RAM.

(ST244) Receive Information of Edit Contents in Common Information from User

The user designates information that pertains to edit contents in common information 2001 complying with standards by the information recording/playback apparatus for recording video information via the user interface using display/input panel 1548 of RTR recorder. System controller 1530 receives that information.

System controller (MPU) 1530 determines a practical method for the edit contents designated by the user using control information 1011 as management/control information 2005 complying with standards, which is temporarily stored in its internal semiconductor RAM.

(ST245) Execute Edit Process in Common Information

System controller (MPU) 1530 edits common information 2001 complying with standards on the basis of the processing method determined in step ST244, and controls information recording/reproducing unit 101 as needed to record information on information recording medium (optical disc) 201.

(ST246) Update Process of Last Creation/Change Date/Time Information in Management/Control Information Complying with Standards System controller (MPU) 1530 changes the contents of management/control information 2005 complying with standards on the basis of the edit process done in step ST245, and controls information recording/reproducing unit 101 to rewrite the contents of files RW_VIDEO_CONTROL.IFO and RW_VIDEO_CONTROL.BUP associated with control information 1011 shown in FIG. 23.

System controller (MPU) 1530 simultaneously executes update processes of last creation/change date/time information (information that pertains to the changed portion upon editing of 2151 to 2159 in FIGS. 20A to 20C) and date/time information 2144 of the latest edit process shown in FIG. 19C, which pertain to the aforementioned edit process.

(ST247) Change Process of Link Information Contents of Company A That Pertains to Edit Process System controller (MPU) 1530 finds link information which is influenced by the edit process of common information 2001 done in step ST245 by search from those including drive manufacturer ID information 2035 (FIG. 13A) corresponding to company A, which are extracted in step ST243, changes the corresponding portion of specific information 2002 designated as a link destination of that link information in correspondence with the edit process, and controls information recording/reproducing unit 101 to change and record that change result in the contents of files 2176 and 2177 in directory 2173 for specific information of company A.

System controller (MPU) 1530 updates and records last recording/change time information 2061 (FIG. 13C) of each link information corresponding to company A irrespective of the presence/absence of influences of the edit process.

The flow chart shown in FIG. 29 will be described in more detail below. As described previously, assuming a case wherein information recording medium (optical disc) 201 is used by an information recording/playback apparatus of another company after common information 2001 has been edited, a recording process for making link information usable in such a case is required. That is, the update process of "last creation/change date/time information 2151 to information 2159" (FIGS. 20A to 20C) of portions that have been changed by the edit process, and "date/time information 2144 of the latest edit process" as a whole is executed (ST246). At the same time, "last recording time information 2061" in link information is updated, and the contents of the corresponding specific information are changed (ST247).

Applications of the present invention will be explained below.

The present invention can be applied to a program (software) recording scheme in an information processing apparatus, which records program (software) information described in various program languages such as "C", "Visual C", "JAVA", and the like on an information recording medium, reproduces the program (software) information from that information recording medium, and makes an implementation process according to the reproduced program (software) contents. That is, an information recording scheme (description rule of a program language) for recording information on the information recording medium can be applied to that which is commonly standardized and recognized among a plurality of manufacturers which manufacture arithmetic processing apparatuses for reproducing a program (software) from the information recording medium, and making an implementation process according to the reproduced program (software) contents.

In the arithmetic operation field (computer field), an arithmetic operation program is described according to rules (standards) of various program languages such as "C", "Visual C", "JAVA", and the like. If a command that violates such rules of the program language is described in a program, it is rejected as an error.

For example, processing functions that can be controlled by programs which pertain to a "communication protocol", "graphical user interface", "image processing function", and the like are considerably limited by the program languages used. That is, differentiated and original functions cannot be provided. By contrast, requirements for implementing function processing beyond the limitations on a specific program language are increasing. In each program language, a program is upgraded every time a new function is added. However, since such upgrading requires much time, it is hard to add new functions in quick response to advances of the technologies.

When the present invention is applied to the program recording scheme, a program control method which can implement function processing beyond limitations of conventional program languages such as "C", "Visual C", "JAVA", and the like on such languages can be provided.

When the present invention is applied to the program recording scheme, a program language which has command expandability even on the conventional program languages such as "C", "Visual C", "JAVA", and the like can be provided. As a consequence, an individual information processing apparatus (computer) can append function processing beyond the limitations on the conventional program languages.

Important points of the present invention will be summarized below.

Information created according to a recording format (recording scheme) complying with standards for recording video information, audio information, still picture information, and the like on an information recording medium is recorded on the information recording medium as "common information 2001 (FIG. 12)". This common information 2001 includes program (software) information created according to conventional program language rules (command rules) such as "C", "Visual C", "JAVA", or the like.

Furthermore, information created in a recording format (recording scheme) which is used for implementing a function unique to the manufacturer of an information recording/playback apparatus or information recording medium and does not comply with standards is recorded at a location different from the recording location of common information 2001 on the information recording medium as "specific information 2002 that can be used by only a specific manufacturer" shown in FIG. 12. This specific information 2002 that can be used by only a specific manufacturer includes expanded program (software) information created using new command information, which does not comply with conventional program language rules (command rules) such as "C", "Visual C", "JAVA", or the like.

Also, to allow use of specific information 2002, "link information 2003" that indicates the relationship between common information 2001 complying with standards and specific information 2002 that can be used by only a specific manufacturer is recorded on the information recording medium.

Link information 2003 describes:

manufacturer information or model information of information recording/playback apparatuses that can be used for each specific information 2002; and "information that pertains to the link pattern of specific information" indicating the relationship between each specific information 2002 and common information 2001.

In the description of the embodiment, an information recording/playback apparatus and recording scheme for recording video information, audio information, still picture information, and the like on an information recording medium, and playing back information from the information recording medium have been described. However, the present invention is not limited to such specific apparatus and scheme, and the above embodiment can be similarly applied to a program language having command expandability even on conventional program languages such as "C", "Visual C", "JAVA", or the like.

In this case, an information processing apparatus (computer) corresponds to the information recording/playback apparatus;

a program (software) created according to conventional program language rules such as "C", "Visual C", "JAVA", or the like corresponds to common information 2001 complying with standards;

an HDD (hard disc drive) or an optical disc such as an MO, DVD-RAM, or the like, which records the program (software), corresponds to the information recording medium;

program (software) data created according to original command information, which is created by the information processing apparatus (computer) and does not comply with conventional program language rules such as "C", "Visual C", "JAVA", or the like corresponds to specific information 2002 that can be used by only a specific manufacturer; and a call command link command (anchor information) called between the two programs (software) corresponds to link information 2003.

Furthermore, in this case, in the information content list of one link information shown in FIG. 13A, the information contents of drive manufacturer ID information (drive manufacturer name or the like) 2035 that can use specific information associated with this link information are changed to "manufacturer ID information 2035 of an information processing apparatus (computer) that can use specific information associated with this link information"; and model information 2073 that can use specific information is changed to "model information 2073 of an information processing apparatus (computer) that can use specific information.

The outline of information recording by the information recording apparatus (information recording/playback apparatus shown in FIG. 10) according to the present invention will be summarized below with the aid of FIG. 30.

Figure 30:
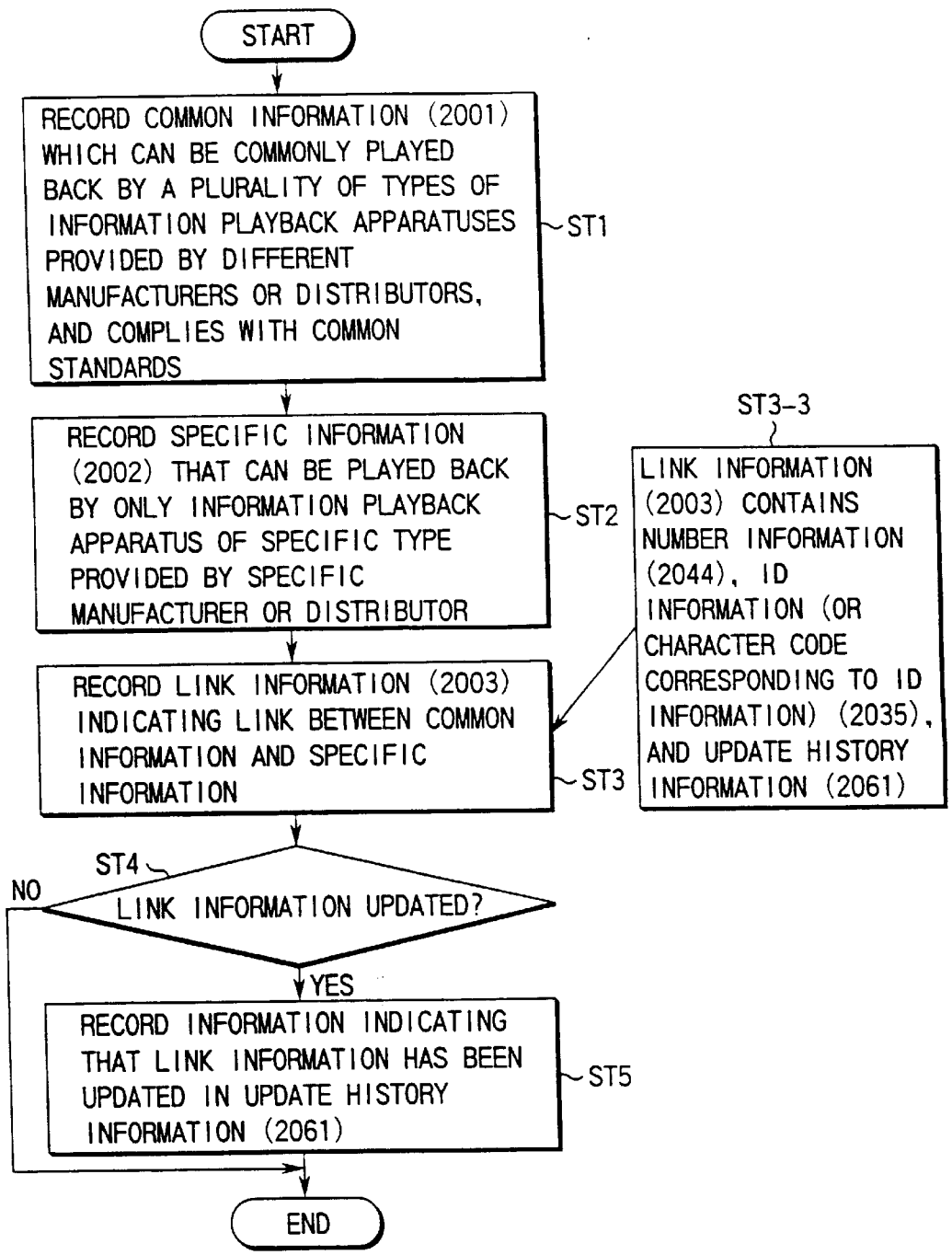
FIG. 30 is a flow chart showing the processes for recording common information, link information, and specific information on the information recording medium.

As shown in FIG. 30, the information recording scheme of the present invention has a plurality of processes. The first process (ST1) records common information (2001) which can be commonly played back by a plurality of types of information playback apparatuses provided by different manufacturers or distributors, and complies with common standards. The second process (ST2) records specific information (2002) which can be played back by only an information playback apparatus of a specific type, which is provided by a specific manufacturer or distributor. The third process (ST3) records link information (2003) indicating links between the common information and specific information.

The link information (2003) recorded in the third process contains number information (2044) indicating the number of link designation locations in the common information. Also, the link information (2003) recorded in the third process contains at least one ID information (character code) of ID information (character code corresponding to ID information) indicating the manufacturer of the information playback apparatus of the specific type, and ID information (character code corresponding to ID information) indicating the distributor of the information playback apparatus of the specific type. Furthermore, the link information (2003) recorded in the third process includes update history information.

The fourth process (ST4, ST5) records information indicating that link information has been updated in the update history information when the link information has been updated.

Each information mentioned above is recorded on the information recording medium by information recording/reproducing unit 101 serving as recording means. As a result, the common information, specific information, and link information are recorded on the information recording medium, as shown in FIG. 12.

The outline of information playback by the information recording apparatus (information recording/playback apparatus shown in FIG. 10) according to the present invention will be summarized below with the aid of FIG. 31.

Note that the information recording medium to be played back comprises first, second, and third areas, as shown in FIG. 12. The first area records common information (2001) which can be commonly played back by a plurality of types of information playback apparatuses provided by different manufacturers or distributors, and complies with common standards. The second area records specific information (2002) which can be played back by only an information playback apparatus of a specific type, which is provided by a specific manufacturer or distributor. The third area records link information (2003), which indicates links between the common information and specific information, and contains at least one of ID information indicating the manufacturer of the information playback apparatus of the specific type, and ID information indicating the distributor of the information playback apparatus of the specific type.

The information playback apparatus of the specific type (information recording/playback apparatus shown in FIG. 10), which plays back the information recording medium to be played back comprises memory 1534 serving as ID information storage means (character code memory means). Memory 1534 stores at least one ID information (character code) of ID information (character code corresponding to ID information) indicating the manufacturer of the information playback apparatus of the specific type, and ID information (character code corresponding to ID information) indicating the distributor of the information playback apparatus of the specific type.

Figure 31:
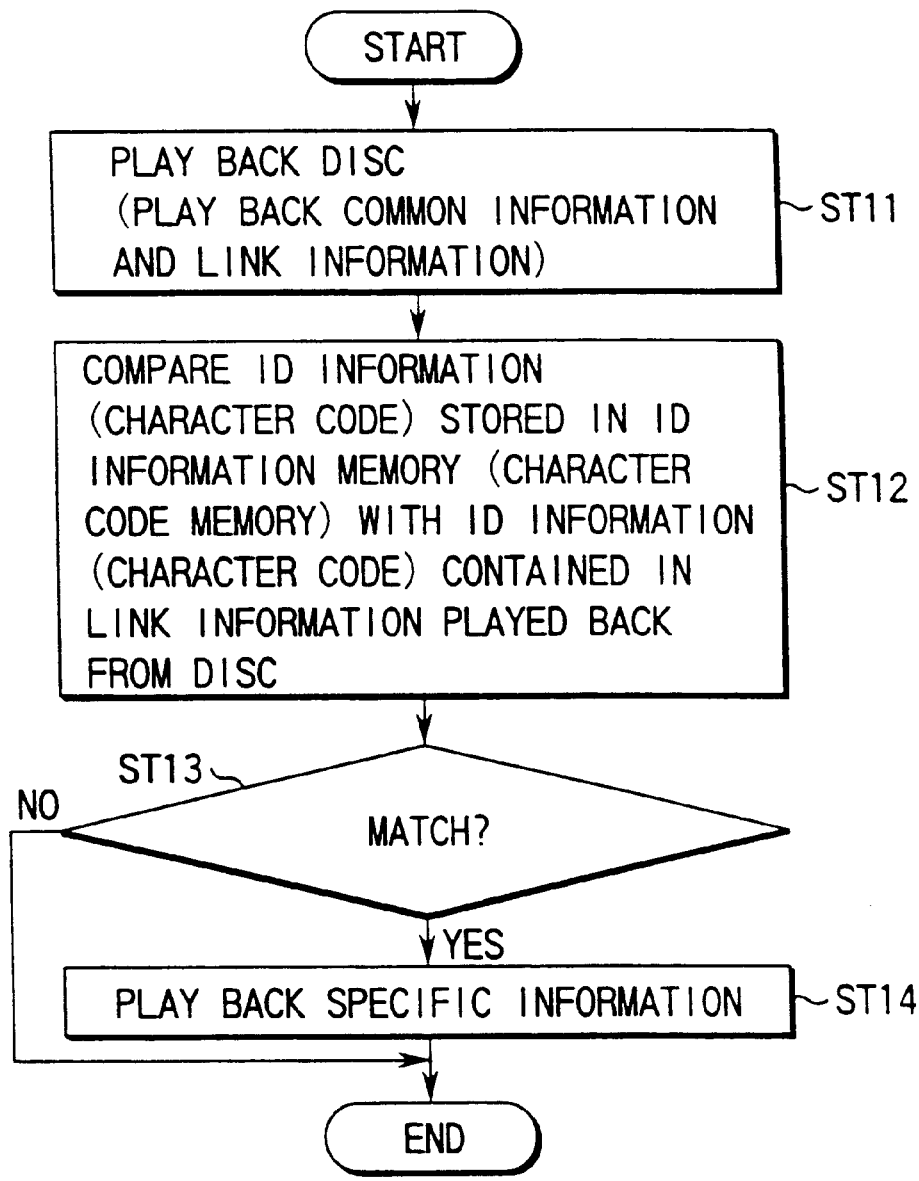
FIG. 31 is a flow chart showing the processes for playing back information from the information recording medium on which common information, link information, and specific information have been recorded.

As shown in FIG. 31, an information playback method of the present invention comprises a plurality of processes.

The first process (ST11) plays back a disc (plays back common information and link information). The second process (ST12) compares ID information (character code corresponding to ID information) stored in memory 1534 with ID information (character code corresponding to ID information) contained in the link information played back from the information recording medium. If it is confirmed in the third process (ST13) that these two pieces of ID information match each other, specific information is played back in the fourth process (ST14). Or if it is confirmed in the third process (ST13) that these two character codes match each other, ID information stored in memory 1534 is compared with that contained in the link information played back from the information recording medium. If it is confirmed that these two pieces of ID information match each other, specific information is played back in the fourth process (ST14).

Each information mentioned above is played back from the information recording medium by information recording/reproducing unit 101 serving as playback means.

The correspondence between the data structure built on the information recording medium and data shown in FIGS. 1A to 1F and FIGS. 13A to 13C will be explained below with reference to FIGS. 32 to 35.

Figure 32:
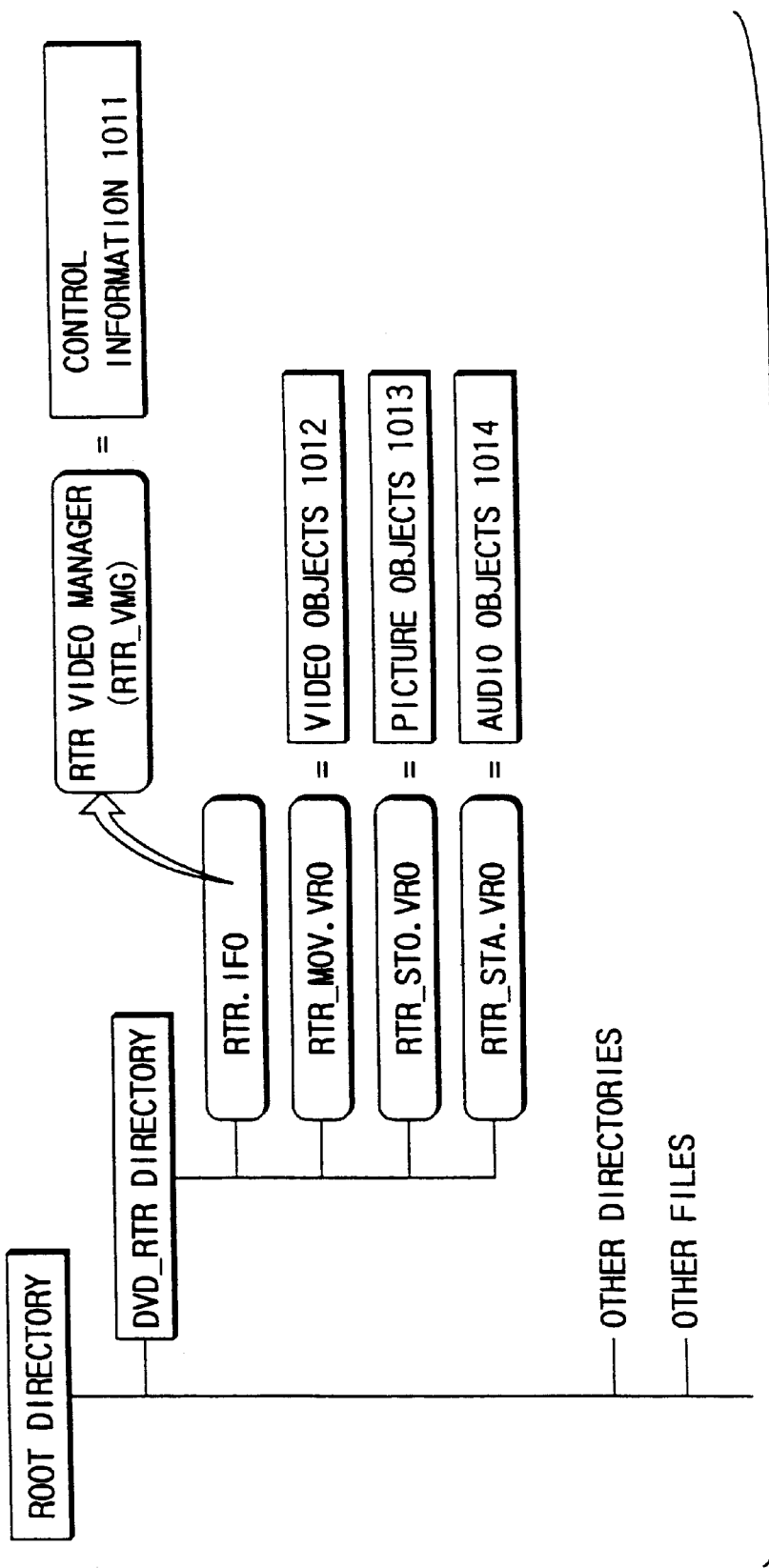
FIG. 32 is a view showing the correspondence between the data structure built on the information recording medium, and the data shown in FIGS. 1A to 1F.

As shown in FIG. 32, a DVD_RTR directory is contained in a root directory. The DVD_RTR directory contains RTR.IFO, RTR_MOV.VRO, RTR_STO.VRO, and RTR_STA.VRO. Furthermore, the RTR.IFO contains an RTR video manager (RTR_VMG). This RTR video manager (RTR_VMG) corresponds to control information 1011 shown in FIG. 1D. The RTR_MOV.VRO corresponds to video objects 1012 shown in FIG. 1D, the RTR_STO.VRO to picture objects 1013 shown in FIG. 1D, and RTR_STA.VRO to audio objects 1014 shown in FIG. 1D.

Figure 33:
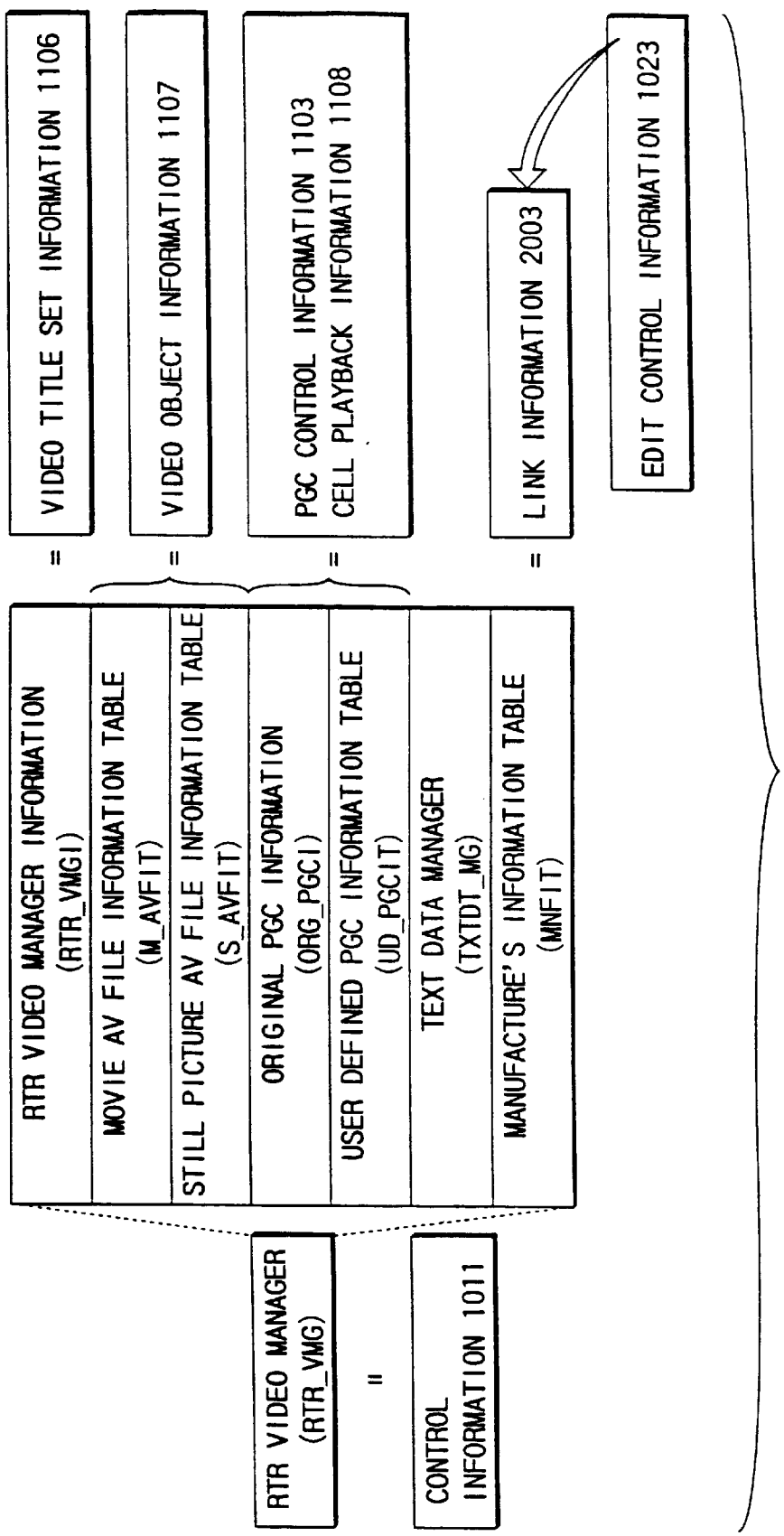
FIG. 33 is a view showing data contained in an RTR Video Manager (RTR VMG)

As shown in FIG. 33, the RTR video manager (RTR_VMG) contains RTR video manager information (RTR_VMGI), movie AV file information table (M_AVFIT), still picture AV file information table (S_AVFIT), original PGC information (ORG_PGCI), user defined PGC information table (UD_PGCIT), test data manager (TXTDT_MG), and manufacturer's information table (MNFIT). Also, the RTR video manager information (RTR_VMGI) corresponds to video title set information 1106 shown in FIG. 1F. The movie AV file information table (M_AVFIT) and still picture AV file information table (S_AVFIT) correspond to video object information 1107 shown in FIG. 1F. The original PGC information (ORG_PGCI) and user defined PGC information table (UD_PGCIT) correspond to PGC control information 1103 and cell playback information 1108 shown in FIG. 1F. The manufacturer's information table (MNFIT) corresponds to link information 2003 shown in FIG. 12. This link information 2003 shown in FIG. 12 is contained in edit control information 1023 shown in FIG. 1E.

Figure 34:
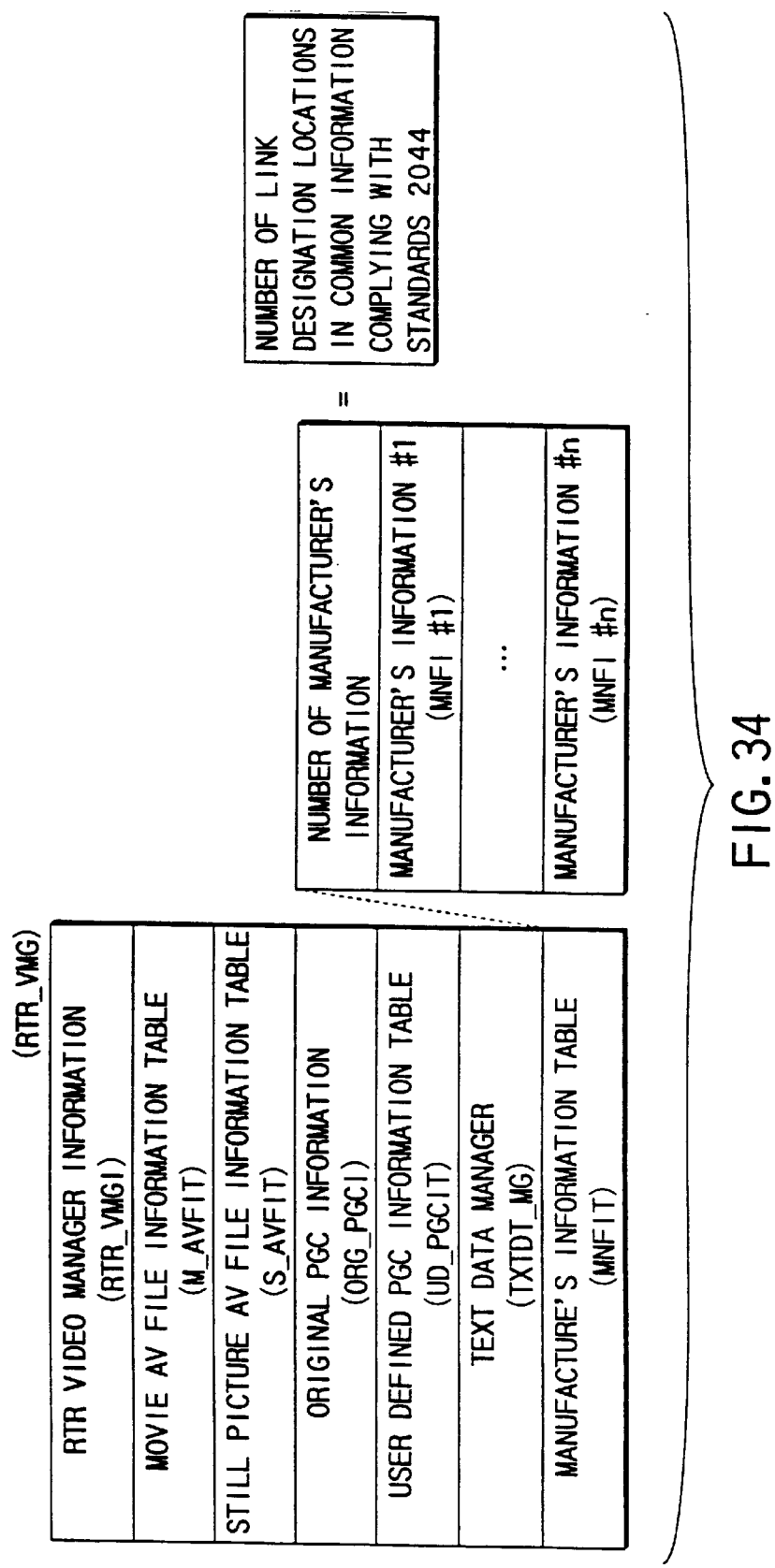
FIG. 34 is a view showing data contained in a Manufacturer's Information Table (MNFIT)

As shown in FIG. 34, the manufacturer's information table (MNFIT) contains the number of pieces of manufacturer's information, manufacturer's information #1 (MNFI#1), . . . , manufacturer's information #n (MNFI#n). The number of pieces of manufacturer's information corresponds to number 2044 of link designation locations in common information complying with standards shown in FIG. 13B.

Manufacturer's information #1 (MNFI#1) has a configuration shown in FIG. 35. MNF_ID corresponds to drive manufacturer ID information 2035 shown in FIG. 13A. REC_TM corresponds to last recording/change time (date) information 2061 of link information shown in FIG. 13C.

According to the embodiment of the present invention described above, the following effects can be obtained.

(1) The present invention for the first time assures the recording location of information (original information other than common information 2001 complying with standards) originally created by the manufacturer of an information recording/playback apparatus which can record/play back information on/from an information recording medium (recording area of specific information 2002) on the information recording medium. As a result, the manufacturer of the information recording/playback apparatus can record original information on the information recording medium without any restraints of the standards.

(1-1) The present invention for the first time assures the recording location (recording area of specific information 2002) of program (software) data created according to original command information, which does not comply with conventional program language rules such as "C", Visual C", "JAVA", or the like by an information processing apparatus (computer) on an information recording medium that records program (software) data. As a result, in order to provide an original function by the information processing apparatus (computer), program (software) information according to command information, which does not comply with conventional program language rules such as "C", Visual C", "JAVA", or the like and is originally created by the information processing apparatus (computer) can be appended.

(2) Since original information other than common information 2001 complying with standards can be recorded in the area of specific information 2002 that can be used by only a specific manufacturer, information corresponding to an original function set by the manufacturer of the information recording/playback apparatus can be recorded in the recording area of specific information 2002 without being limited by the functions set according to the conventional standards. Consequently, each manufacturer can provide its original function to the information recording/playback apparatus, and this leads to originality and differentiation among individual information recording/playback apparatuses. In this manner, development of information recording/playback apparatuses in terms of functions based on the principle of competition is expected.

(2-1) Since program (software) information according to command information which does not comply with conventional program language rules such as "C", "Visual C", "JAVA", or the like and is originally created by an information processing apparatus (computer) can be recorded in the area of specific information 2002 that can be used by only a specific manufacturer, each manufacturer can provide its original function to the information processing apparatus (computer), and this leads to originality and differentiation among individual information processing apparatuses (computers). Hence, development of information processing apparatuses (computers) in terms of functions based on the principle of competition is expected.

(3) Since original information other than common information 2001 complying with standards can be recorded in the area of specific information 2002 that can be used by only a specific manufacturer, information corresponding to an original function set by the manufacturer of the information recording/playback apparatus can be recorded in the recording area of specific information 2002 without being limited by the functions set according to the conventional standards. As a consequence, a new function can be added to an information recording/playback apparatus in quick response to advances of the technologies as needed, and the functions of the information recording/playback apparatus can be advanced in correspondence with such technological advances.

(3-1) Since program (software) information according to command information which does not comply with conventional program language rules such as "C", "Visual C", "JAVA", or the like and is originally created by an information processing apparatus (computer) can be recorded in the area of specific information 2002 that can be used by only a specific manufacturer, each manufacturer can provide its original function to the information processing apparatus (computer). Hence, a new function can be added to an information processing apparatus (computer) in quick response to advances of the technologies as needed, and the functions of the information processing apparatus (computer) can be advanced in correspondence with such technological advances.

(4) Since link information 2003 is provided, the relationship between common information 2001 complying with standards and specific information upon use can be clarified. As a consequence, an information playback apparatus can use specific information 2002 without any errors.

(4-1) Since link information 2003 is provided, the relationship between common information 2001 complying with standards and specific information upon use can be clarified. As a consequence, an information processing apparatus (computer) can use specific information 2002 without any errors.

(5) Since link information 2003 is provided and contains manufacturer information or model information of an information recording/playback apparatus that can be used for each specific information 2002, the information recording/playback apparatus can automatically determine usable specific information 2002 very easily. As a result, in information recording/playback apparatuses manufactured by all the manufacturers, specific information 2002 can be utilized without any errors while assuring high reliability.

The present invention can provide the following information recording medium, information recording method and apparatus, and information playback method and apparatus:

(1) an information recording medium which allows to achieve differentiation and originality of functions in units of models of information playback apparatuses provided by different manufacturers or distributors;

(2) an information recording method which records information on an information recording medium to be able to achieve differentiation and originality of functions in units of models of information playback apparatuses provided by different manufacturers or distributors;

(3) an information recording apparatus which records information on an information recording medium to be able to achieve differentiation and originality of functions in units of models of information playback apparatuses provided by different manufacturers or distributors;

(4) an information playback method which plays back information from an information recording medium on which information is recorded to be able to achieve differentiation and originality of functions in units of models of information playback apparatuses provided by different manufacturers or distributors;

(5) an information playback apparatus which plays back information from an information recording medium on which information is recorded to be able to achieve differentiation and originality of functions in units of models of information playback apparatuses provided by different manufacturers or distributors;

(6) an information recording medium which has a data structure with high expandability of functions;

(7) an information recording method which records a data structure with high expandability of functions on an information recording medium;

(8) an information recording apparatus which records a data structure with high expandability of functions on an information recording medium;

(9) an information playback method which plays back information from an information recording medium on which a data structure with high expandability of functions on an information recording medium is recorded; and

(10) an information playback apparatus which plays back information from an information recording medium on which a data structure with high expandability of functions on an information recording medium is recorded.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

The present application claims priority to Japanese Patent Application No. 10-221919 filed Aug. 5, 1998, U.S. patent application Ser. No. 09/365,708, filed Aug. 3, 1999, now U.S. Pat. No. 6,215,746 and U.S. patent application Ser. No. 09/817,113, filed Mar. 27, 2001. The contents of those applications are incorporated herein by reference in their entirety.

What is claimed as new and desired to be secured by Letters Patent of the United States is:

1. An information recording method for recording information on a recording medium, comprising steps of:

providing a recording medium having a first area and a second area, the first area being provided for allowing video information to be recorded therein and reproduced therefrom, the second area being provided for allowing manager information to be recorded therein, the manager information being referred to when the video information recorded in the first area is reproduced, the video information including an object file for storing at least one of a movie video object and a still video object, the manager information including video manager information containing information related to at least one of the movie video object and still video object stored in the object file, the object file including manufacturer's information, and the manufacturer's information including manufacturer ID and manufacturer's data;

recording at least one of the movie video object and still video object stored in the object file recorded in the first area;

recording the video manager information in a third area provided in the second area;

recording the manufacturer ID in a fourth area provided in the object file recorded in the first area; and recording manufacturer's data of a specific manufacture corresponding to the manufacturer ID in a fifth area located adjacent to the fourth area provided in the object file recorded in the first area.

2. An information recording apparatus for recording information on a recording medium having a first area and a second area, the first area being provided for allowing video information to be recorded therein and reproduced therefrom, the second area being provided for allowing manager information to be recorded therein, the manager information being referred to when the video information recorded in the first area is reproduced, the video information including an object file for storing at least one of a movie video object and a still video object, the manager information including video manager information containing information related to at least one of the movie video object and still video object stored in the object file, the object file including manufacturer's information, and the manufacturer's information including manufacturer ID and manufacturer's data, the information recording apparatus comprising:

means for recording at least one of the movie video object and still video object stored in the object file recorded in the first area;

means for recording the video manager information in a third area provided in a second area;

means for recording the manufacturer ID in a fourth area provided in the object file recorded in the first area; and means for recording the manufacturer's data of a specific manufacturer in a fifth area located adjacent to the forth area provided in the object file recorded in the first area.

3. An information recording medium comprising:

a first area provided for allowing video information to be recorded therein and reproduced therefrom, the video information including an object file for storing at least one of a movie video object and a still video object, the object file including manufacturer's information, the manufacturer's information including manufacturer ID and manufacturer's data;

a second area provided for allowing manager information to be recorded therein, the manager information being referred to when the video information recorded in the first area is reproduced, the manager information including video manager information containing information related to at least one of the movie video object and still video object stored in the object file;

a third area provided in the first area for allowing manufacturer's information to be recorded;

a fourth area provided in the third area for allowing the manufacturer ID to be recorded; and a fifth area provided in the third area and located adjacent to the fourth area for allowing the manufacturer's information of a specific manufacturer to be recorded.

4. An information recording/reproducing apparatus for recording information on a recording medium and reproducing there from, the recording medium having a first area and a second area, the first area being provided for allowing video information to be recorded therein and reproduced therefrom, the second area being provided for allowing manager information to be recorded therein, the manager information being referred to when the video information recorded in the first area is reproduced, the video information including an object file for storing at least one of a movie video object and a still video object, the manager information including video manager information containing information related to at least one of the movie video object and still video object stored in the object file, the object file including manufacturer's information, and the manufacturer's information including manufacturer ID and manufacturer's data, the information recording/reproducing apparatus comprising:

means for recording at least one of the movie video object and still video object stored in the object file recorded in the first area;

means for recording the video manager information in a third area provided in a second area;

means for recording the manufacturer ID in a fourth area provided in the object file recorded in the first area;

means for recording the manufacturer's data of a specific manufacturer in a fifth area located adjacent to the forth area provided in the object file recorded in the first area;

means for reproducing the manufacturer ID;

comparing means for comparing the manufacturer ID with ID recorded in a memory; and means for reproducing the specific information stored in the object file, when the manufacturer ID reproduced coincides with the ID recorded in the memory.

\* \* \* \* \*